(12) United States Patent
Withers et al.

(10) Patent No.: US 9,336,455 B1
(45) Date of Patent: May 10, 2016

(54) METHODS AND APPARATUS FOR LOCATING LINES IN IMAGES AND USING LOCATED LINES TO MAKE IMAGE ADJUSTMENTS

(71) Applicant: ACCUSOFT CORPORATION, Tampa, FL (US)

(72) Inventors: William Douglas Withers, Arnold, MD (US); Stephen A. Martucci, Kendall Park, NJ (US)

(73) Assignee: Accusoft Corporation, Tampa, FL (US)

( * ) Notice: Subject to any disclaimer, the term of this patent is extended or adjusted under 35 U.S.C. 154(b) by 0 days.

(21) Appl. No.: 14/618,794

(22) Filed: Feb. 10, 2015

Related U.S. Application Data

(60) Provisional application No. 62/095,725, filed on Dec. 22, 2014, provisional application No. 62/110,722, filed on Feb. 2, 2015.

(51) Int. Cl.
| | |
|---|---|
| *G06T 7/00* | (2006.01) |
| *G06K 9/32* | (2006.01) |
| *G06K 9/46* | (2006.01) |
| *H04N 1/387* | (2006.01) |

(52) U.S. Cl.
CPC ............ *G06K 9/4633* (2013.01); *G06K 9/3275* (2013.01); *G06K 9/4642* (2013.01); *G06T 7/0085* (2013.01); *H04N 1/3878* (2013.01); *G06T 2207/20021* (2013.01); *G06T 2207/30176* (2013.01)

(58) Field of Classification Search
None
See application file for complete search history.

(56) References Cited

U.S. PATENT DOCUMENTS

| | | | |
|---|---|---|---|
| 2003/0053671 A1* | 3/2003 | Dewaele ................... | G06T 5/40 382/132 |
| 2014/0193096 A1* | 7/2014 | Hasegawa ............. | G06K 9/4633 382/281 |
| 2015/0093028 A1* | 4/2015 | Srebnik ................ | G06K 9/4647 382/170 |
| 2015/0125079 A1* | 5/2015 | Moon ................... | G06K 9/4633 382/190 |
| 2015/0271446 A1* | 9/2015 | Browne .............. | H04L 12/1827 348/14.08 |

OTHER PUBLICATIONS

Madden, Chris, and Robert Mahony. "An ordered list approach to real-time line detection based on the Hough transform." Proceedings of the 2003 Australasian Conference on Robotics and Automation, CD-Rom Proceedings. 2003.*

Priyanka Mukhopadhyay, Bidyut B. Chaudhuri, A survey of Hough Transform, Pattern Recognition, vol. 48, Issue 3, Mar. 2015, pp. 993-1010, ISSN 0031-3203, http://dx.doi.org/10.1016/j.patcog.2014.08.027.*

(Continued)

*Primary Examiner* — Kim Vu
*Assistant Examiner* — Nathan Bloom
(74) *Attorney, Agent, or Firm* — Straub & Pokotylo; Michael P. Straub

(57) ABSTRACT

Methods and apparatus for identifying lines in an image are described. An image to be processed is divided into a plurality of tiles, and processing is performed on a per tile basis. Lines are identified in tiles and a weight is assigned to each line based on among other things, the length of the line. Quantized first and second parameter values, e.g., values defining where lines enters and leave an area, are used in defining the identified lines. A set of lines is selected based on the weight information and output or used in image processing the image including the lines.

18 Claims, 41 Drawing Sheets

(56) References Cited

OTHER PUBLICATIONS

Tsenoglou, T.; Vassilas, N.; Ghazanfarpour, D., "Robust Line Detection in Images of Building Facades using Region-based Weighted Hough Transform," in Informatics (PCI), 2012 16th Panhellenic Conference on , vol., no., pp. 333-338, Oct. 5-7, 2012.*

Gatos, B.; Perantonis, S.J.; Papamarkos, N., "Accelerated Hough transform using rectangular image decomposition," in Electronics Letters , vol. 32, No. 8, pp. 730-732, Apr. 11, 1996 doi: 10.1049/el:19960510.*

George Wolberg, Digital Image Warping (3rd ed.), 1994, p. iv and pp. 52-56, IEEE Computer Society Press, Los Alamitos, CA USA.

* cited by examiner

CONTENTS OF PARAMETER ACCUMULATOR BUFFERS AFTER ACCUMULATION PHASE:

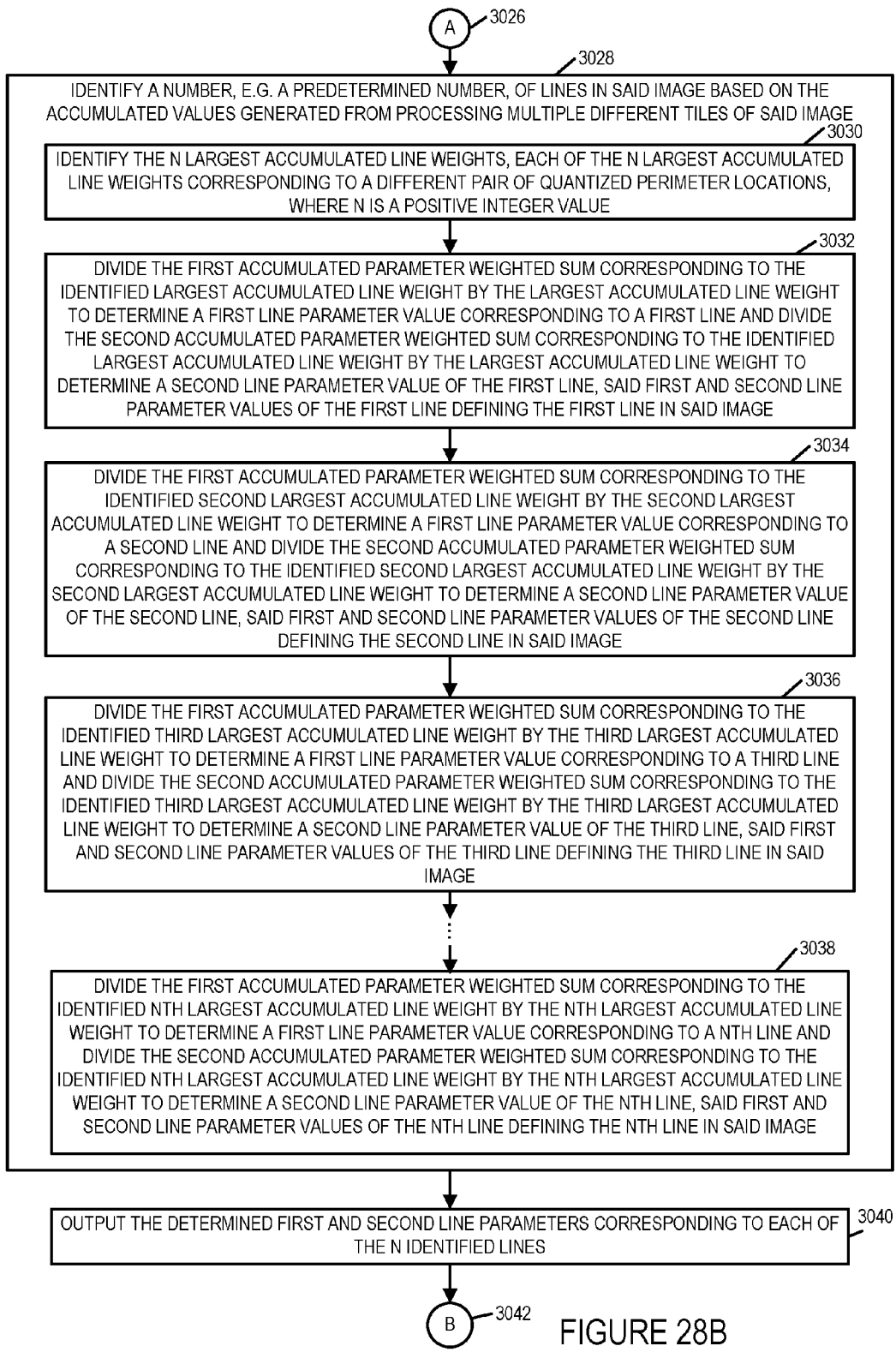

METHODS AND APPARATUS FOR LOCATING LINES IN IMAGES AND USING LOCATED LINES TO MAKE IMAGE ADJUSTMENTS

RELATED APPLICATIONS

The present application claims the benefit of the filing date of U.S. Provisional Application Ser. No. 62/095,725, filed on Dec. 22, 2014 and U.S. Provisional Application Ser. No. 62/110,722, filed on Feb. 2, 2015, each of which is hereby expressly incorporated by reference in its entirety.

FIELD

Various embodiments relate to image processing, and more particularly to detecting lines in images along with their location and/or using located lines to make image modifications, e.g., corrections.

BACKGROUND

Images of rectangular documents such as receipts, pages of text, forms, etc. are often captured, e.g. photographed or scanned, to generate a digital version of the document. Unfortunately, as part of the capture process an image is often distorted with the capture operation producing a non-rectangular quadrilateral image. For viewing and subsequent processing of the image, e.g., for optical character recognition or information extraction purposes, it is often desirable to generate a rectangular image from a non-rectangular quadrilateral image generated from capturing, e.g., photographing or scanning, a rectangular object such as a rectangular paper document.

It is also often desirable to be able to identify the edges of the original captured document in an image produced by a photographing or scanning operation, e.g., to facilitate extraction of information from the image for other purposes such as use in forms and/or for cropping of the generated image to eliminate areas beyond the edges of the original document from the image to thereby better represent the original document as well as reduce data storage requirements by reducing the amount of data required to represent the scanned image by eliminating portions of the output of the capture operation which do not correspond to the original image.

Unfortunately, the technical problem of identifying lines that are potential meaningful with regard to subsequent image processing operations can be difficult given that stray marks and/or small pieces of document content may include what appear to be lines but which may not be significant with regard to a particular desired image processing operation and furthermore storage of information corresponding to identified lines of an image may take up significant memory requirements.

In addition, once lines are identified, there are still technical problems associated with attempts to automate the identification of lines of particular interest, e.g., with respect to identifying boundaries of a scanned document and/or for identifying other features of interest in a scanned document. There are also problems associated with knowing which detected lines should be used for purposes of making image corrections in at least some applications and/or for use in cropping a captured image.

From the above discussion it should be appreciated that there is a need for methods and apparatus which could address one or more of the technical problems associated with line identification in a scanned image, efficient storage of information relating to identified lines, determining borders or edges of an image based on identified lines and/or making image correction operations or performing image cropping operations on scanned documents.

SUMMARY

Methods and apparatus for detecting lines and their locations in an image as well as generating and associating weights for detected lines are described. Methods of storing line information corresponding to an image in an efficient manner are also described. Various features also relate to detecting edges, e.g., borders of a scanned document in an image produced from an image capture operation based on detected line information are described. In at least some embodiments once the borders of a document are identified in an image the image is processed so that the document is transformed from a non-rectangular image to a rectangular image as part of correcting, in an automated manner, image distortions introduced as part of the document capture process.

The methods and apparatus are well suited for addressing various technical problems associated with capturing, e.g., photographing or scanning documents, e.g., to facilitate the extraction of useful information and/or the displaying of the scanned version of the document to a user who may then obtain or use information in the displayed document.

Document border, e.g., edge detection, techniques in some embodiments involve the use of detected lines to identify the edges of a scanned document. The lines used to determine the document edges may be obtained from applying a line detection process to a scanned image, storing information about the detected lines and then using the line information to identify the edges of the document. Once the edges of the document are identified, a correction can, and sometimes is, applied to the document image to covert the image into a rectangular image thereby correcting for distortions that may have been introduced by the image capture process into an image of what was originally a rectangular document.

An exemplary method of identifying lines in an image, in accordance with some embodiments, includes: processing a tile of said image, said processing including: performing a line identification operation on a tile of said image, said line identification operation identifying a line in said tile when a line is present; determining, when said line identification operation identifies a line in said tile of interest: i) a first quantized parameter value used in defining the identified line, and ii) a line weight corresponding to the identified line; and updating, based on the determined line weight, i) an accumulated line weight value corresponding to the determined first quantized parameter value defining the identified line, and ii) a first accumulated parameter weighted sum corresponding to the identified line; and identifying a number of lines in said image based on accumulated values generated from processing multiple different tiles of said image.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 23 is a drawing illustrating a summary of the parameter accumulator arrays including non-zero values after the accumulation phase is completed in accordance with an exemplary embodiment.

FIG. 28B is a second part of the flowchart of an exemplary method of identifying lines in an image in accordance with an exemplary embodiment.

DETAILED DESCRIPTION

Figure 1:
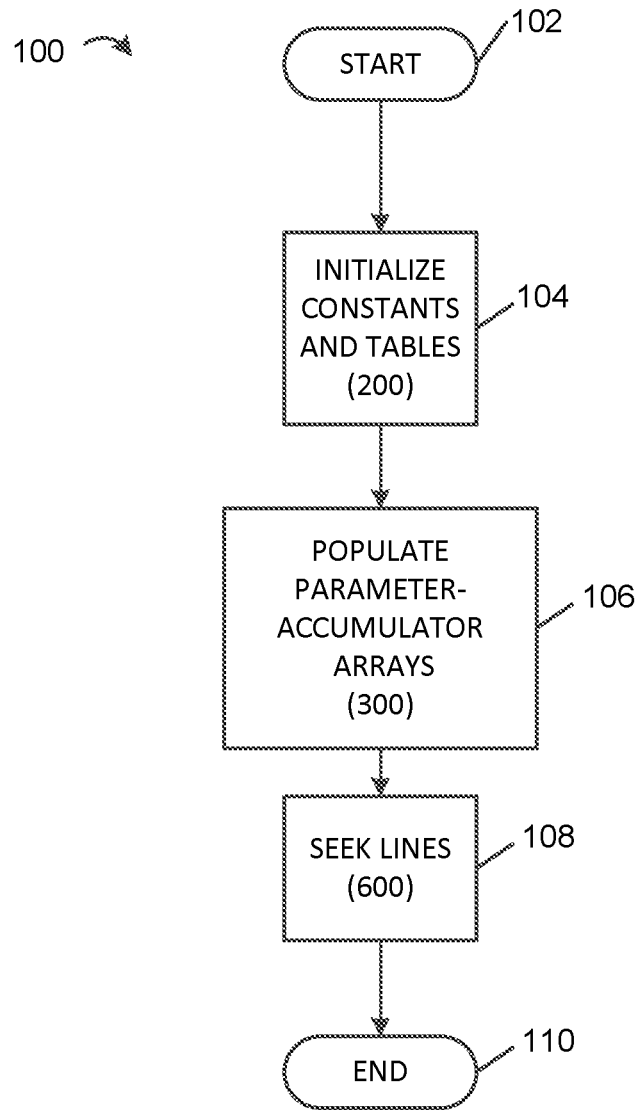
FIG. 1 is a drawing of an exemplary flowchart of a method of identifying lines in an image in accordance with an exemplary embodiment.

FIG. 1 is a drawing of an exemplary flowchart 100 of a method of identifying lines in an image in accordance with an exemplary embodiment. The exemplary method of flowchart 100 of FIG. 1, in some embodiments, is implemented by an exemplary subroutine which may be used for locating and parametrizing several straight lines or edges within a digital image. It is assumed that the image data is organized sequentially in rows, each row consisting of gray-level pixel values.

Operation starts at start step 102, from which execution proceeds to step 104. In step 104, the parameter-accumulator arrays are initialized to all zero values and initialization steps for the local edge-finding module are performed. In some embodiments, step 104 is implemented by subroutine 200, which implements the flowchart of FIG. 2. Operation proceeds from step 104 to step 106.

In step 106, pixel values of the image are analyzed and the parameter-accumulator arrays are populated. In some embodiments, step 106 is implemented by subroutine 300, which implements the flowchart of FIG. 3. Operation proceeds from step 106 to step 108.

In step 108, straight lines are located within the image based on the contents of the parameter-accumulator arrays. In some embodiments, step 108 is implemented by subroutine 600, which implements the flowchart of FIG. 7. Control then transfers to the end step 110 of the procedure.

Figure 2:
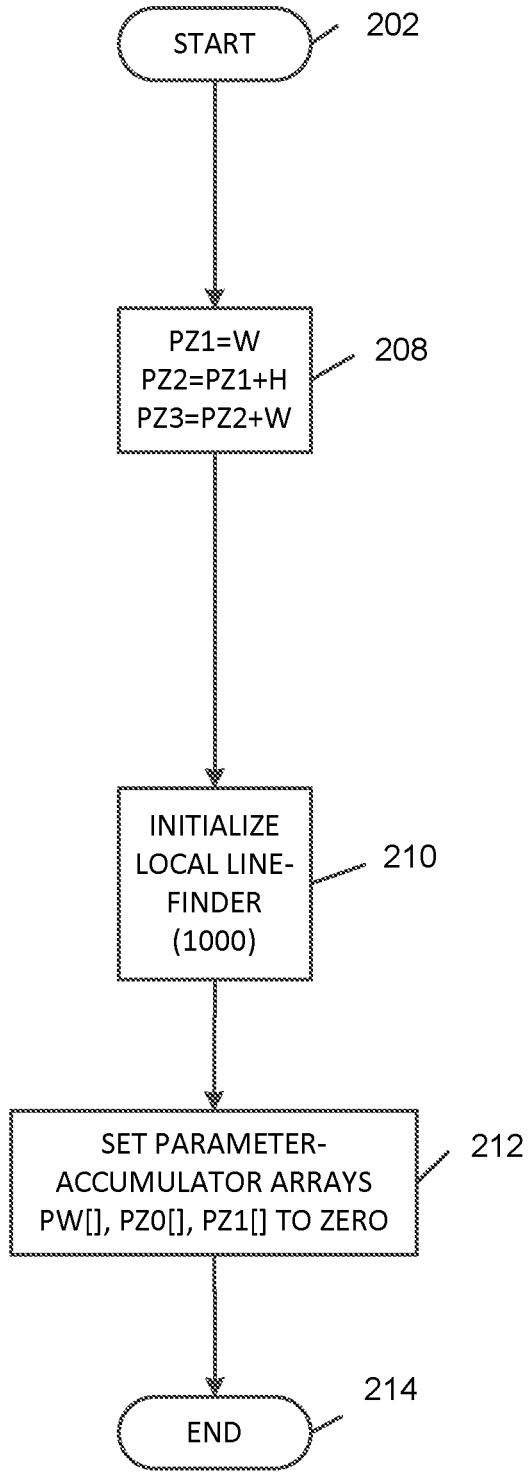
FIG. 2 depicts an exemplary flowchart which may be and in some embodiments of the present invention is used for initializing the local edge-finding module and the parameter-accumulator arrays.

FIG. 2 depicts a flowchart of an exemplary subroutine 200 which may be and in some embodiments of the present invention is used for implementing step 104 of FIG. 1 which initializes the local edge-finding module and the parameter-accumulator arrays. The subroutine starts at start step 202, from which execution proceeds to step 208.

In step 208, the value of PZ1 is set to the image width W. The value of PZ2 is set to the sum of PZ1 and the image height H; in other words, equal to the clockwise distance around the perimeter of the image from the upper-left to the lower-right corner. The value of PZ3 is set to the sum of PZ2 and the image width H; in other words, equal to the clockwise distance around the perimeter of the image from the upper-left to the lower-left corner. Operation proceeds from step 208 to step 210.

In step 210, parameters and tables for the local line finder are initialized. In some embodiments, step 210 is implemented by subroutine 1000, which implements the flowchart of FIG. 9. Operation proceeds from step 210 to step 212.

In step 212, the parameter-accumulator arrays PW, PZ0, and PZ1 are initialized with all values set to zero. Control then transfers to the end step 214 of the procedure.

Figure 3:
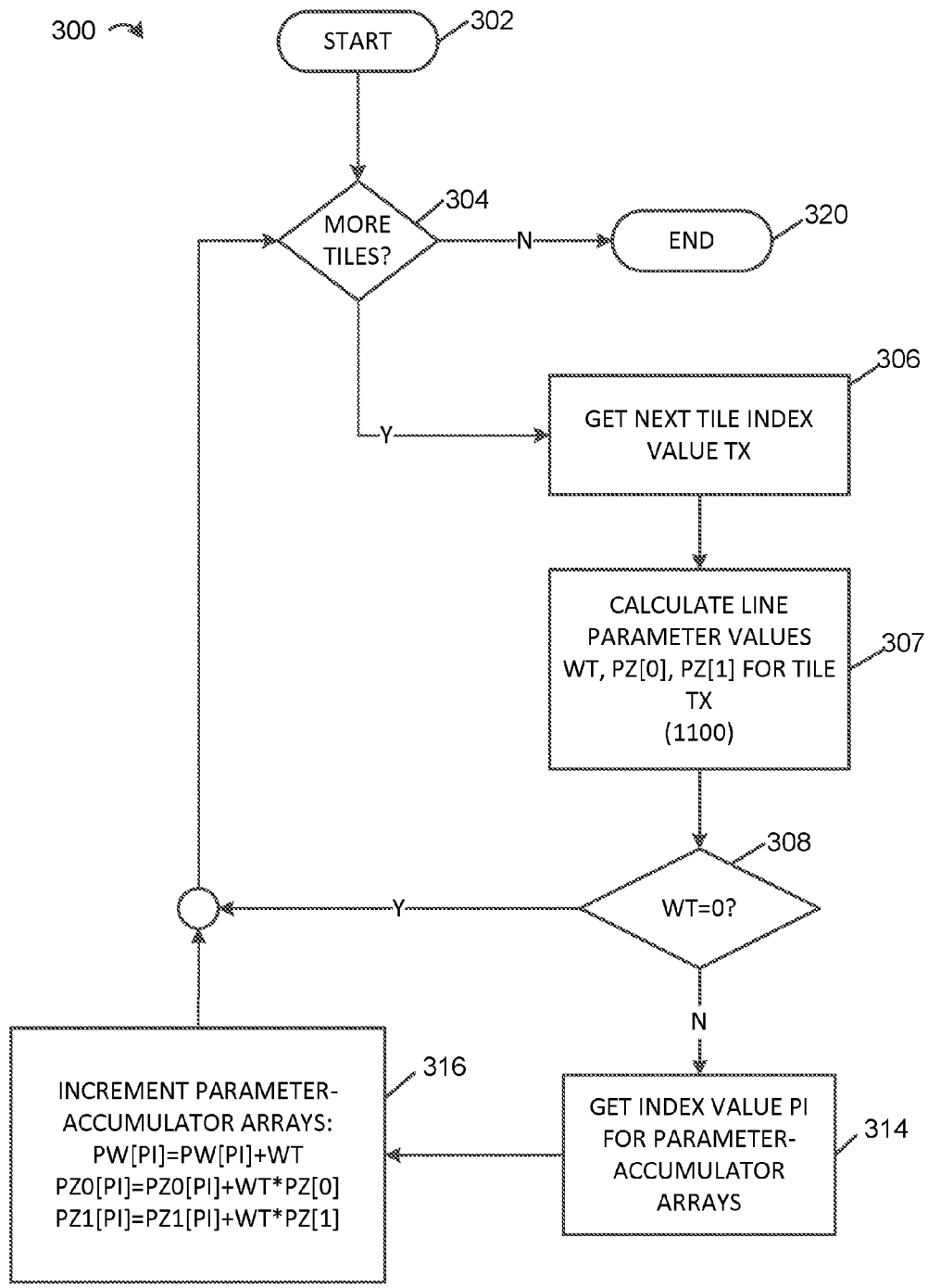
FIG. 3 illustrates a flowchart of an exemplary method of processing image tiles to populate accumulator arrays in accordance with an exemplary embodiment.

FIG. 3 depicts a flowchart of an exemplary subroutine 300 which may be and in some embodiments of the present invention is used for implementing step 106 of FIG. 1 which populates the parameter-accumulator arrays. The subroutine 300 starts at start step 302, from which execution proceeds to step 304. In step 304 a decision is made as to whether more tiles of the image remain to be processed. If not, then control proceeds to the end step 320 of the procedure. Otherwise, control transfers to step 306.

In step 306, the index value for the next tile not yet processed is determined. Tiles may be processed in any order, so long as each tile is processed exactly once.

In step 307, the local line finder is used to determine line parameter values PZ[0] and PZ[1], which indicate the points where the line for the tile intersects the image perimeter, and a line-weight value WT. In some embodiments, step 307 is implemented by subroutine 1100, which implements the flowchart of FIG. 4. Operation proceeds from step 307 to step 308.

In step 308 the line-weight value WT is examined. If the value of WT is zero, no further processing is done for this tile and control transfers to step 304. Otherwise, control transfers to step 314.

In step 314, the index value PI for the parameter-accumulator arrays is obtained by determining which perimeter segment contains each line endpoint. PI consists of the pair of segment index values. Operation proceeds from step 314 to step 316.

In step 316, the parameter-accumulator arrays are modified at the index location indicated by PI. The array PW is modified by the addition of the value PW at location PI. The array PZ0 is modified by the addition of the product of the value PW and the value PZ[0] at location PI. The array PZ1 is modified by the addition of the product of the value PW and the value PZ[1] at location PI. Control then transfers to the next tile at step 304.

Figure 4:
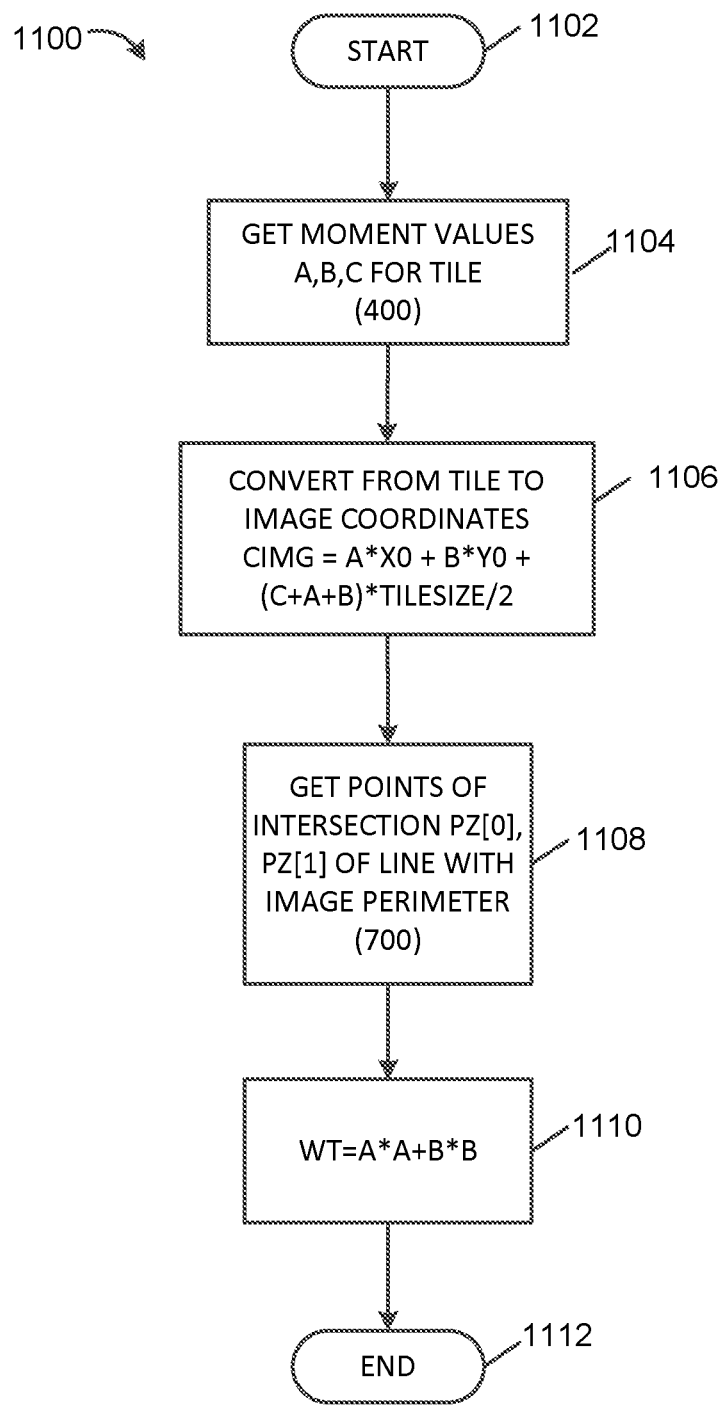
FIG. 4 illustrates a flowchart of an exemplary method of calculating line parameter values WT, PZ[0] and PZ[1] for an image tile in accordance with an exemplary embodiment.

FIG. 4 depicts a flowchart of an exemplary subroutine 1100 which may be and in some embodiments of the present invention is used for implementing step 307 of FIG. 3 which calculates the line parameter values WT, PZ[0], and PZ[1] for a particular image tile. The procedure starts at start step 1102, from which execution proceeds to step 1104. In step 1104 specialized moment values A, B, C are calculated from the pixel values in the tile which describe the equation of the line within the tile in the form $A*X+B*Y=C$. In some embodiments, step 1104 is implemented by subroutine 400, which implements the flowchart of FIG. 5. Operation proceeds from step 1104 to step 1106.

In step 1106 the equation of the line is converted to coordinates representing the entire image rather than a single tile by calculating the value CIMG as $A*X0+B*Y0+(C+A+B)$

*TILESIZE/2, where TILESIZE is the number of rows or columns of pixels in a tile. Operation proceeds from step 1106 to step 1108.

In step 1108 the points of intersection PZ[0] and PZ[1] of the line with the image perimeter are calculated. These can be represented, for example, as the distance measured clockwise around the perimeter from the upper-left corner of the image. These two numbers suffice to specify the position of the line. Note, however, that many alternative parametrizations of the line are possible and can be used in this context. In some embodiments, step 1108 is implemented by subroutine 700, which implements the flowchart of FIG. 6. Operation proceeds from step 1108 to step 1110.

In step 1110 the line weight WT is calculated as A*A+B*B. This is convenient to use in connection with the moment-based local line detector, but other measures of line weight can be used with other local line-detection methods. Even with the moment-based local line detector, other measures of line weight such as |A|+|B| or max(|A|,|B|) could be used. In various embodiments, the line weight conveys a sense of the prominence of the line in terms of length, contrast, and/or straightness. Control then transfers to the end step 1112 of the procedure.

Figure 5:
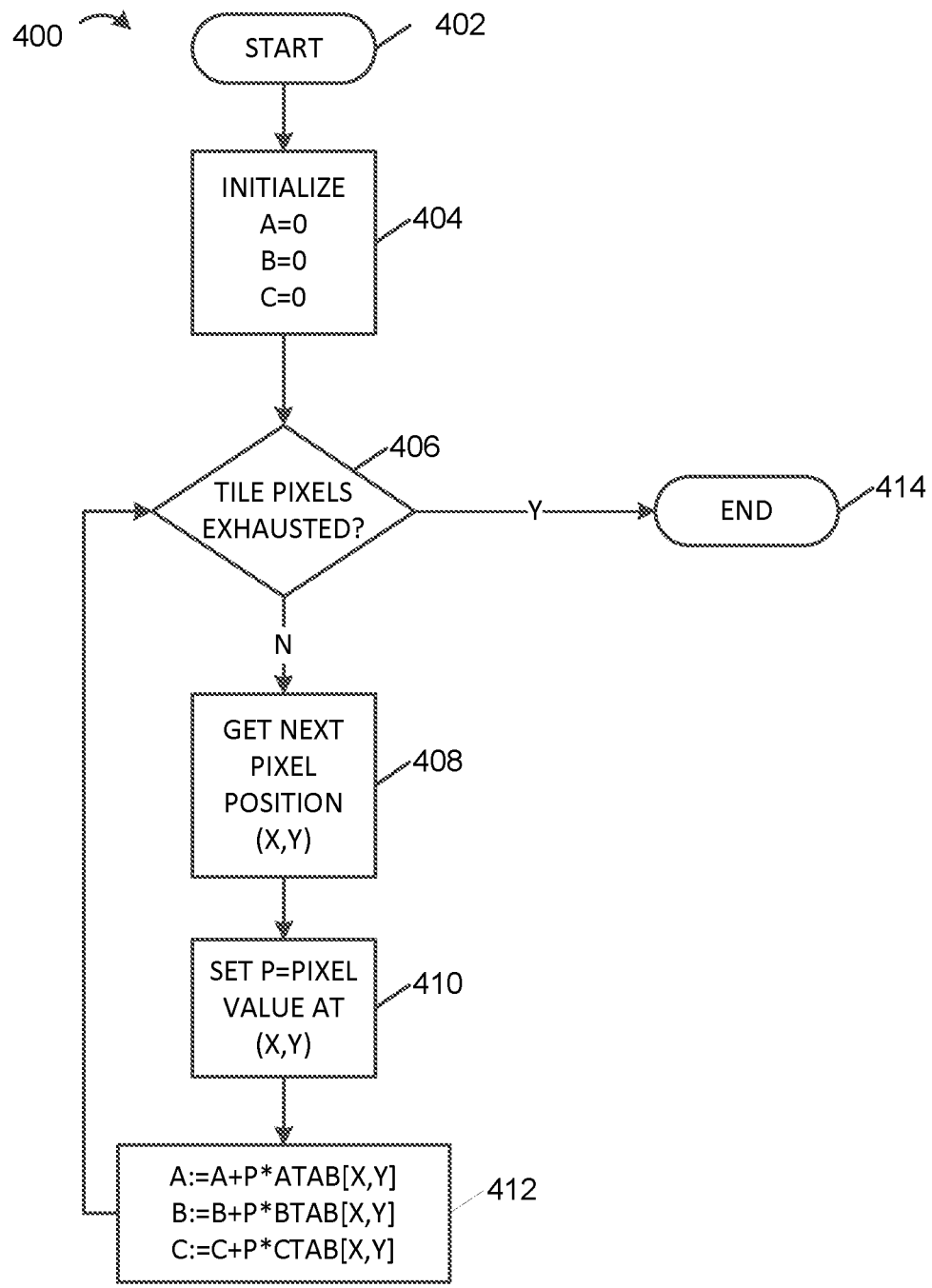
FIG. 5 illustrates a flowchart of an exemplary method of obtaining moment values A, B, C, corresponding to a line, for an image tile, in accordance with an exemplary embodiment.

FIG. 5 depicts a flowchart of an exemplary subroutine 400 which may be and in some embodiments of the present invention is used for implementing step 1104 of FIG. 4 which calculates the specialized moment values A, B, C are calculated from the pixel values in the tile. These moment values will describe a linear structure found within the tile by an equation of the form A*X+B*Y=C.

The procedure starts at start step 402, from which execution proceeds to step 404. In step 404 the moment values A,B,C are initialized to zero. Control then transfers to decision step 406, which checks whether any pixels within the tile remain to be processed. If there are not any remaining pixels in the tile to be processed then control transfers to the end step 414 of the procedure. Otherwise, control transfers to step 408. Note that the pixels of the tile can be processed in any order, so long as each pixel is processed exactly once.

In step 408, the coordinates (X,Y) of the pixel relative to the tile are determined. Operation proceeds from step 408 to step 410. In step 410 P is set to the pixel value at the location (X,Y) within the tile. Operation proceeds from step 410 to step 412.

In step 412, the moment values A,B,C are modified by addition of the pixel value P multiplied by previously tabulated values ATAB[X,Y], BTAB[X,Y], CTAB[X,Y]. Control then transfers to decision step 406.

Figure 6:
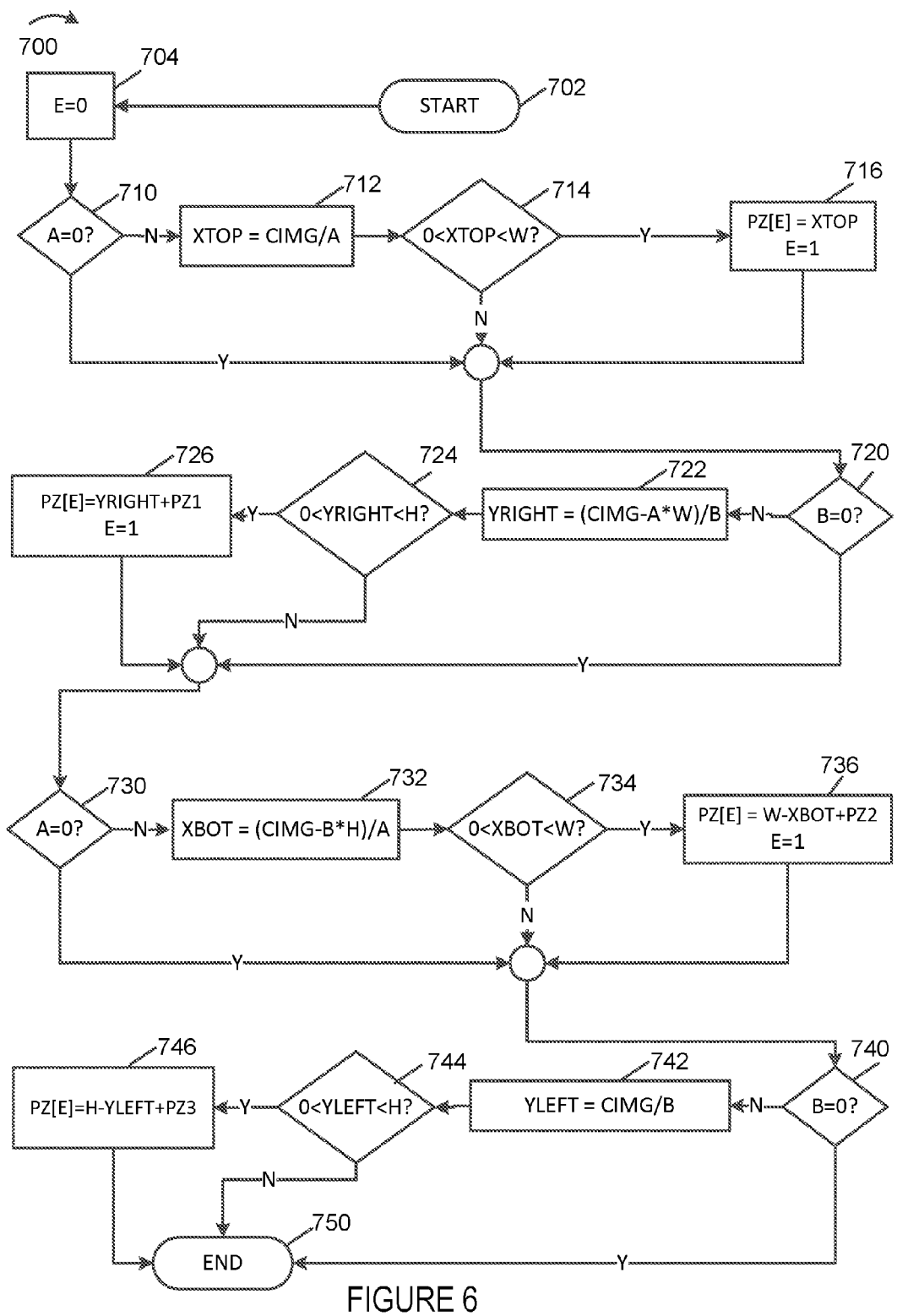
FIG. 6 illustrates a flowchart of an exemplary method of obtaining points of intersection PZ[0] and PZ[1] with an image perimeter in accordance with an exemplary embodiment.

FIG. 6 depicts a flowchart of an exemplary subroutine 700 which may be and in some embodiments of the present invention is used for implementing step 1108 of FIG. 4 which finds the points of intersection of the given line with the image perimeter, in terms of the distances measured clockwise from the upper-left corner of the image. The procedure starts at start step 702, from which execution proceeds to step 704. In step 704 the point index E is set to zero. This index takes the value 0 when the first point of intersection of the line with the image perimeter is under consideration and takes the value 1 when the second point of intersection is under consideration.

Note that the line is described by the equation A*X+B*Y=CIMG, where X is taken to range from 0 on the left edge of the image to 1 on the right edge, and Y is taken to range from 0 on the top edge of the image to 1 on the bottom. Operation proceeds from step 704 to step 710.

Step 710 is the first of four steps seeking a possible point of intersection of the line with the top edge of the image (characterized as Y=0). In decision step 710, the value of A is checked. If the value of A is zero, no intersection of the line with the top edge is possible, and control is transferred to step 720. Otherwise control is transferred to step 712, wherein XTOP (the X-coordinate of the intersection of the line with the top image edge) is calculated as XTOP=CIMG/A. In decision step 714, the value of XTOP is checked to see whether it falls within the bounds of 0 and the image width W. If not, then the line does not intersect the top edge of the image, and control transfers to step 720. Otherwise, control is transferred to step 716, wherein the value of PZ[E] is set to XTOP, and the edge index E is set to 1, so that henceforth the second intersection point is under consideration.

Step 720 is the first of four steps seeking a possible point of intersection of the line with the right edge of the image (characterized as X=1). In decision step 720, the value of B is checked. If the value of B is zero, no intersection of the line with the right edge is possible, and control is transferred to step 730. Otherwise control is transferred to step 722, wherein YRIGHT (the Y-coordinate of the intersection of the line with the right image edge) is calculated as YRIGHT=(CIMG−A*W)/B. In decision step 724, the value of YRIGHT is checked to see whether it falls within the bounds of 0 and the image height H. If not, then the line does not intersect the right edge of the image, and control transfers to step 730. Otherwise, control is transferred to step 726, wherein the value of PZ[E] is set to YRIGHT+PZ1, and the edge index E is set to 1, so that henceforth the second intersection point is under consideration (if both intersection points have already been located, further processing in this procedure has no effect).

Step 730 is the first of four steps seeking a possible point of intersection of the line with the bottom edge of the image (characterized as Y=H). In decision step 730, the value of A is checked. If the value of A is zero, no intersection of the line with the bottom edge is possible, and control is transferred to step 740. Otherwise control is transferred to step 732, wherein XBOT (the X-coordinate of the intersection of the line with the bottom image edge) is calculated as XBOT=(CIMG−B*H)/A. In decision step 734, the value of XBOT is checked to see whether it falls within the bounds of 0 and the image width W. If not, then the line does not intersect the bottom edge of the image, and control transfers to step 740. Otherwise, control is transferred to step 736, wherein the value of PZ[E] is set to XBOT, and the edge index E is set to 1, so that henceforth the second intersection point is under consideration (if both intersection points have already been located, further processing in this procedure has no effect).

Step 740 is the first of four steps seeking a possible point of intersection of the line with the left edge of the image (characterized as X=0). In decision step 740, the value of B is checked. If the value of B is zero, no intersection of the line with the left edge is possible, and control is transferred to the end step 750 of the procedure. Otherwise control is transferred to step 742, wherein YLEFT (the Y-coordinate of the intersection of the line with the left image edge) is calculated as YLEFT=CIMG/B. In decision step 744, the value of YLEFT is checked to see whether it falls within the bounds of 0 and the image height H. If not, then the line does not intersect the left edge of the image, and control transfers to the end step 750 of the procedure. Otherwise, control is transferred to step 746, wherein the value of PZ[E] is set to H−YLEFT+PZ3.

Figure 7:
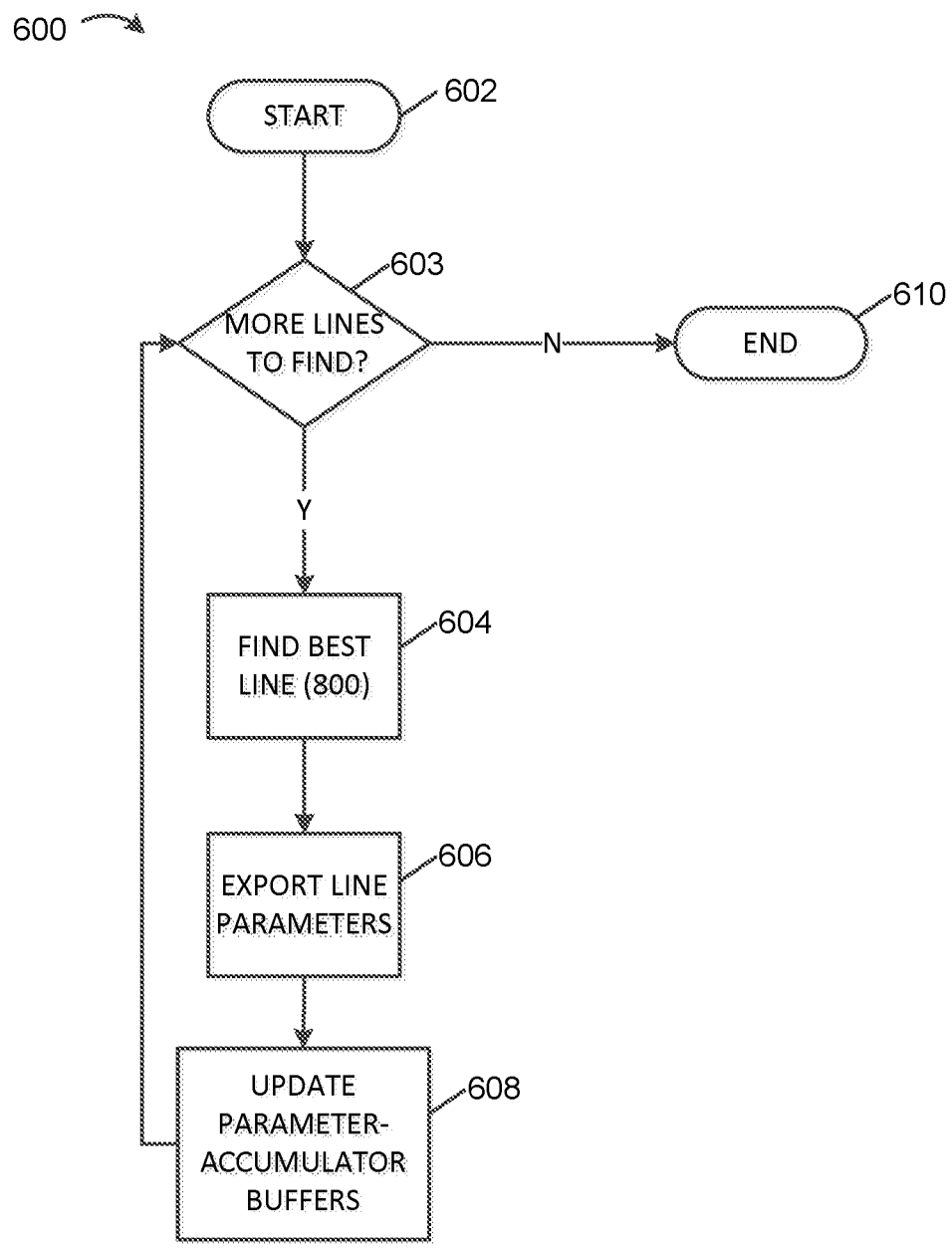
FIG. 7 illustrates a flowchart of an exemplary of method of identifying lines in an image, e.g., a set of N lines corresponding to highest accumulated line weight values, in accordance with an exemplary embodiment.

FIG. 7 depicts a flowchart of an exemplary subroutine 600 which may be and in some embodiments of the present invention is used for implementing step 108 of FIG. 1 which analyzes the parameter-accumulator arrays to find the most prominent lines in the image. The procedure starts at start step 602, from which execution proceeds to decision step 603. In step 603 a criterion in applied to decide whether to continue seeking lines. This may be based, for example, on the number of lines already found, or based on the properties of lines already found. If no more lines are to be sought, control transfers to the end step 610 of the procedure. Otherwise control transfers to step 604.

In step 604, the most prominent line, sometimes referred to as best line, not yet identified is found. In some embodiments, step 604 is implemented by subroutine 800, which implements the flowchart of FIG. 8. Operation proceeds from step 604 to step 606. In step 606, the parameters describing this line are exported to the module which will perform subsequent analysis. Operation proceeds from step 606 to step 608. In step 608, the parameter-accumulator buffer PW is modified by setting the value at the location PI corresponding to the identified to zero. This precludes finding the same line more than once. Control is then transferred to step 603.

Figure 8:
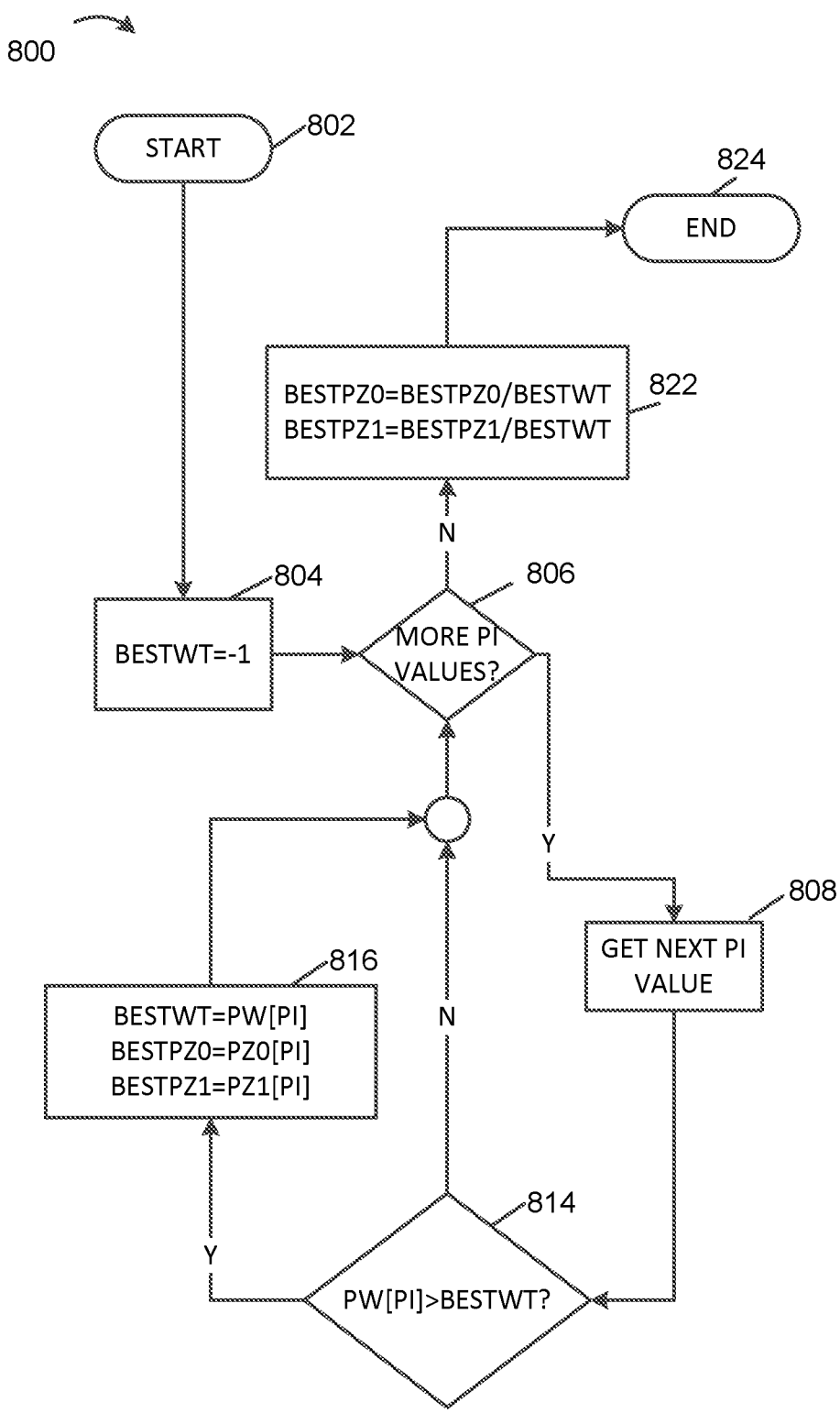
FIG. 8 illustrates a flowchart of an exemplary method of finding the best line in an image, using parameter accumulated buffers, in accordance with an exemplary embodiment.

FIG. 8 depicts a flowchart of an exemplary subroutine 800 which may be and in some embodiments of the present invention is used for implementing step 604 of FIG. 7 which analyzes the parameter-accumulator arrays to find the most prominent lines in the image. The goal of this procedure is to identify the line whose weight value as stored in the parameter-accumulator array PW is largest. The procedure starts at start step 802, from which execution proceeds to step 804. In step 804, the value of BESTWT is set to $-1$. This value will increase as successively higher values of PW are encountered. Operation proceeds from step 804 to step 806.

In decision step 806, the parameter index value PI is checked to determine whether additional values remain to be examined. If there are not additional values remaining to be examined then control transfers to step 822. Otherwise control transfers to step 808, wherein the next PI value to be examined is determined.

From step 808, control transfers to decision step 814, wherein the value of PW[PI] is compared against the current value of BESTWT. If PW[PI] exceeds BESTWT, then the current line weight exceeds the previous maximum and control transfers to step 816. Otherwise control transfers to step 806.

In step 816, the value of BESTWT is updated to equal the new maximum PW[PI]. Also BESTPZ0 is set to PZ0[PI] and BESTPZ1 is set to PZ1[PI]. Control then transfers to step 806.

In step 822, the values of BESTPZ0 and BESTPZ1 are converted to weighted averages by dividing by BESTWT. Control then transfers to the end step 824 of the procedure.

Figure 9:
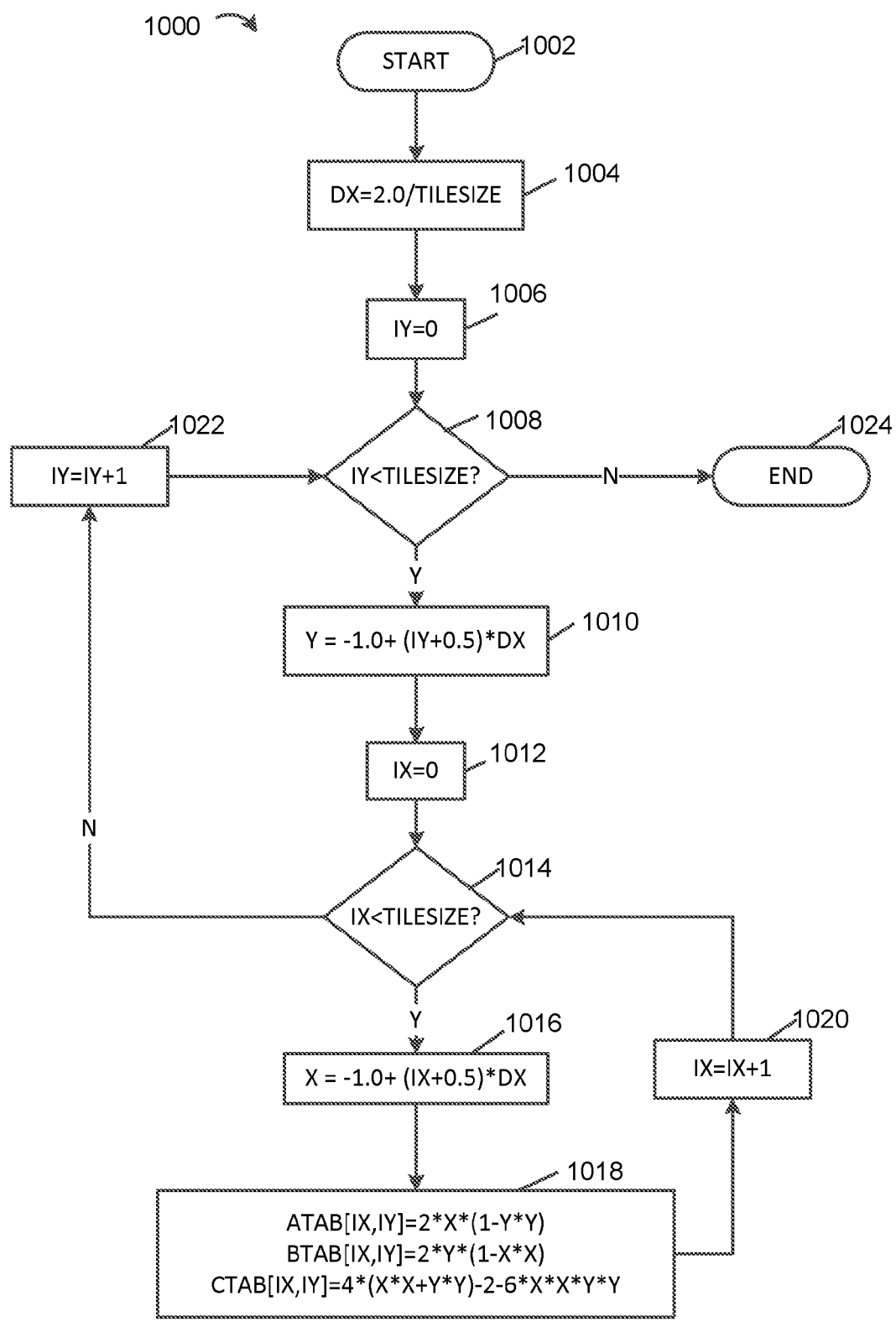
FIG. 9 illustrates a flowchart of an exemplary method of initializing a local line finder, which locates a line within an image tile, in accordance with an exemplary embodiment.

FIG. 9 depicts a flowchart of an exemplary subroutine 1000 which may be and in some embodiments of the present invention is used for implementing step 210 of FIG. 2 which initializes the tables to be used for calculating moment values A,B,C. The procedure starts at start step 1002, from which execution proceeds to step 1004. In step 1004, variable DX is set to 2.0/TILESIZE, where TILESIZE is the number of rows or columns in a tile.

In step 1006, index IY is initialized to 0 in preparation for looping over all rows of a tile. In decision step 1008, the value of IY is compared against TILESIZE. If IY is less than TILESIZE, rows of the tile remain to be processed and control transfers to step 1010. Otherwise control transfers to the end step 1024 of the procedure.

In step 1010, coordinate value Y is calculated by the formula Y=$-1.0+$(IY+0.5)*DX, so that theoretical values of Y range from $-1$ to $1$ from the top to the bottom of the tile.

In step 1012, index IX is initialized to 0 in preparation for looping over all pixels of a row. In decision step 1014, the value of IX is compared against TILESIZE. If IX is less than TILESIZE, pixels of the row of the tile remain to be processed and control transfers to step 1016. Otherwise control transfers to the step 1022 in preparation for processing the next row of the tile.

In step 1016 X is calculated using the formula X=$-1.0+$(IX+0.5)*DX. Operation proceeds from step 1016 to step 1018. In step 1018, values of moment functions are calculated and stored in accordance with the theory of edge parametrization by moments, using the formulas ATAB[IX,IY]=2*X*(1$-$Y*Y), BTAB[IX,IY]=2*Y*(1$-$X*X), and CTAB[IX,IY]=4*(X*X+Y*Y)$-$2$-$6*X*X*Y*Y. Control then transfers to step 1020, wherein the value of IX is incremented in preparation for processing the next pixel of the row.

In step 1022, the value of IY is incremented in preparation for processing the next row of the tile. Control then transfers to decision step 1008.

Figure 10:
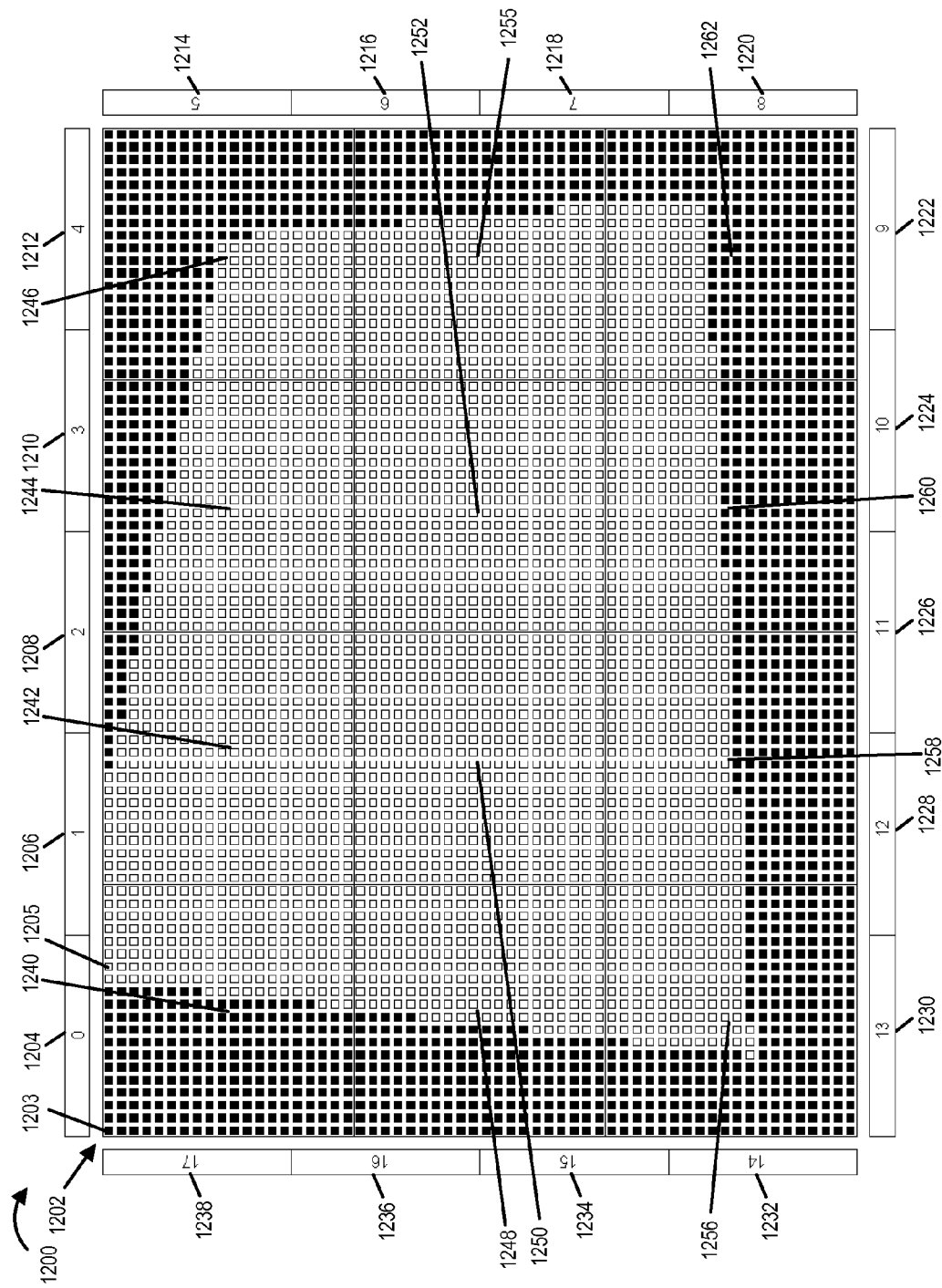
FIG. 10 is a drawing of an exemplary image which may be processed to identify a set of lines, in accordance with an exemplary embodiment, the exemplary image including a set of image tiles and being surrounded by indexed perimeter segments.
Figure 27:
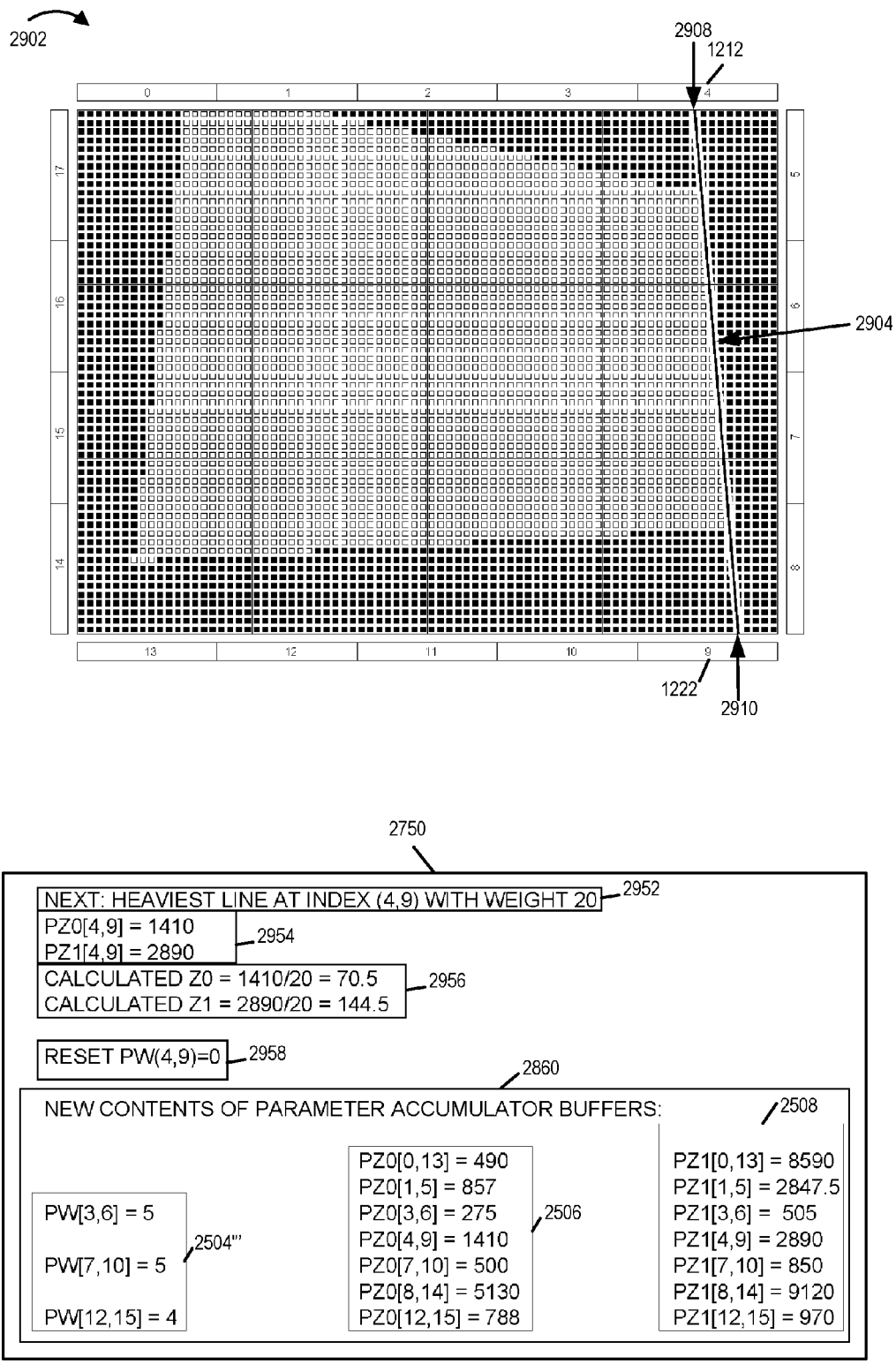
FIG. 27 illustrates an exemplary fourth identified line, e.g., corresponding to the fourth largest accumulated line weight value, of the processed image, steps used in determining the line, input data, intermediate data, output results, and updates to the accumulator arrays in accordance with an exemplary embodiment.
Figures 28, 28A:
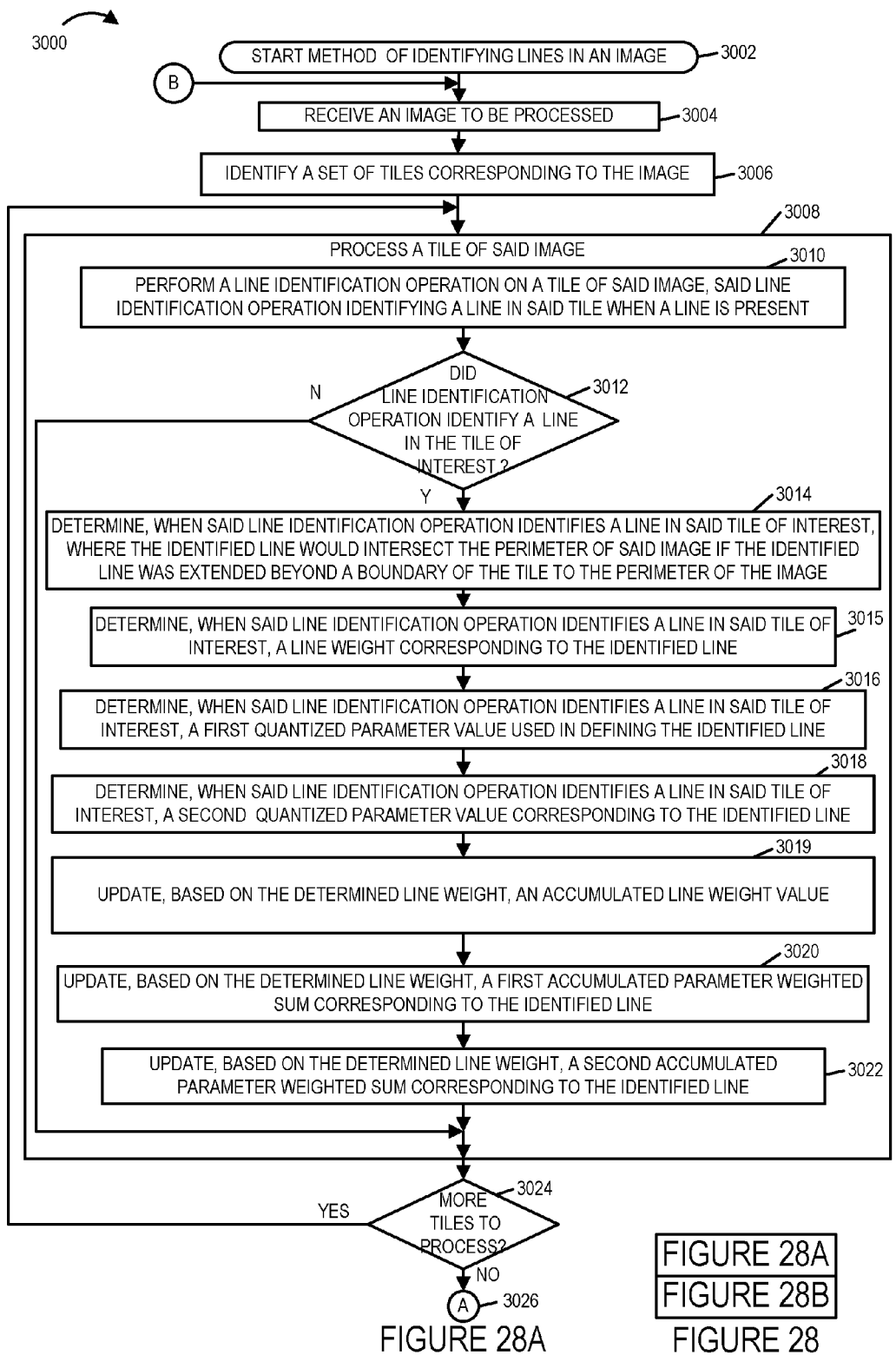
FIG. 28A is a first part of a flowchart of an exemplary method of identifying lines in an image in accordance with an exemplary embodiment.

FIGS. 10-27 are used to illustrate an example of an exemplary method, e.g., the method of flowchart 100 of FIG. 10 and/or the method of flowchart 3000 of FIG. 28.

FIG. 10 is a drawing 1200 illustrating an exemplary image 1202 surrounded by indexed image perimeter segments (perimeter segment 0 1204, perimeter segment 1 1206, perimeter segment 2 1208, perimeter segment 3 1210, perimeter segment 4 1212, perimeter segment 5 1214, perimeter segment 6 1216, perimeter segment 7 1218, perimeter segment 8 1220, perimeter segment 9 1222, perimeter segment 10 1224, perimeter segment 11 1226, perimeter segment 12 1228, perimeter segment 13 1230, perimeter segment 14 1232, perimeter segment 15 1234, perimeter segment 16 1236, perimeter segment 17 1238). The exemplary image 1202 includes 12 indexed image tiles (image tile(1) 1240, image tile(2) 1242, image tile(3) 1244, image tile(4) 1246, image tile(5) 1248, image tile(6) 1250, image tile(7) 1252, image tile(8) 1255, image tile(9) 1256, image tile(10) 1258, image tile(11) 1260, image tile(12) 1262). Thus, tile index value TX=1, . . . , 12. The image 1202 is processed in accordance with the present invention to identify lines in the image. In this example the exemplary image 1202 is 80 pixels×60 pixels; therefore image width W=80 and image height H=60. In this example, an exemplary image tile, e.g., tile 1 1240, is 20 pixels×20 pixels; therefore TILESIZE=20. In this example, an exemplary perimeter segment, e.g., perimeter segment 1 1206 is 16 pixels wide. As shown segments are 16 pixels wide in the horizontal direction but are 15 pixels high in the vertical direction. It should need not be, but maybe, equal in length and height. Exemplary pixel 1203 and exemplary pixel 1205 are pixels included in image tile 1 1240 of image 1202.

Constants and tables are initialized based on the image dimensions (W, H) and tile size (TILESIZE), e.g., step 104 of flowchart 100 of FIG. 1 is performed. The parameter accumulator arrays are populated, e.g., step 106 of flowchart 100 is performed. FIGS. 11-22 correspond to the processing of tiles corresponding to FIG. 3.

Figure 11:
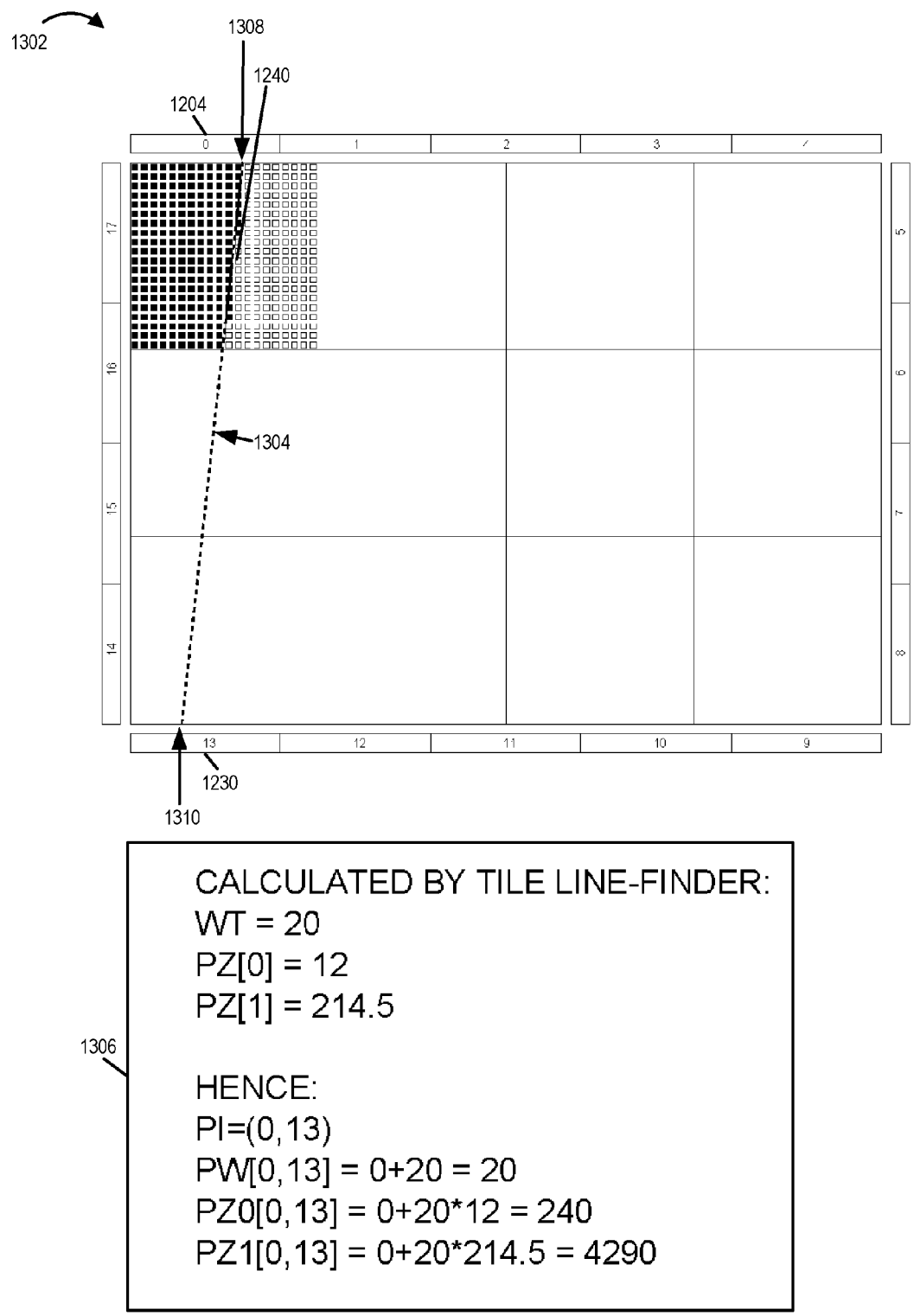
FIG. 11 is a drawing illustrating a first image tile of the exemplary image, processing of the first image tile to find a line, identification of perimeter index values corresponding to the line, and updating of parameter accumulator arrays in accordance with an exemplary embodiment.

FIG. 11 includes a drawing 1302 illustrating tile (TX=1) 1240 of image 1202 which is processed, a line 1304 which is found and determined results 1306. Results 1306 include calculated line parameter values WT, PZ[0] and PZ[1] for tile(TX=1) 1240, corresponding to step 307. It should be noted that the line 1304 which is found in tile(1) 1240 has been extended to the boundaries of the image and intersects perimeter segment 0 1204 and perimeter segment 13 1230. The tile line finder calculates that for tile(1): weight WT=20; first line intersection point with perimeter PZ[0]=12 as indicated by arrow 1308, and second line intersection point with point perimeter PZ[1]=214.5, as indicated by arrow 1310. Hence, PI=(0,13) since the line intersects perimeter segments 0 and 13; PW[0,13]=0+20=20; PZ0[0,13]=0+20*12=240;

and PZ1[0,13]=0+20*214.5=4290, in accordance with an iteration of step 316 in which parameter accumulator arrays with index value PI=(0,13) are incremented.

Figure 12:
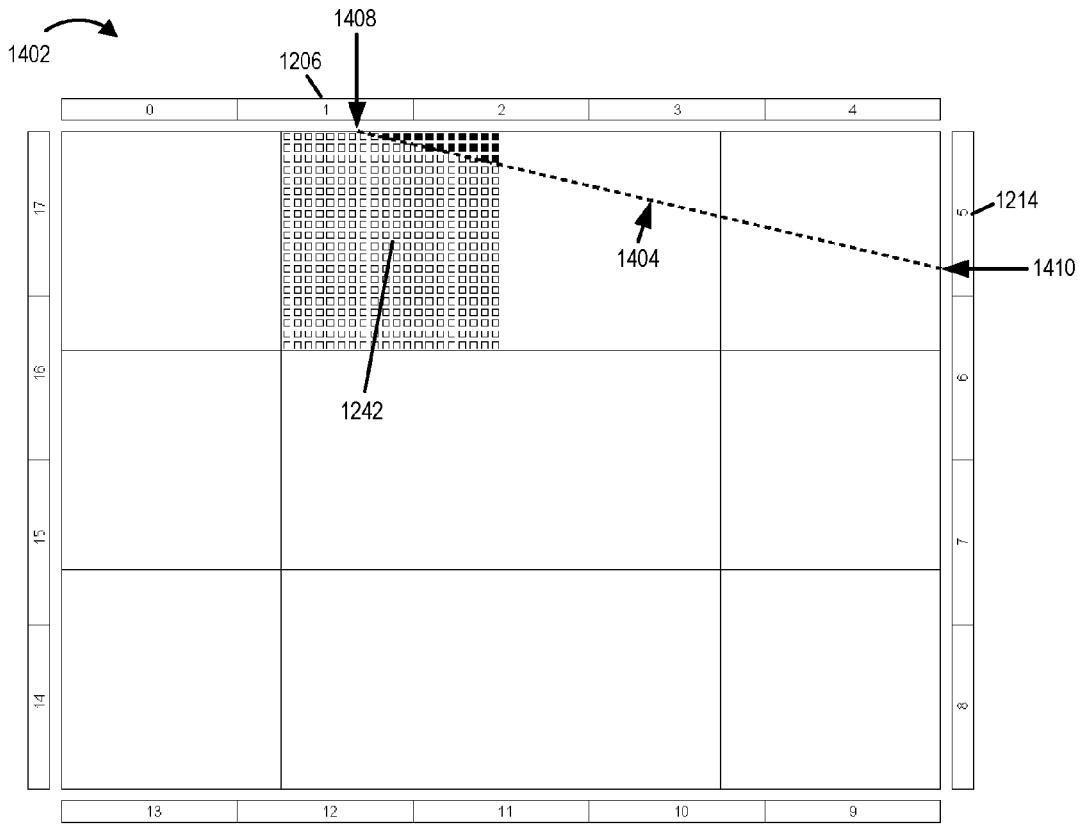
FIG. 12 is a drawing illustrating a second image tile of the exemplary image, processing of the second image tile to find a line, identification of perimeter index values corresponding to the line, and updating of parameter accumulator arrays in accordance with an exemplary embodiment.

FIG. 12 includes a drawing 1402 illustrating tile(2) 1242 of image 1202 which is processed, a line 1404 which is found and determined results 1406. Results 1406 include calculated line parameter values WT, PZ[0] and PZ[1] for tile(TX=2) 1242, corresponding to step 307. It should be noted that the line 1404 which is found in tile(2) 1242 has been extended to the boundaries of the image and intersects perimeter segment 1 1206 and perimeter segment 5 1214. The tile line finder calculates that for tile(2): weight WT=11; first line intersection point with perimeter PZ[0]=27 as indicated by arrow 1408, and second line intersection point with point perimeter PZ[1]=92.5, as indicated by arrow 1410. Hence, PI=(1,5) since the line intersects perimeter segments 1 and 5; PW[1, 5]=0+11=11; PZ0[1,5]=0+11*27=297; and PZ1[1,5]=0+11*92.5=1017.5, in accordance with an iteration of step 316 in which parameter accumulator arrays with index value PI=(1,5) are incremented.

Figure 13:
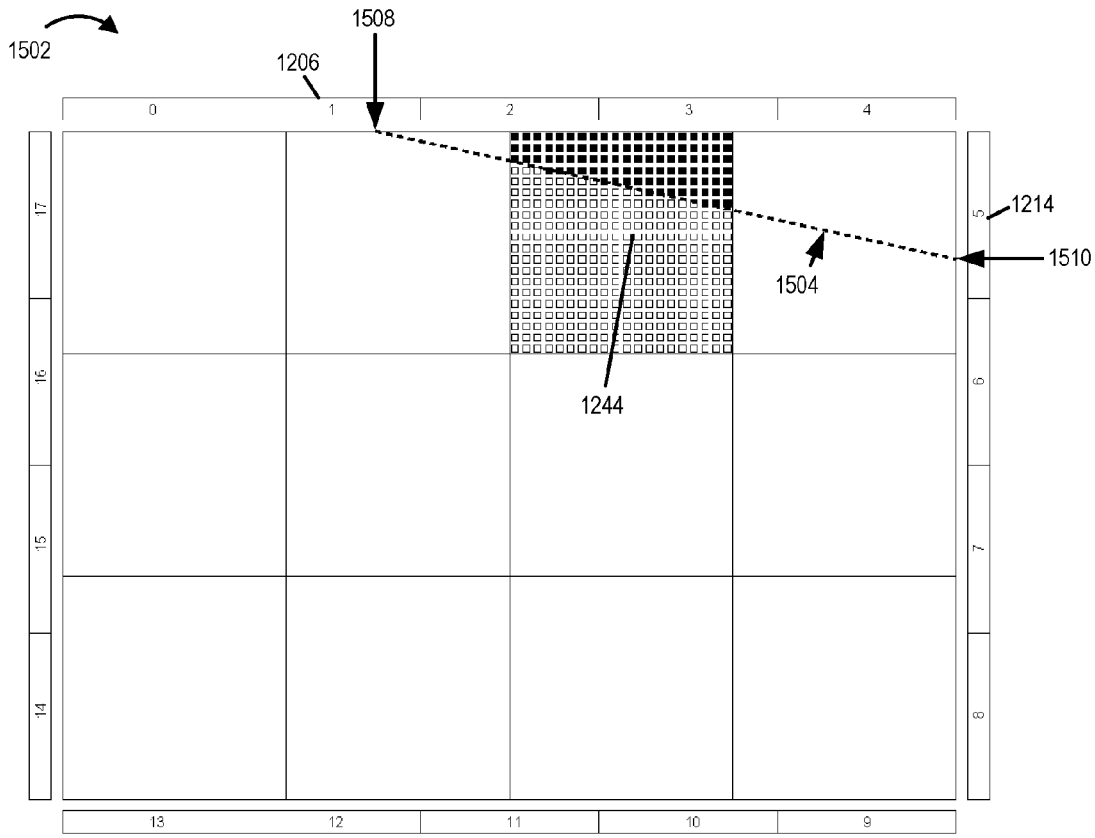
FIG. 13 is a drawing illustrating a third image tile of the exemplary image, processing of the third image tile to find a line, identification of perimeter index values corresponding to the line, and updating of parameter accumulator arrays in accordance with an exemplary embodiment.

FIG. 13 includes a drawing 1502 illustrating tile(3) 1244 of image 1202 which is processed, a line 1504 which is found and determined results 1506. Results 1506 include calculated line parameter values WT, PZ[0] and PZ[1] for tile(TX=3) 1244, corresponding to step 307. It should be noted that the line 1504 which is found in tile(3) 1244 has been extended to the boundaries of the image and intersects perimeter segment 1 1206 and perimeter segment 5 1214. The tile line finder calculates that for tile(3): weight WT=20; first line intersection point with perimeter PZ[0]=28 as indicated by arrow 1508, and second line intersection point with point perimeter PZ[1]=91.5, as indicated by arrow 1510. Hence, PI=(1,5) since the line intersects perimeter segments 1 and 5; PW[1, 5]=11+20=31; PZ0[1,5]=297+20*28=857; and PZ1[1,5]=1017.5+20*91.5=2847.5, in accordance with an iteration of step 316 in which parameter accumulator arrays with index value PI=(1,5) are incremented.

Figure 14:
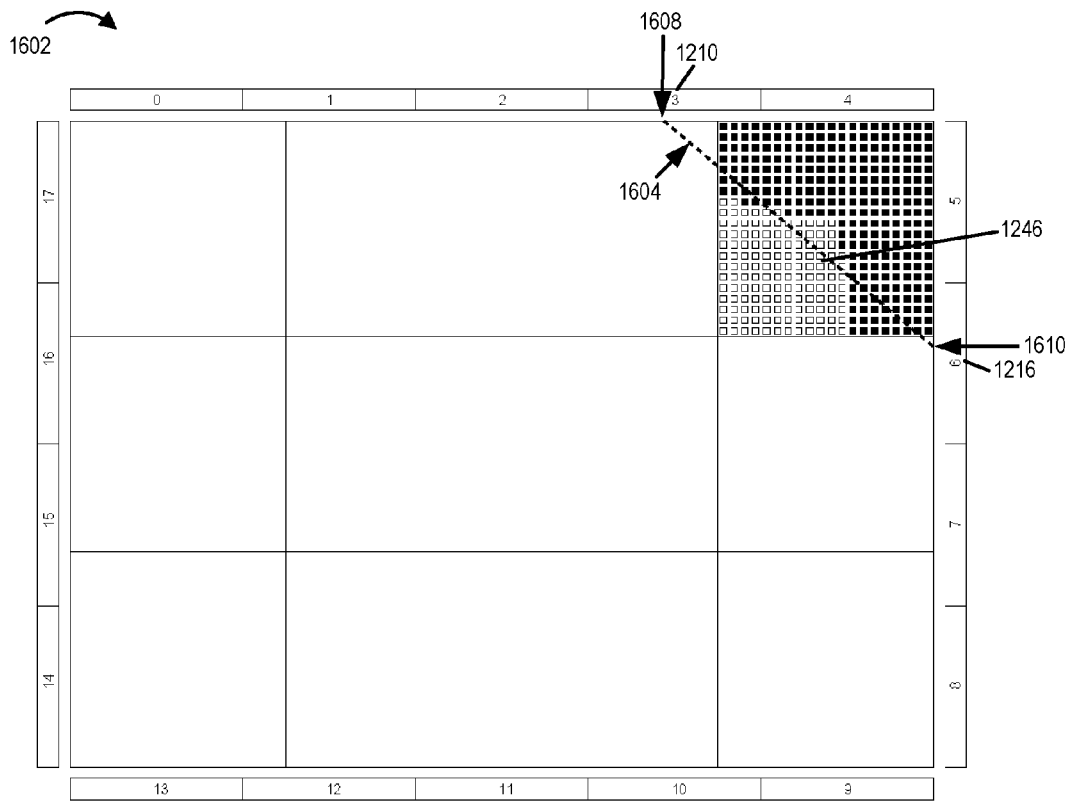
FIG. 14 is a drawing illustrating a fourth image tile of the exemplary image, processing of the fourth image tile to find a line, identification of perimeter index values corresponding to the line, and updating of parameter accumulator arrays in accordance with an exemplary embodiment.

FIG. 14 includes a drawing 1602 illustrating tile(4) 1246 of image 1202 which is processed, a line 1604 which is found and determined results 1606. Results 1606 include calculated line parameter values WT, PZ[0] and PZ[1] for tile(TX=4) 1246, corresponding to step 307. It should be noted that the line 1604 which is found in tile(4) 1246 has been extended to the boundaries of the image and intersects perimeter segment 3 1210 and perimeter segment 6 1216. The tile line finder calculates that for tile(4): weight WT=5; first line intersection point with perimeter PZ[0]=55 as indicated by arrow 1608, and second line intersection point with point perimeter PZ[1]=101, as indicated by arrow 1610. Hence, PI=(3,6) since the line intersects perimeter segments 3 and 6; PW[3, 6]=0+5=5; PZ0[3,6]=0+5*55=275; and PZ1[3,6]=0+5*101=505, in accordance with an iteration of step 316 in which parameter accumulator arrays with index value PI=(3, 6) are incremented.

Figure 15:
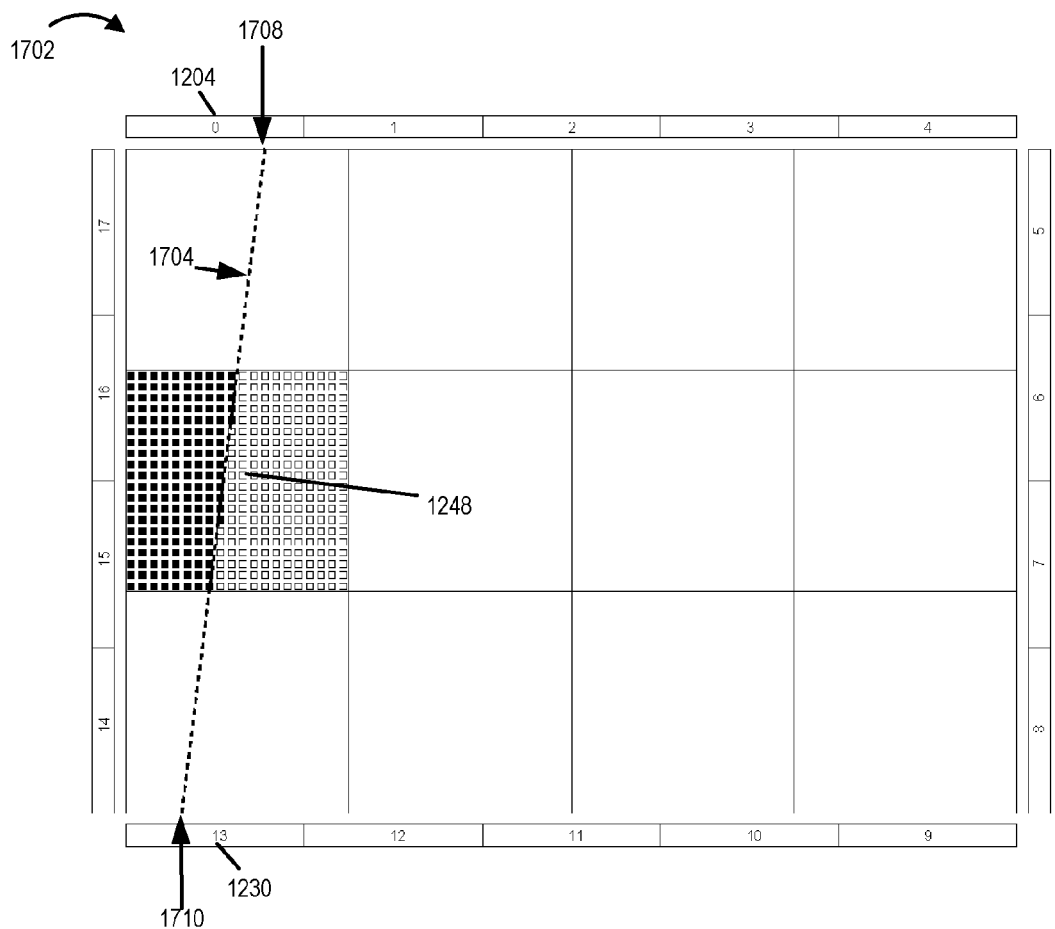
FIG. 15 is a drawing illustrating a fifth image tile of the exemplary image, processing of the fifth image tile to find a line, identification of perimeter index values corresponding to the line, and updating of parameter accumulator arrays in accordance with an exemplary embodiment.

FIG. 15 includes a drawing 1702 illustrating tile(5) 1248 of image 1202 which is processed, a line 1704 which is found and determined results 1706. Results 1706 include calculated line parameter values WT, PZ[0] and PZ[1] for tile(TX=5) 1248, corresponding to step 307. It should be noted that the line 1704 which is found in tile(5) 1248 has been extended to the boundaries of the image and intersects perimeter segment 0 1204 and perimeter segment 13 1210. The tile line finder calculates that for tile(5): weight WT=20; first line intersection point with perimeter PZ[0]=12.5 as indicated by arrow 1708, and second line intersection point with point perimeter PZ[1]=215, as indicated by arrow 1710. Hence, PI=(0,13) since the line intersects perimeter segments 0 and 13; PW[0, 13]=20+20=40; PZ0[0,13]=240+20*12.5=490; and PZ1[0, 613]=4290+20*215=8590, in accordance with an iteration of step 316 in which parameter accumulator arrays with index value PI=(0,13) are incremented.

Figure 16:
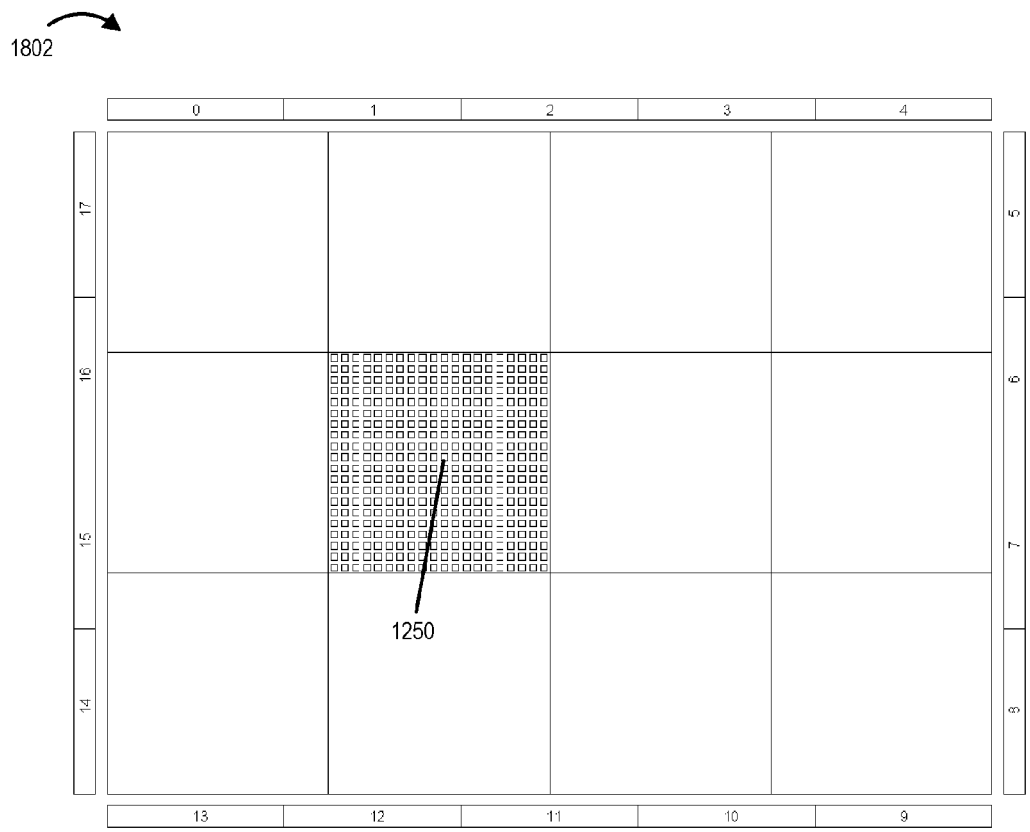
FIG. 16 is a drawing illustrating a sixth image tile of the exemplary image, processing of the sixth image tile to find a line, identification of perimeter index values corresponding to the line, and updating of parameter accumulator arrays in accordance with an exemplary embodiment.

FIG. 16 includes a drawing 1802 illustrating tile(6) 1250 of image 1202 which is processed resulting in no lines being found and determined results 1706. Results 1806 include calculated line parameter values WT for tile(TX=6) 1250, corresponding to step 307. The tile line finder calculates that for tile(6): weight WT=0 since no line if found. Hence, the parameter accumulator buffers are unmodified since WT=0, and steps 314 and 316 are bypassed.

Figure 17:
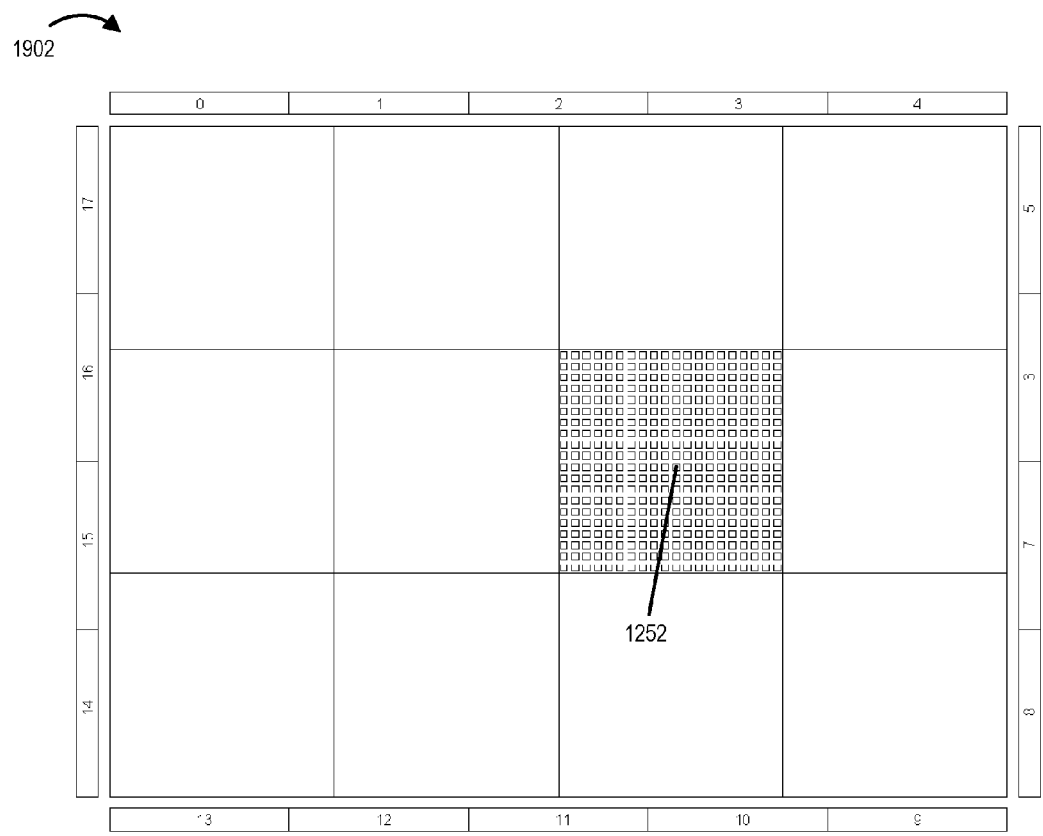
FIG. 17 is a drawing illustrating a seventh image tile of the exemplary image, processing of the seventh image tile to find a line, identification of perimeter index values corresponding to the line, and updating of parameter accumulator arrays in accordance with an exemplary embodiment.

FIG. 17 includes a drawing 1902 illustrating tile(7) 1252 of image 1202 which is processed resulting in no lines being found and determined results 1906. Results 1906 include calculated line parameter values WT for tile(TX=7) 1252, corresponding to step 307. The tile line finder calculates that for tile(6): weight WT=0 since no line if found. Hence, the parameter accumulator buffers are unmodified since WT=0, and steps 314 and 316 are bypassed.

Figure 18:
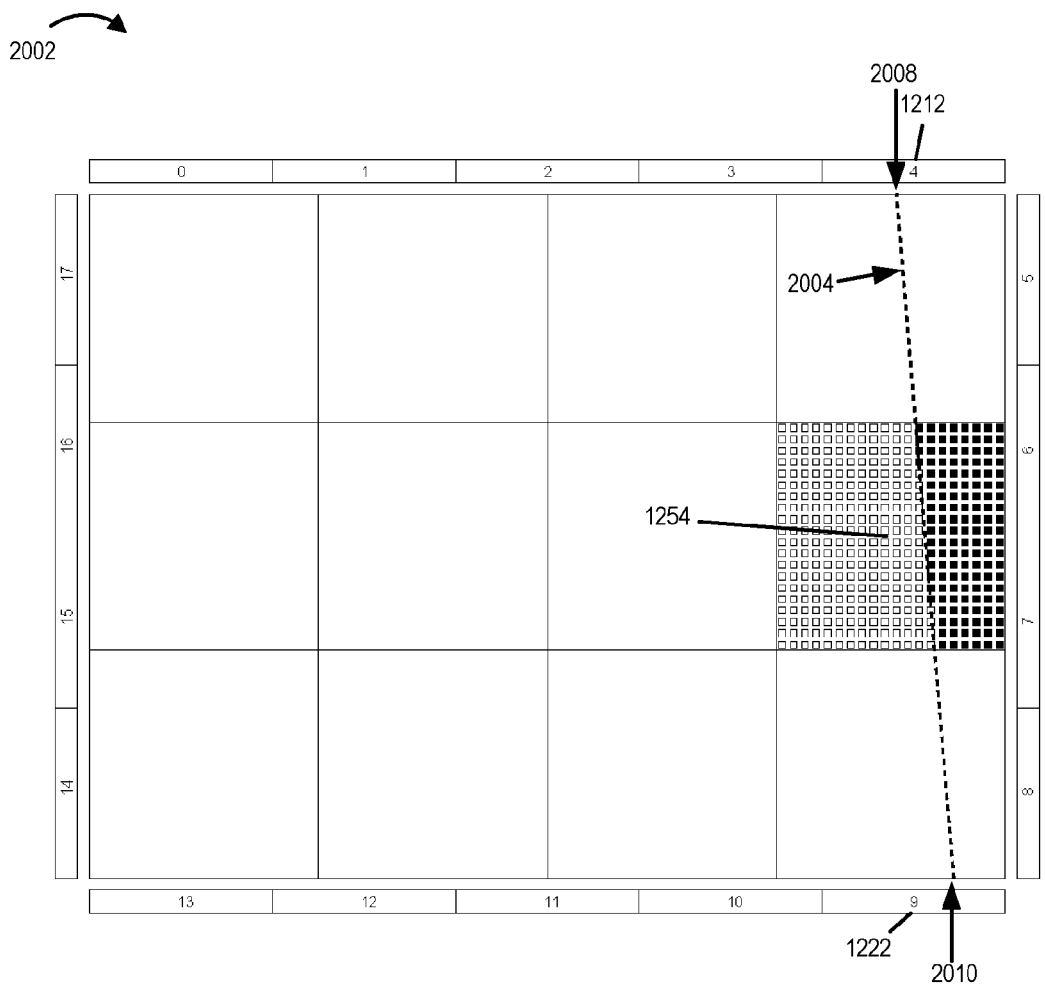
FIG. 18 is a drawing illustrating an eighth image tile of the exemplary image, processing of the eighth image tile to find a line, identification of perimeter index values corresponding to the line, and updating of parameter accumulator arrays in accordance with an exemplary embodiment.

FIG. 18 includes a drawing 2002 illustrating tile(8) 1254 of image 1202 which is processed, a line 2004 which is found and determined results 2006. Results 2006 include calculated line parameter values WT, PZ[0] and PZ[1] for tile(TX=8) 1254, corresponding to step 307. It should be noted that the line 2004 which is found in tile(8) 1254 has been extended to the boundaries of the image and intersects perimeter segment 4 1212 and perimeter segment 9 1222. The tile line finder calculates that for tile(8): weight WT=20; first line intersection point with perimeter PZ[0]=70.5 as indicated by arrow 2008, and second line intersection point with point perimeter PZ[1]=144.5, as indicated by arrow 2010. Hence, PI=(4,9) since the line intersects perimeter segments 4 and 9; PW[4, 9]=0+20=20; PZ0[4,9]=0+20*70.5=1410; and PZ1[4,9]=0+20*144.5=2890, in accordance with an iteration of step 316 in which parameter accumulator arrays with index value PI=(4, 9) are incremented.

Figure 19:
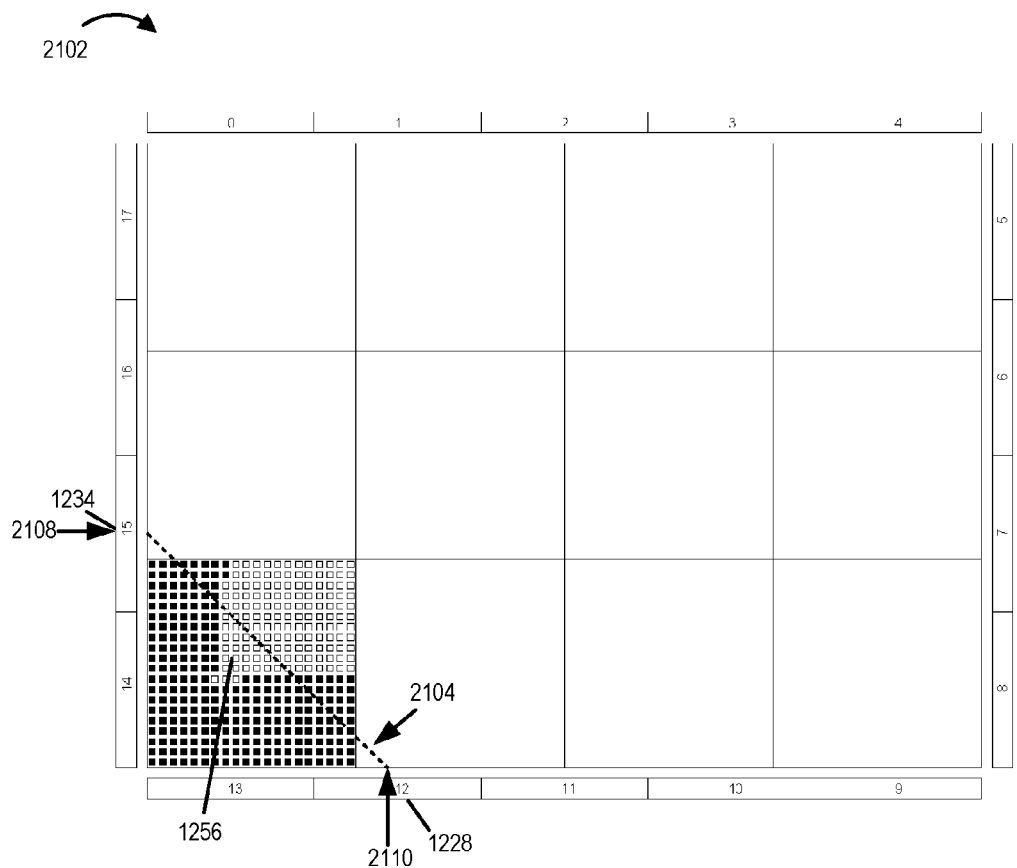
FIG. 19 is a drawing illustrating a ninth image tile of the exemplary image, processing of the ninth image tile to find a line, identification of perimeter index values corresponding to the line, and updating of parameter accumulator arrays in accordance with an exemplary embodiment.

FIG. 19 includes a drawing 2102 illustrating tile(9) 1256 of image 1202 which is processed, a line 2104 which is found and determined results 2106. Results 2106 include calculated line parameter values WT, PZ[0] and PZ[1] for tile(TX=9) 1256, corresponding to step 307. It should be noted that the line 2104 which is found in tile(9) 1256 has been extended to the boundaries of the image and intersects perimeter segment 12 1228 and perimeter segment 15 1234. The tile line finder calculates that for tile(9): weight WT=4; first line intersection point with perimeter PZ[0]=197 as indicated by arrow 2108, and second line intersection point with point perimeter PZ[1]= 242.5, as indicated by arrow 2110. Hence, PI=(12,15) since the line intersects perimeter segments 12 and 15; PW[12,15]=0+4=4; PZ0[12,15]=0+4*197=788; and PZ1[12,15]=0+4*242.5=970, in accordance with an iteration of step 316 in which parameter accumulator arrays with index value PI=(12,15) are incremented.

Figure 20:
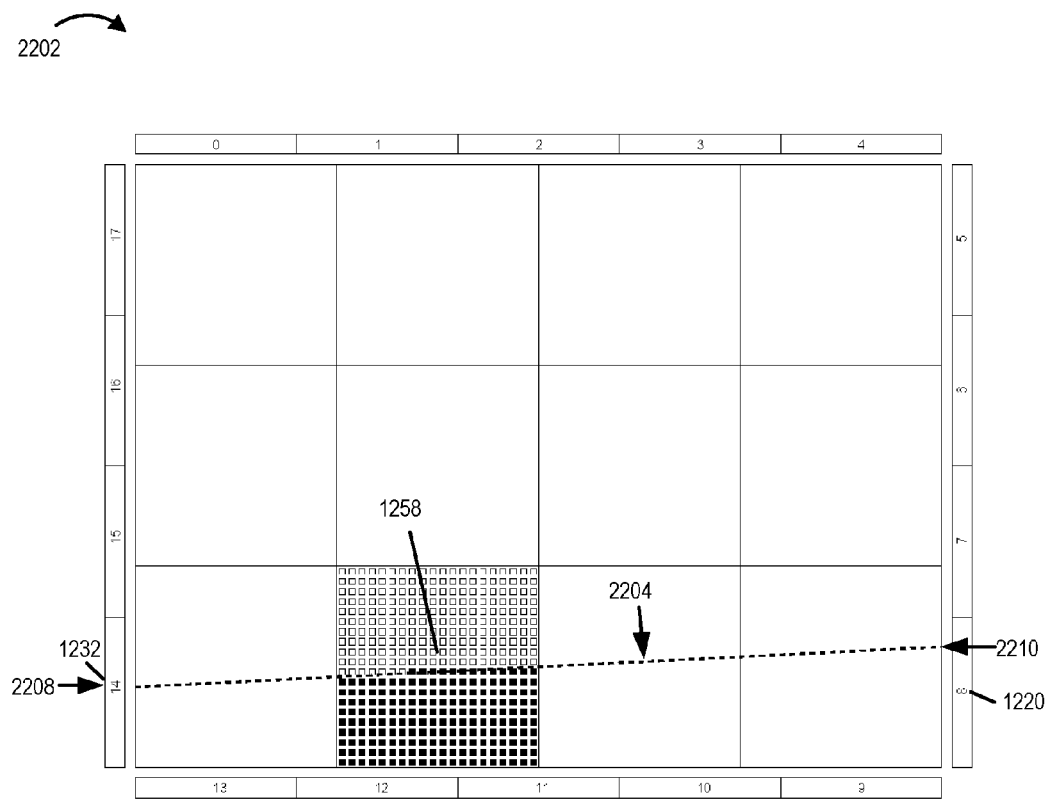
FIG. 20 is a drawing illustrating a tenth image tile of the exemplary image, processing of the tenth image tile to find a line, identification of perimeter index values corresponding to the line, and updating of parameter accumulator arrays in accordance with an exemplary embodiment.

FIG. 20 includes a drawing 2202 illustrating tile(10) 1258 of image 1202 which is processed, a line 2204 which is found and determined results 2206. Results 2206 include calculated line parameter values WT, PZ[0] and PZ[1] for tile(TX=10) 1258, corresponding to step 307. It should be noted that the line 2204 which is found in tile(10) 1258 has been extended to the boundaries of the image and intersects perimeter segment 8 1220 and perimeter segment 14 1232. The tile line finder calculates that for tile(10): weight WT=20; first line intersection point with perimeter PZ[0]=128 as indicated by arrow 2208, and second line intersection point with point perimeter PZ[1]=228, as indicated by arrow 2210. Hence, PI=(8,14) since the line intersects perimeter segments 8 and 14; PW[8, 14]=0+20=20; PZ0[8,14]=0+20*128=2560; and PZ1[8,14]= 0+20*228=4560, in accordance with an iteration of step 316 in which parameter accumulator arrays with index value PI= (8,14) are incremented.

Figure 21:
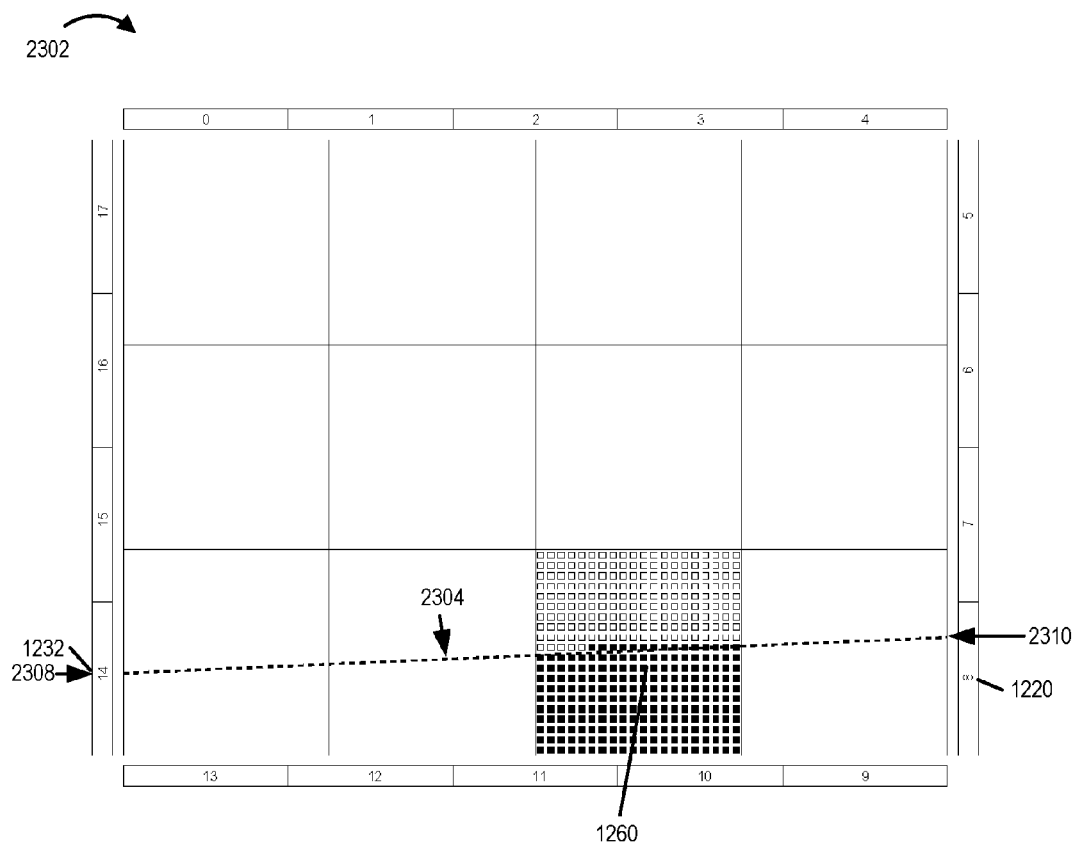
FIG. 21 is a drawing illustrating an eleventh image tile of the exemplary image, processing of the eleventh image tile to find a line, identification of perimeter index values corresponding to the line, and updating of parameter accumulator arrays in accordance with an exemplary embodiment.

FIG. 21 includes a drawing 2302 illustrating tile(11) 1260 of image 1202 which is processed, a line 2304 which is found and determined results 2306. Results 2306 include calculated line parameter values WT, PZ[0] and PZ[1] for tile(TX=11) 1260, corresponding to step 307. It should be noted that the line 2304 which is found in tile(11) 1260 has been extended to the boundaries of the image and intersects perimeter segment 8 1220 and perimeter segment 14 1232. The tile line finder calculates that for tile(11): weight WT=20; first line intersection point with perimeter PZ[0]=128.5 as indicated by arrow 2308, and second line intersection point with point perimeter PZ[1]=228, as indicated by arrow 2310. Hence, PI=(8,14) since the line intersects perimeter segments 8 and 14; PW[8, 14]=20+20=40; PZ0[8,14]=2560+20*128.5=5130; and PZ1 [8,14]=4560+20*228=9120, in accordance with an iteration of step 316 in which parameter accumulator arrays with index value PI=(8,14) are incremented.

Figure 22:
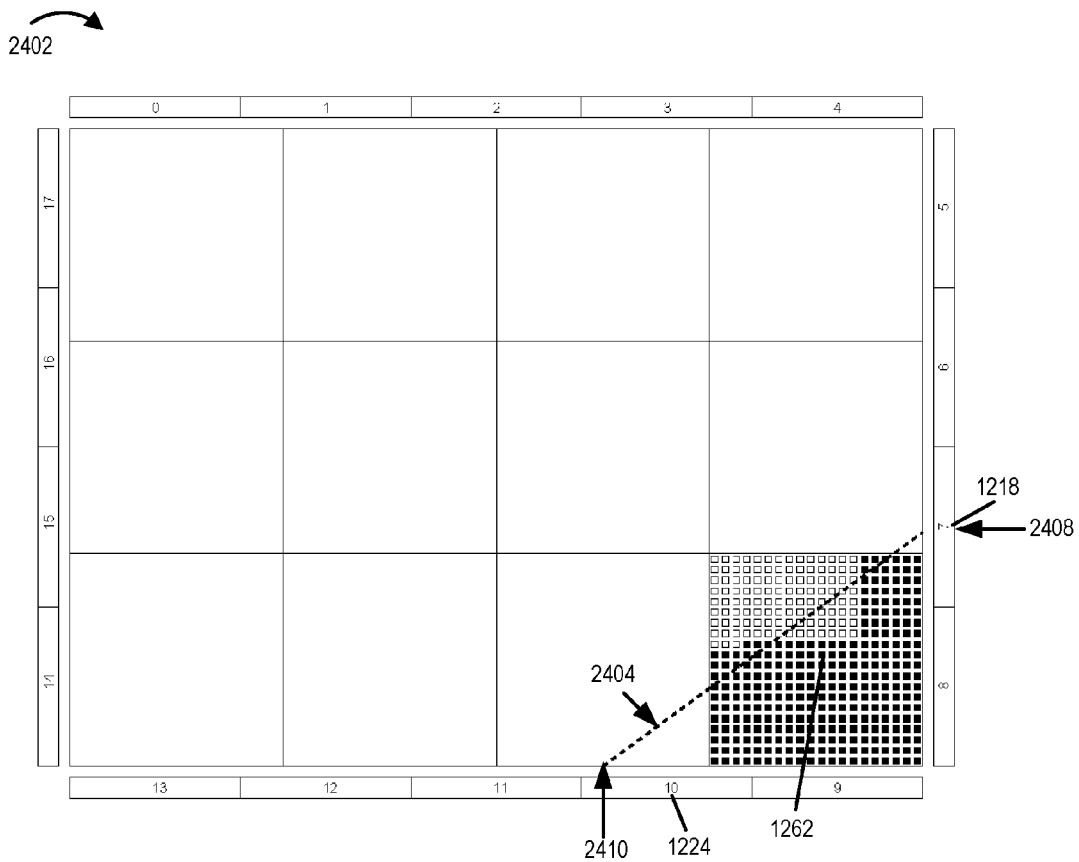
FIG. 22 is a drawing illustrating a twelfth image tile of the exemplary image, processing of the twelfth image tile to find a line, identification of perimeter index values corresponding to the line, and updating of parameter accumulator arrays in accordance with an exemplary embodiment.

FIG. 22 includes a drawing 2402 illustrating tile(12) 1262 of image 1202 which is processed, a line 2404 which is found and determined results 2406. Results 2406 include calculated line parameter values WT, PZ[0] and PZ[1] for tile(TX=12) 1260, corresponding to step 307. It should be noted that the line 2404 which is found in tile(11) 1262 has been extended to the boundaries of the image and intersects perimeter segment 7 1218 and perimeter segment 10 1224. The tile line finder calculates that for tile(12): weight WT=5; first line intersection point with perimeter PZ[0]=100 as indicated by arrow 2408, and second line intersection point with perimeter PZ[1]= 170, as indicated by arrow 2410. Hence, PI=(7,10) since the line intersects perimeter segments 7 and 10; PW[7, 10]=0+5=5; PZ0[7,10]=0+5*100=500; and PZ1[7,10]=0+ 5*170=850, in accordance with an iteration of step 316 in which parameter accumulator arrays with index value PI=(7, 10) are incremented.

FIG. 23 is a drawing 2502 including a summary of the contents of the parameter accumulator buffers, which are non-zero, after the accumulation phase. Thus drawing 2502 illustrates results obtained following completion of step 106, based on the updates performed in step 316. Block 2502 includes: a summary of the parameter accumulator arrays for line weight 2504, a summary of the parameter accumulator arrays for first line intersection point with perimeter 2506 and a summary of the parameter accumulator arrays for the second line intersection point with perimeter 2508.

FIGS. 24-27 are used to illustrate implementation of seek lines step 108 of flowchart 100, represented by FIG. 7. In this example, four lines are found (line 2604 of FIG. 24, line 2704 of FIG. 25, line 2804 of FIG. 26 and line 2904 of FIG. 27).

Figure 24:
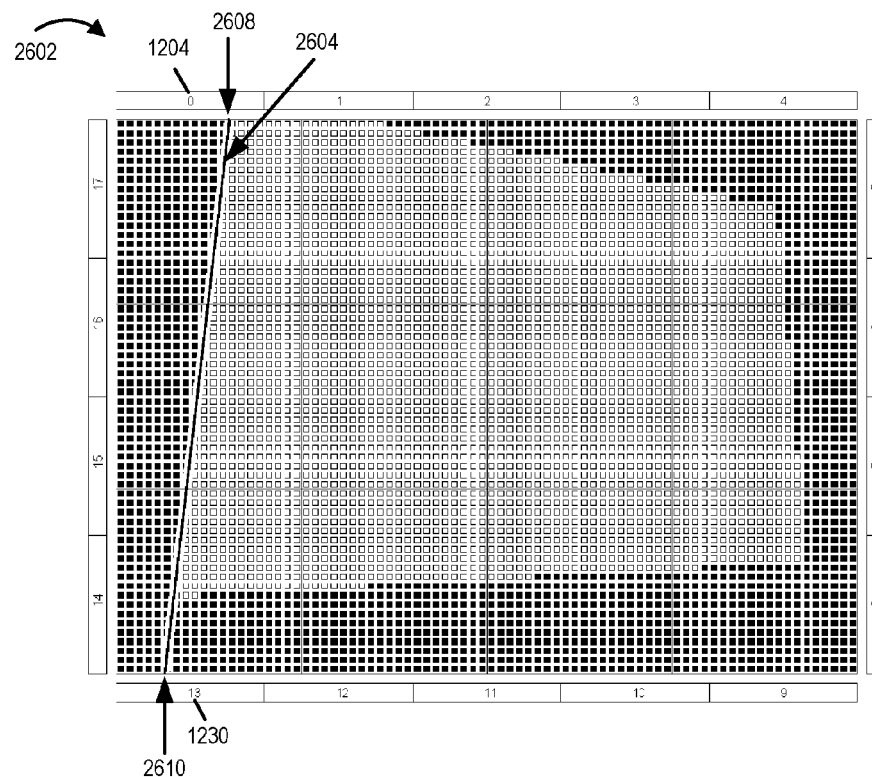
FIG. 24 illustrates an exemplary first identified line, e.g., corresponding to the largest accumulated line weight value, of the processed image, steps used in determining the line, input data, intermediate data, output results, and updates to the accumulator arrays in accordance with an exemplary embodiment.
Figure 24:
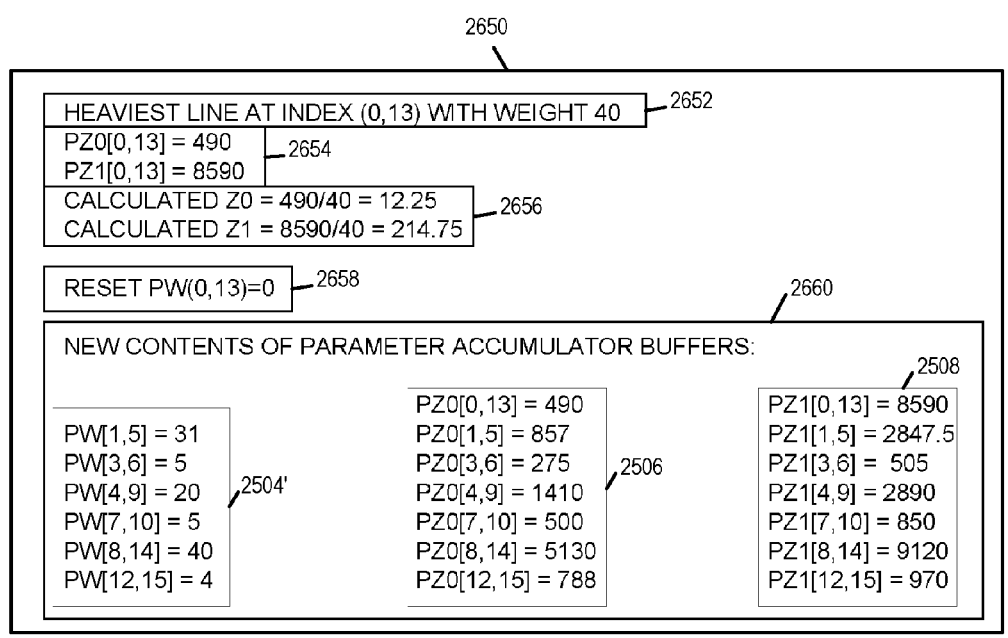

FIG. 24 includes drawing 2602 which illustrates image 1202 and exemplary line 2604. Box 2650 includes intermediate data, operation performed, and results. Line 2604 is found using the method of flowchart 800, which identifies the index=(0,13), which corresponds to perimeter segment 0 1204 and perimeter segment 13 1230.

Based on the accumulated weight buffer information of box 2504, the accumulated weight buffer with the highest value=40 and is at index PI=(0, 13), as indicated by box 2652. In this exemplary embodiment, in the case where 2 indexes have the same highest value, the first detected one is used. Corresponding to the index PI=(0,13) the accumulated parameters values PZ0[0,13]=490 and PZ1[0, 13]=8590 are selected from information 2506, and 2508, respectively, as indicated by box 2654.

Next the parameter values Z0 and Z1 used to define line 2604 are calculated by dividing the accumulated parameter values PZ0[0,13] and PZ1[0,13], by the accumulated weight value PW[0,13]=40, to obtain Z0=12.25 and Z1=214.75, as indicated by box 2656 and represented by the locations (2608 and 2610). This calculation corresponds to one iteration of step 822. At this point the determined line parameters Z0=12.25 and Z1=214.75 corresponding to found line 2608 are exported, corresponding to step 606.

Next, the parameter accumulator buffers are updated, corresponding to an iteration of step 608. PW(0,13) is set equal to 0, as indicated by box 2656, and the new contents of the parameter accumulator buffers with non-zero values are indicated in box 2660. Note that by zeroing out PW(0,13) index PI=(0, 13) will be removed from consideration in the next iteration of flowchart 800. New contents of parameter accumulator buffers with non-zero values 2660 includes: block 2504 which includes a summary of the parameter accumulator arrays for line weight; block 2506 which includes a summary of the parameter accumulator arrays for first line intersection point with perimeter; and block 2508 which includes a summary of the parameter accumulator arrays for the second line intersection point with perimeter.

Figure 25:
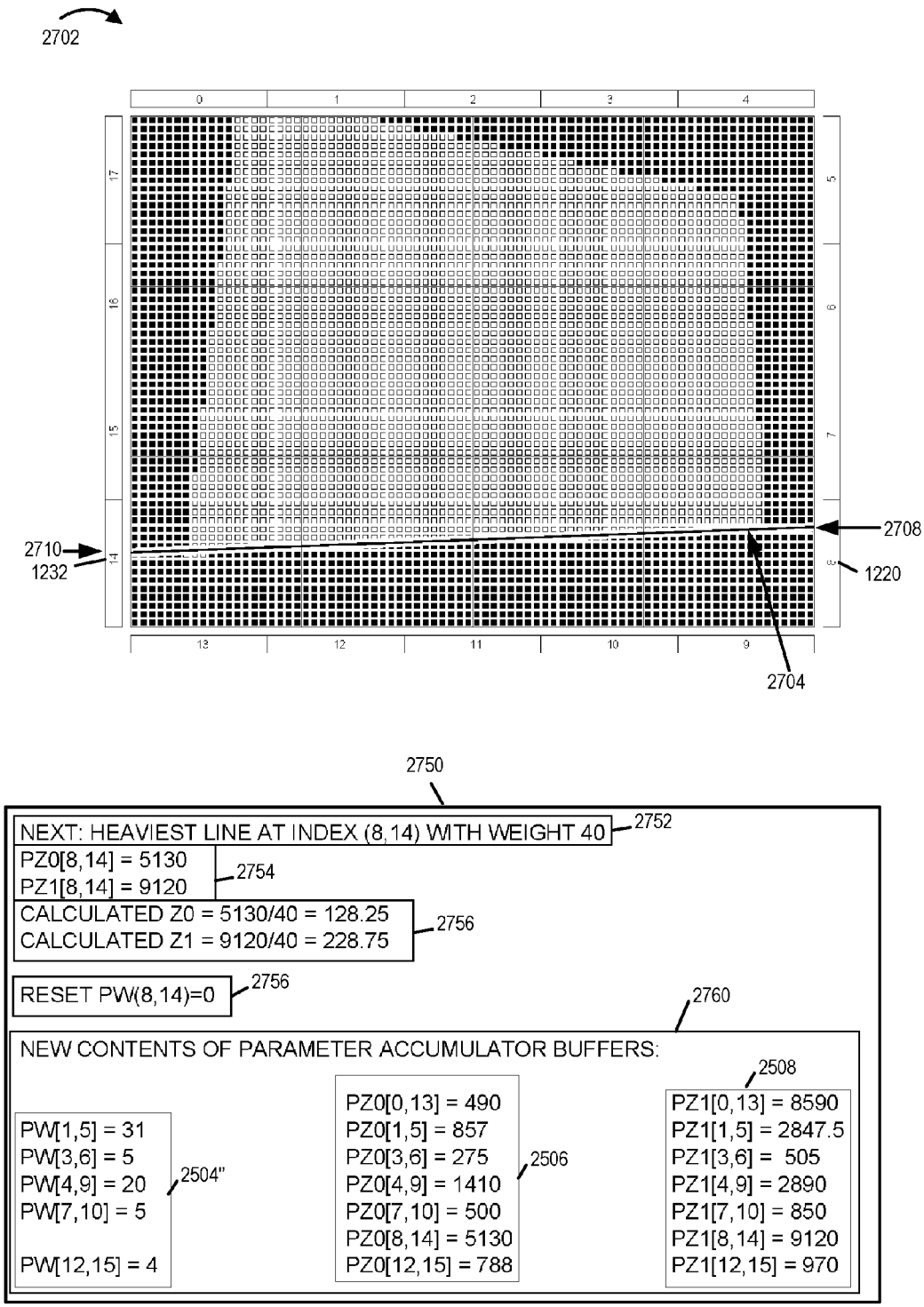
FIG. 25 illustrates an exemplary second identified line, e.g., corresponding to the second largest accumulated line weight value, of the processed image, steps used in determining the line, input data, intermediate data, output results, and updates to the accumulator arrays in accordance with an exemplary embodiment.

FIG. 25 includes drawing 2702 which illustrates image 1202 and exemplary line 2704. Box 2750 includes intermediate data, operation performed, and results. Line 2704 is found using the method of flowchart 800, which identifies the index=(8,14), which corresponds to perimeter segment 8 1220 and perimeter segment 14 1232.

Based on the accumulated weight buffer information of box 2504', the accumulated weight buffer with the highest value=40 and is at index PI=(8, 14), as indicated by box 2752. Corresponding to the index PI=(8,14), the accumulated parameters values PZ0[8,14]=5130 and PZ1[8, 14]=9120 are selected from information 2506, and 2508, respectively, as indicated by box 2754.

Next the parameter values Z0 and Z1 used to define line 2704 are calculated by dividing the accumulated parameter values PZ0[8,14] and PZ1 [8,14], by the accumulated weight value PW[8,14]=40, to obtain Z0=128.25 and Z1=228.75, as indicated by box 2756 and represented by the locations (2708 and 2710). This calculation corresponds to one iteration of step 822. At this point the determined line parameters Z0=128.25 and Z1=228.75 corresponding to found line 2708 are exported, corresponding to step 606.

Next, the parameter accumulator buffers are updated, corresponding to an iteration of step 608. PW(8,14) is set equal to 0, as indicated by box 2756, and the new contents of the parameter accumulator buffers with non-zero values are indicated in box 2760. Note that by zeroing out PW(8,14) index PI=(8, 14) will be removed from consideration in the next iteration of flowchart 800. New contents of parameter accumulator buffers with non-zero values 2760 includes: block 2504'' which includes a summary of the parameter accumulator arrays for line weight; block 2506 which includes a summary of the parameter accumulator arrays for first line intersection point with perimeter; and block 2508 which includes a summary of the parameter accumulator arrays for the second line intersection point with perimeter.

Figure 26:
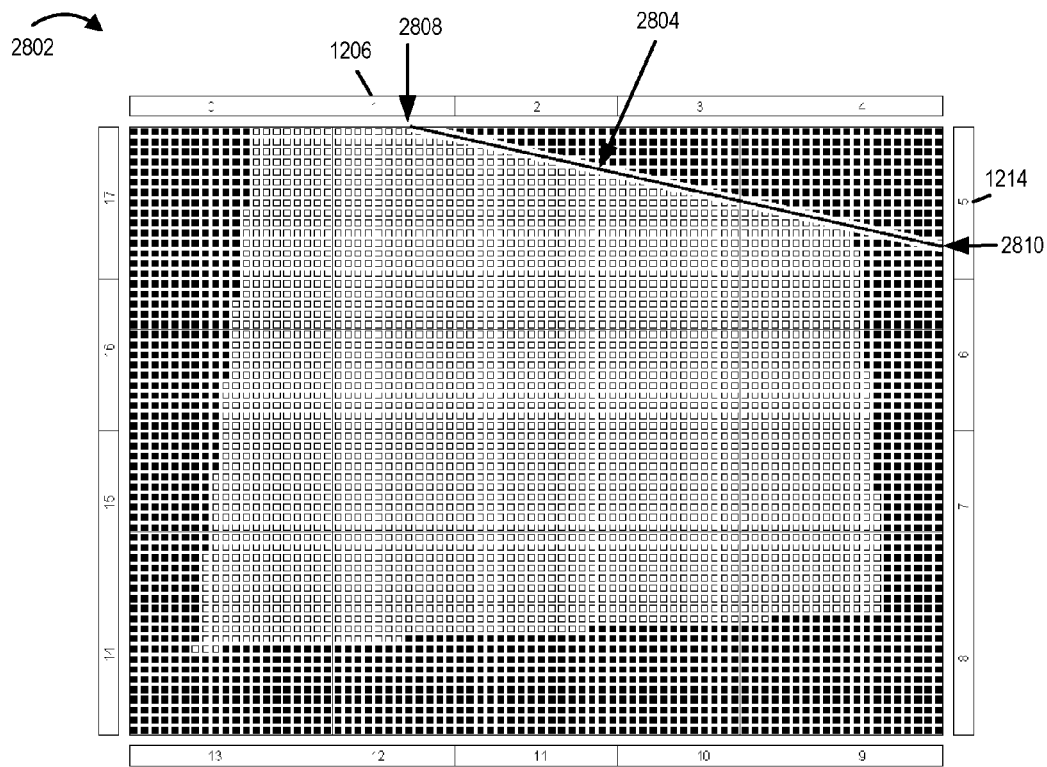
FIG. 26 illustrates an exemplary third identified line, e.g., corresponding to the third largest accumulated line weight value, of the processed image, steps used in determining the line, input data, intermediate data, output results, and updates to the accumulator arrays in accordance with an exemplary embodiment.
Figure 26:
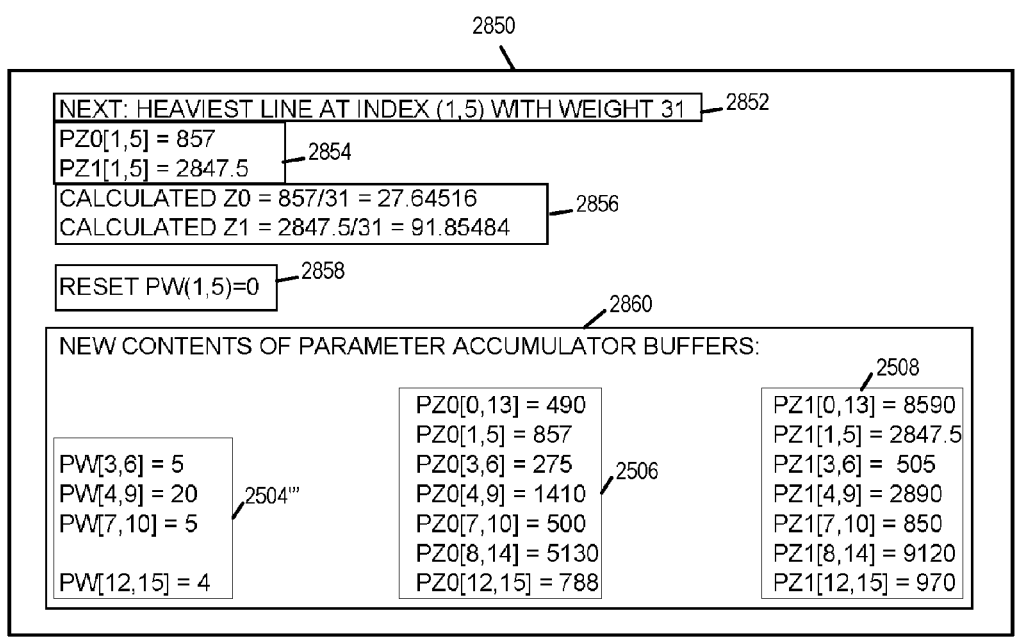

FIG. 26 includes drawing 2802 which illustrates image 1202 and exemplary line 2804. Box 2850 includes intermediate data, operation performed, and results. Line 2804 is found using the method of flowchart 800, which identifies the index=(1,5), which corresponds to perimeter segment 1 1206 and perimeter segment 5 1214.

Based on the accumulated weight buffer information of box 2504'', the accumulated weight buffer with the highest value=31 and is at index PI=(1, 5), as indicated by box 2852. Corresponding to the index PI=(1,5), the accumulated parameters values PZ0[1,5]=857 and PZ1[1, 5]=2847.5 are selected from information 2506, and 2508, respectively, as indicated by box 2854.

Next the parameter values Z0 and Z1 used to define line 2804 are calculated by dividing the accumulated parameter values PZ0[1,5] and PZ1[1,5], by the accumulated weight value PW[1,5]=31, to obtain Z0=27.64516 and Z1=91.85484, as indicated by box 2856 and represented by the locations (2808 and 2810). This calculation corresponds to one iteration of step 822. At this point the determined line parameters Z0=27.64516 and Z1=91.85484 corresponding to found line 2808 are exported, corresponding to step 606.

Next, the parameter accumulator buffers are updated, corresponding to an iteration of step 608. PW(1,5) is set equal to 0, as indicated by box 2856, and the new contents of the parameter accumulator buffers with non-zero values are indicated in box 2860. Note that by zeroing out PW(1,5) index PI=(1, 5) will be removed from consideration in the next iteration of flowchart 800. New contents of parameter accumulator buffers with non-zero values 2860 includes: block 2504''' which includes a summary of the parameter accumulator arrays for line weight; block 2506 which includes a summary of the parameter accumulator arrays for first line intersection point with perimeter; and block 2508 which includes a summary of the parameter accumulator arrays for the second line intersection point with perimeter.

FIG. 27 includes drawing 2902 which illustrates image 1202 and exemplary line 2904. Box 2950 includes intermediate data, operation performed, and results. Line 2904 is found using the method of flowchart 800, which identifies the index=(4,9), which corresponds to perimeter segment 5 1212 and perimeter segment 9 1222.

Based on the accumulated weight buffer information of box 2504''', the accumulated weight buffer with the highest value=20 and is at index PI=(4, 9), as indicated by box 2952. Corresponding to the index PI=(4,9), the accumulated parameters values PZ0[4,9]=1410 and PZ1[4, 9]=2890 are selected from information 2506, and 2508, respectively, as indicated by box 2954.

Next the parameter values Z0 and Z1 used to define line 2904 are calculated by dividing the accumulated parameter values PZ0[4,9] and PZ1[4,9], by the accumulated weight value PW[4,9]=20, to obtain Z0=70.5 and Z1=144.5, as indicated by box 2956 and represented by the locations (2908 and 2910). This calculation corresponds to one iteration of step 822. At this point the determined line parameters Z0=70.5 and Z1=144.5 corresponding to found line 2908 are exported, corresponding to step 606.

Next, the parameter accumulator buffers are updated, corresponding to an iteration of step 608. PW(4,9) is set equal to 0, as indicated by box 2956, and the new contents of the parameter accumulator buffers with non-zero values are indicated in box 2960. Note that by zeroing out PW(4,9) index PI=(4, 9) will be removed from consideration in any additional iteration of flowchart 800. New contents of parameter accumulator buffers with non-zero values 2960 includes: block 2504'''' which includes a summary of the parameter accumulator arrays for line weight; block 2506 which includes a summary of the parameter accumulator arrays for first line intersection point with perimeter; and block 2508 which includes a summary of the parameter accumulator arrays for the second line intersection point with perimeter.

FIG. 28, comprising the combination of FIG. 28A and FIG. 28B, is a flowchart 3000 of an exemplary method of identifying lines in an image. Operation starts in step 3002 and proceeds to step 3004. In step 3004, an image to be processed is received. Operation proceeds from step 3004 to step 3006. In step 3006 a set of tiles corresponding to the image are identified. Operation proceeds from step 3006 to step 3008.

In step 3008 a tile of said image is processed. Step 3008 includes steps 3010, 3012, 3014, 3015, 3016, 3018, 3019, 3020 and 3022. In step 3010, a line identification operation is performed on a tile of said image, said line identification operation identifying a line is said tile when a line is present. In various embodiments, a line is a transition between light and dark image regions. In some embodiments, a line is a straight image regions bordered on each side of the straight image regions by pixels having a different intensity than pixels in said straight image regions. Pixels on each side could have different or the same intensity, but the line area region is different from the sides. In some embodiments, the line area regions is thin, e.g., a few pixels wide.

Operation proceeds from step 3010 to step 3012. In step 3012 a determination is made as to whether or not the line identification operation of step 3010 identified a line in the tile of interest, and operation proceeds as a function of the determination. If the line identification operation did not identify a line in the tile of interest, then operation proceeds from step 3012 to step 3024.

However, if the line identification operation did identify a line in the tile of interest, then operation proceeds from step 3012 to step 3014. In step 3014 a determination is made where the identified line would intersect the perimeter of said image if the identified line was extended beyond a boundary of the tile to the perimeter of the image. Operation proceeds from step 3014 to step 3015. In step 3015 the following is determined: a line weight corresponding to the identified line. In step 3016 the following is determined: a first quantized parameter value used in defining the identified line. Operation proceeds from step 3016 to step 3018. In step 3018 a second quantized parameter value corresponding to the identified line is determined. Operation proceeds from step 3018 to step 3019.

In step 3019, based on the determined line weight, the following is updated: an accumulated line weight value corresponding to the determined first quantized parameter value defining the identified line. Operation proceeds from step 3019 to step 3020. In step 3020, based on the determined line weight, the following is updated: a first accumulated parameter weighted sum corresponding to the identified line. Operation proceeds from step 3020 to step 3022. In step 3022, based on the determined line weight, a second accumulated parameter weighted sum corresponding to the identified line is updated. Operation proceeds from step 3022 to step 3024.

In step 3024, a determination is performed as to whether or not there are more tiles in the image to process. If there are more tiles in the image to process, then operation proceeds from step 3024 to step 3008, and another tile is processed. Step 3008 is performed for each of the multiple tiles in the image. However, if it is determined in step 3024 that there are not more tiles in the image to process, then operation proceeds from step 3024, via connecting node A 3026 to step 3028. In step 3028, a number of lines in said image, e.g., a predetermined number of lines in said image, are identified based on the accumulated values generated from processing multiple different tiles of said image. Step 3028 includes steps 3030, 3032, 3034, 3036, and 3038.

In step 3030 the N largest accumulated line weights are identified, each of the N largest accumulated line weighted corresponding to a different pair of quantized perimeter locations, where N is a positive number. In one embodiment N is 4. Operation proceeds from step 3030 to step 3032.

In step 3032, the first accumulated parameter weighted sum corresponding to the largest accumulated line weight is divided by the largest accumulated line weight to determine a first line parameter value corresponding to a first line and the second accumulated parameter weighted sum corresponding to the largest accumulated line weight is divided by the largest accumulated line weight to determine a second line parameter value corresponding to the first line, said first and second line parameter values of the first line defining the first line in said image. Operation proceeds from step 3032 to step 3034.

In step 3034, the first accumulated parameter weighted sum corresponding to the second largest accumulated line weight is divided by the second largest accumulated line weight to determine a first line parameter value corresponding to a second line and the second accumulated parameter weighted sum corresponding to the second largest accumulated line weight is divided by the second largest accumulated line weight to determine a second line parameter value corresponding to the second line, said first and second line parameter values of the second line defining the second line in said image. Operation proceeds from step 3034 to step 3036.

In step 3036, the first accumulated parameter weighted sum corresponding to the third largest accumulated line weight is divided by the third largest accumulated line weight to determine a first line parameter value corresponding to a third line and the second accumulated parameter weighted sum corresponding to the third largest accumulated line weight is divided by the third largest accumulated line weight to determine a second line parameter value corresponding to the third line, said first and second line parameter values of the third line defining the third line in said image. Operation proceeds from step 3036 to step 3038.

In step 3038, the first accumulated parameter weighted sum corresponding to the Nth largest accumulated line weight is divided by the Nth largest accumulated line weight to determine a first line parameter value corresponding to a Nth line and the second accumulated parameter weighted sum corresponding to the Nth largest accumulated line weight is divided by the Nth largest accumulated line weight to determine a second line parameter value corresponding to the Nth line, said first and second line parameter values of the Nth line defining the Nth line in said image.

Operation proceeds from step 3028 to step 3040, in which the determined first and second line parameter values are output for each of the N identified lines. Operation proceeds from step 3040, via connecting node B 3042, to step 3004 in which another image to be processed is received.

In some embodiments, the quantized parameter values indicate perimeter locations, e.g., perimeter segment numbers, indicating where the identified line would enter and exit the image perimeter if extended through the image perimeter. In some such embodiments, the first accumulated parameter weighted sum corresponding to the identified line is an accumulated perimeter entry point weighted sum corresponding to the identified line and the second accumulated parameter weighted sum is an accumulated perimeter exit point weighted sum corresponding to the determined quantized perimeter locations of the identified line.

In some such embodiments, the first and second line parameter values of the first line defining the first line are a first line perimeter entry point and a first line perimeter exit point, respectively. In some such embodiments, the first and second line parameter values of the second line defining the second line are a second line perimeter entry point and a second line perimeter exit point, respectively. In some such embodiments, the first and second line parameter values of the third line defining the third line are a third line perimeter entry point and a third line perimeter exit point, respectively. In some such embodiments, the first and second line parameter values of the Nth line defining the Nth line are a Nth line perimeter entry point and a Nth line perimeter exit point, respectively.

In some embodiments, the step 3010 of performing a line identification operation on a tile is performed for a space corresponding to a tile, e.g., a tile space. In some such embodiments, step 3014 determines quantized perimeter locations. In some such embodiments, the quantized perimeter locations are image perimeter segment locations. In some embodiments, the image perimeter segment locations identify perimeter segments which are of a different length than a side of a tile.

Flowchart 3000 will now be described in view of the example of FIGS. 10-27. The received image to be processed of step 3004 is image 1202 of FIG. 10. The identified set of tiles corresponding to the image of step 3006 is the set of 12 indexed image tiles (image tile(1) 1240, image tile(2) 1242, image tile(3) 1244, image tile(4) 1246, image tile(5) 1248, image tile(6) 1250, image tile(7) 1252, image tile(8) 1254, image tile(9) 1256, image tile(10) 1258, image tile(11) 1260, image tile(12) 1262) of FIG. 10.

Each of the 12 tiles (image tile(1) 1240, image tile(2) 1242, image tile(3) 1244, image tile(4) 1246, image tile(5) 1248, image tile(6) 1250, image tile(7) 1252, image tile(8) 1254, image tile(9) 1256, image tile(10) 1258, image tile(11) 1260, image tile(12) 1262) is subjected to processing by an iteration of step 3008.

With regard to tile(1) 1240, the line identification operation of step 3010 identifies a line (line 1304 of FIG. 11) and in step 3014 perimeter intersection points of 12 and 214.5 are determined. In step 3015 the weight is determined to be 20, and in step 3016 the first quantized parameter is determined to be 0. In step 3018 the second quantized parameter value is determined to be 13. Thus PI=(0,13) which identifies entry and exit segments (segment 0 1204 and segment 13 1230). In step 3019 accumulated line weight value PW[0,13] is updated, and in step 3020 first accumulated parameter weighted sum PZ0[0,13] corresponding to the identified line is updated. In step 3022 second accumulated parameter weighted sum PZ1[0,13] corresponding to the identified line is updated.

With regard to tile(2) 1242, the line identification operation of step 3010 identifies a line (line 1404 of FIG. 12) and in step 3014 perimeter intersection points of 27 and 92.5 are determined. In step 3015 the weight is determined to be 11, and in step 3016 the first quantized parameter is determined to be 1. In step 3018 the second quantized parameter value is determined to be 5. Thus PI=(1,5) which identifies entry and exit segments (segment 1 1206 and segment 5 1214). In step 3019 accumulated line weight value PW[1,5] is updated, and in step 3020 first accumulated parameter weighted sum PZ0[1,5] corresponding to the identified line is updated. In step 3022 second accumulated parameter weighted sum PZ1[1,5] corresponding to the identified line is updated.

With regard to tile(3) 1244, the line identification operation of step 3010 identifies a line (line 1504 of FIG. 13) and in step 3014 perimeter intersection points of 28 and 91.5 are determined. In step 3015 the weight is determined to be 20 and in step 3016 the first quantized parameter is determined to be 1. In step 3018 the second quantized parameter value is determined to be 5. Thus PI=(1,5) which identifies entry and exit segments (segment 1 1206 and segment 5 1214). In step 3019 accumulated line weight value PW[1,5] is updated, and in step 3020 first accumulated parameter weighted sum PZ0[1,5] corresponding to the identified line is updated. In step 3022 second accumulated parameter weighted sum PZ1[1,5] corresponding to the identified line is updated.

With regard to tile(4) 1246, the line identification operation of step 3010 identifies a line (line 1604 of FIG. 14) and in step 3014 perimeter intersection points of 55 and 101 are determined. In step 3015 the weight is determined to be 5 and in step 3016 the first quantized parameter is determined to be 3. In step 3018 the second quantized parameter value is determined to be 6. Thus PI=(3,6) which identifies entry and exit segments (segment 3 1210 and segment 6 1216). In step 3019 accumulated line weight value PW[3,6] is updated, and in step 3020 first accumulated parameter weighted sum PZ0[3,6] corresponding to the identified line is updated. In step 3022 second accumulated parameter weighted sum PZ1[3,6] corresponding to the identified line is updated.

With regard to tile(5) 1248, the line identification operation of step 3010 identifies a line (line 1704 of FIG. 15) and in step 3014 perimeter intersection points of 12.5 and 215 are determined. In step 3015 the weight is determined to be 20 and in step 3016 the first quantized parameter is determined to be 0. In step 3018 the second quantized parameter value is determined to be 13. Thus PI=(0,13) which identifies entry and exit segments (segment 0 1204 and segment 13 1220). In step 3019 accumulated line weight value PW[0,13] is updated, and in step 3020 first accumulated parameter weighted sum PZ0[0,13] corresponding to the identified line is updated. In step 3022 second accumulated parameter weighted sum PZ1[0,13] corresponding to the identified line is updated.

With regard to tile(6) 1250, the line identification operation of step 3010 does not identify a line. With regard to tile(7) 1252, the line identification operation of step 3010 does not identify a line.

With regard to tile(8) 1254, the line identification operation of step 3010 identifies a line (line 2004 of FIG. 18) and in step 3014 perimeter intersection points of 70.5 and 144.5 are determined. In step 3015 the weight is determined to be 20, and in step 3016 the first quantized parameter is determined to be 4. In step 3018 the second quantized parameter value is determined to be 9. Thus PI=(4,9) which identifies entry and exit segments (segment 4 1212 and segment 9 1222). In step 3019 accumulated line weight value PW[4,9] is updated, and in step 3020 first accumulated parameter weighted sum PZ0[4,9] corresponding to the identified line is updated. In step 3022 second accumulated parameter weighted sum PZ1[4,9] corresponding to the identified line is updated.

With regard to tile(9) 1256, the line identification operation of step 3010 identifies a line (line 2104 of FIG. 19) and in step 3014 perimeter intersection points of 197 and 242.5 are determined. In step 3015 the weight is determined to be 4, and in step 3016 the first quantized parameter is determined to be 12. In step 3018 the second quantized parameter value is determined to be 15. Thus PI=(12,15) which identifies entry and exit segments (segment 12 1228 and segment 15 1234). In step 3019 accumulated line weight value PW[12,15] is updated, and in step 3020 first accumulated parameter weighted sum PZ0[12,15] corresponding to the identified line is updated. In step 3022 second accumulated parameter weighted sum PZ1[12,15] corresponding to the identified line is updated.

With regard to tile(10) 1258, the line identification operation of step 3010 identifies a line (line 2204 of FIG. 20) and in step 3014 perimeter intersection points of 128 and 228 are determined. In step 3015 the weight is determined to be 20, and in step 3016 the first quantized parameter is determined to be 8. In step 3018 the second quantized parameter value is determined to be 14. Thus PI=(8,14) which identifies entry and exit segments (segment 8 1220 and segment 14 1232). In step 3019 accumulated line weight value PW[8,14] is updated, and in step 3020 first accumulated parameter weighted sum PZ0[8,14] corresponding to the identified line is updated. In step 3022 second accumulated parameter weighted sum PZ1[8,14] corresponding to the identified line is updated.

With regard to tile(11) 1260, the line identification operation of step 3010 identifies a line (line 2304 of FIG. 21) and in step 3014 perimeter intersection points of 128.5 and 228 are determined. In step 3015 the weight is determined to be 20, and in step 3016 the first quantized parameter is determined to be 8. In step 3018 the second quantized parameter value is determined to be 14. Thus PI=(8,14) which identifies entry and exit segments (segment 8 1220 and segment 14 1232). In step 3020 accumulated line weight value PW[8,14] is updated, and first accumulated parameter weighted sum PZ0[8,14] corresponding to the identified line is updated. In step 3022 second accumulated parameter weighted sum PZ1[8,14] corresponding to the identified line is updated.

With regard to tile(12) 1262, the line identification operation of step 3010 identifies a line (line 2404 of FIG. 22) and in step 3014 perimeter intersection points of 100 and 170 are determined. In step 3015 the weight is determined to be 5, and in step 3016 the first quantized parameter is determined to be 7. In step 3018 the second quantized parameter value is determined to be 10. Thus PI=(7,10) which identifies entry and exit segments (segment 7 1218 and segment 10 1224). In step 3019 accumulated line weight value PW[7,10] is updated, and in step 3020 first accumulated parameter weighted sum PZ0[7,10] corresponding to the identified line is updated. In step 3022 second accumulated parameter weighted sum PZ1[7,10] corresponding to the identified line is updated.

In step 3028 four lines (2604 of FIG. 26, 2704 of FIG. 27, 2804 of FIGS. 28, and 2904 of FIG. 29) are determined based on the accumulated values generated from processing multiple tiles of the image. FIG. 23 illustrated the accumulated values generated from the processing of the multiple tiles from multiple iterations of step 3008.

In step 3030 line weights 40, 40, 31 and 20 are identified corresponding to pairs of quantized perimeter locations (0,13), (8,14), (1,5), and (4,9), respectively.

In step 3032, the first accumulated parameter weighted sum corresponding to the identified largest accumulated line weight, PZ0[0,13]=490, is divided by the largest accumulated line weight, PW[0,13]=40, to determine a first line parameter value corresponding to the first line, Z0=12.25; and the second accumulated parameter weighted sum corresponding to the identified largest accumulated line weight, PZ1[0,13]=214.75, is divided by the largest accumulated line weight, PW[0,13]=40, to determine a second line parameter value corresponding to the first line, Z1=214.75.

In step 3034, the first accumulated parameter weighted sum corresponding to the identified second largest accumulated line weight, PZ0[8,14]=5130, is divided by the second largest accumulated line weight, PW[8,14]=40, to determine a first line parameter value corresponding to the second line, Z0=128.25; and the second accumulated parameter weighted sum corresponding to the identified second largest accumulated line weight, PZ1[8,14]=9120, is divided by the second largest accumulated line weight, PW[8,14]=40, to determine a second line parameter value corresponding to the second line, Z1=228.75.

In step 3036, the first accumulated parameter weighted sum corresponding to the identified third largest accumulated line weight, PZ0[1,5]=857, is divided by the third largest accumulated line weight, PW[1,5]=31, to determine a first line parameter value corresponding to the third line, Z0=27.64516; and the second accumulated parameter weighted sum corresponding to the identified third largest accumulated line weight, PZ1[1,5]=2847.5, is divided by the third largest accumulated line weight, PW[1,5]=31, to determine a second line parameter value corresponding to the third line, Z1=91.85484.

In step 3038, the first accumulated parameter weighted sum corresponding to the identified fourth largest accumulated line weight, PZ0[4,9]=1410, is divided by the fourth largest accumulated line weight, PW[4,9]=20, to determine a first line parameter value corresponding to the fourth line, Z0=70.5; and the second accumulated parameter weighted sum corresponding to the identified fourth largest accumulated line weight, PZ1[4,9]=2890, is divided by the fourth largest accumulated line weight, PW[4,9]=20, to determine a second line parameter value corresponding to the fourth line, Z1=144.5.

In step 3040 the determined first and second line parameters are output corresponding to each of the identified lines. Corresponding to first line 2604 of FIG. 24, Z0=12.25 and Z1=214.75 are output, which define the first line. Corresponding to second line 2704 of FIG. 25, Z0=128.25 and Z1=228.75 are output, which define the second line. Corresponding to third line 2804 of FIG. 26, Z0=27.64516 and Z1=91.85484 are output, which define the third line. Corresponding to fourth line 2904 of FIG. 27, Z0=70.5 and Z1=144.5 are output, which define the fourth line.

Figure 29:
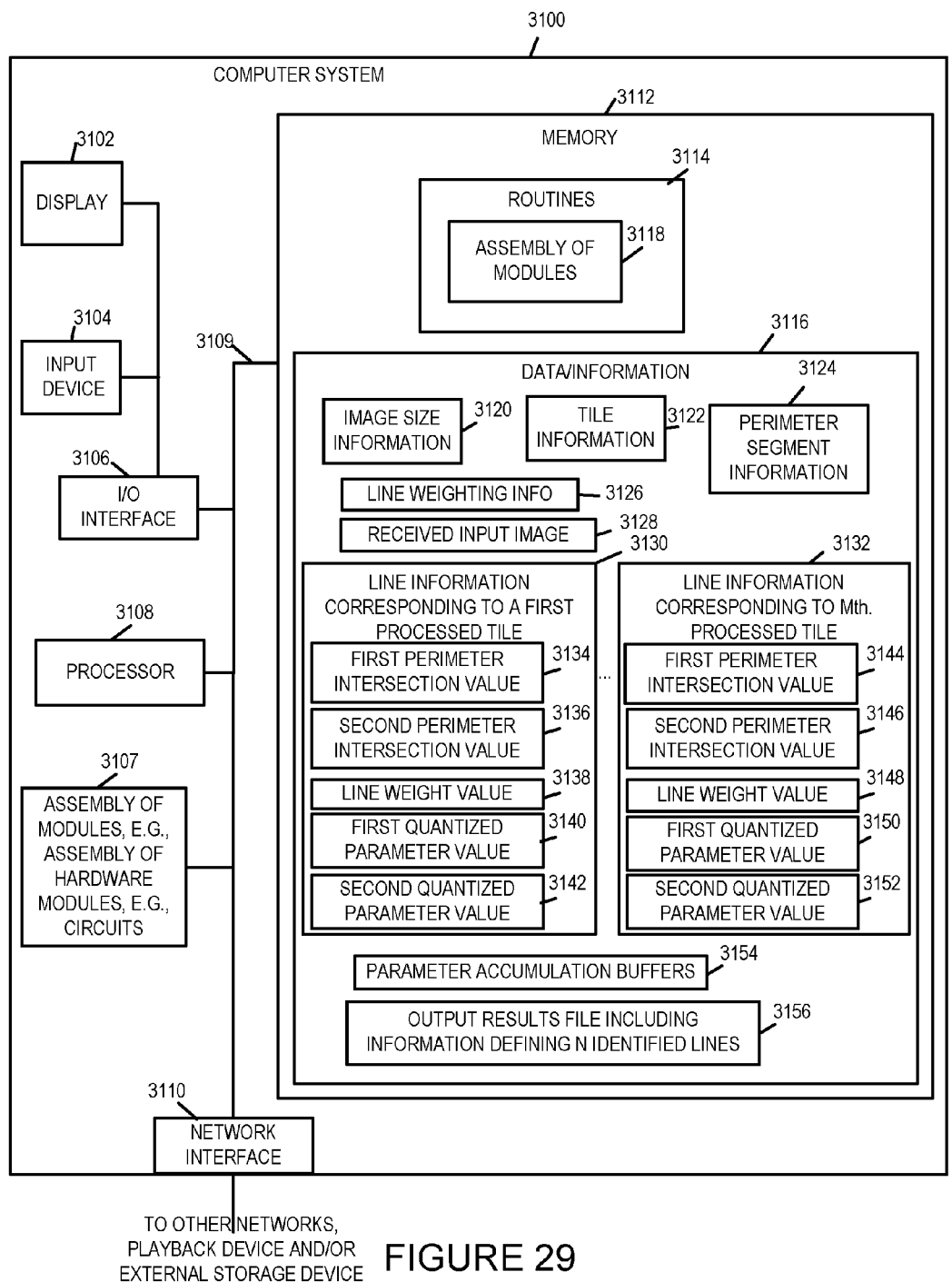
FIG. 29 illustrates an exemplary apparatus, e.g., a computer system, capable of implementing a method to identify lines in an image, in accordance with various embodiments of the present invention.

FIG. 29 illustrates an apparatus, e.g., a computer system 3100, capable of processing data, e.g., image data, in accordance with the present invention. The system 3100 includes various modules for performing the steps of methods of the present invention, e.g., such as the methods of flowchart 100 of FIG. 1, of flowchart 200 FIG. 2, of flowchart 300 of FIG. 3, of flowchart 700 of FIG. 7, and/or flowchart 800 of FIG. 8 and/or the method of flowchart 3000 of FIG. 28. In some embodiments the apparatus also stores both the input image data, e.g., a file including input pixel values corresponding to an image to be processed, and processed image data, e.g., a file including a set of bi-level pixel values representing the image.

Figures 30, 30A:
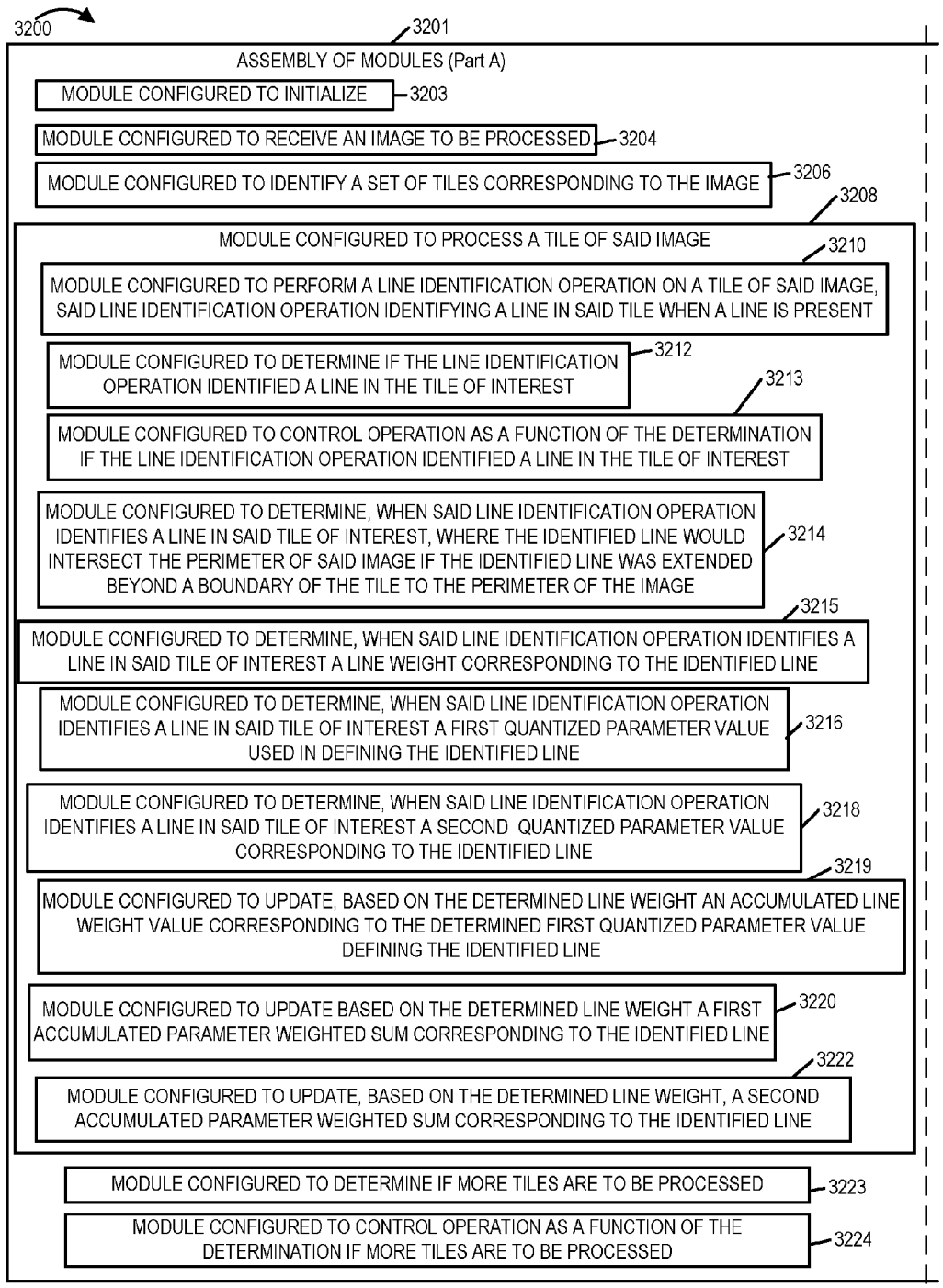
FIG. 30A illustrates a first part of an assembly of modules which can, and in some embodiments is, used in the exemplary system illustrated in FIG. 29 and/or the image processing device of FIG. 35.

As shown in FIG. 29, the computer system 3100 includes a display 3102, an input device 3104, an input/output interface 3106, an assembly of modules 3107, e.g., an assembly of hardware modules, e.g., circuits, a processor 3108, a network interface 3110 and a memory 3112 coupled together by a bus 3109 over which the various elements may exchange data and information. Memory 3112 includes routines 3114 including assembly of modules 3118 and data/information 3116. The display 3102 can be used to display an input image, user selected control information input screens, and results. The user can input control parameters using the input device 3104 which may be, e.g., a keyboard or other input device. The I/O interface 3110 includes transmitters and receivers for transmitting and receiving information. The processor 3108 performs various operations in accordance with the invention, e.g., under direction of routines 3114 and/or one or more of the modules stored in the assembly of modules 3118. In some embodiments, the each of the modules in the assembly of modules 3200 of FIG. 30 is included in assembly of modules 3118 in routines 3114. Routines 3114 includes, e.g., main routines and subroutines. While the assembly of modules 3118 includes various software modules, the modules 3200 in assembly of modules 3200 may and in some embodiments are, implemented in hardware, e.g., in assembly of modules 3107 and/or within processor 3108. In some embodiments, some modules in the assembly of modules 3200 are implemented in hardware and other modules in the assembly of modules 3200 are implemented in software.

Data information 3116 includes image size information 3120, e.g., number of pixels in the image, height and width information, etc., tile information 3122, e.g., the size of a tile, the position of a tile with respect to the image, the number of tiles corresponding to an image, tile index information, etc., perimeter segment information 3124, e.g., the size of a perimeter segment, the index numbering for perimeter segments, information identifying the location of a perimeter segment with respect to the image, etc, and line weighting information 3126, e.g., information defining criteria used to generate a line weight. Data/information 3116 further includes a received input image 3130, and line information corresponding to processed tiles in which a line was found (line information corresponding to a first processed tile 3130, . . . , line information corresponding to a Mth processed tile 3132).

Line information corresponding to a first processed time 3130 includes a first perimeter intersection value 3134, a second perimeter intersection value 3136, a line weight value 3138, a first quantized parameter value 3140, and a second quantized parameter value 3142. In one example PI for the line=(first quantized parameter value, second quantized parameter value).

Line information corresponding to a Mth processed time 3132 includes a first perimeter intersection value 3144, a second perimeter intersection value 3146, a line weight value 3148, a first quantized parameter value 3150, and a second quantized parameter value 3152.

Data/information 3116 further includes parameter accumulator buffers 3154. FIG. 23 illustrates contents of exemplary parameter accumulator buffers including non-zero values after an accumulation phase in one example. Data/information 3116 further includes an output results file including information defining N identified lines. In one example N=4, and there is a pair of parameter values corresponding to each of the four identified lines.

Figure 30B:
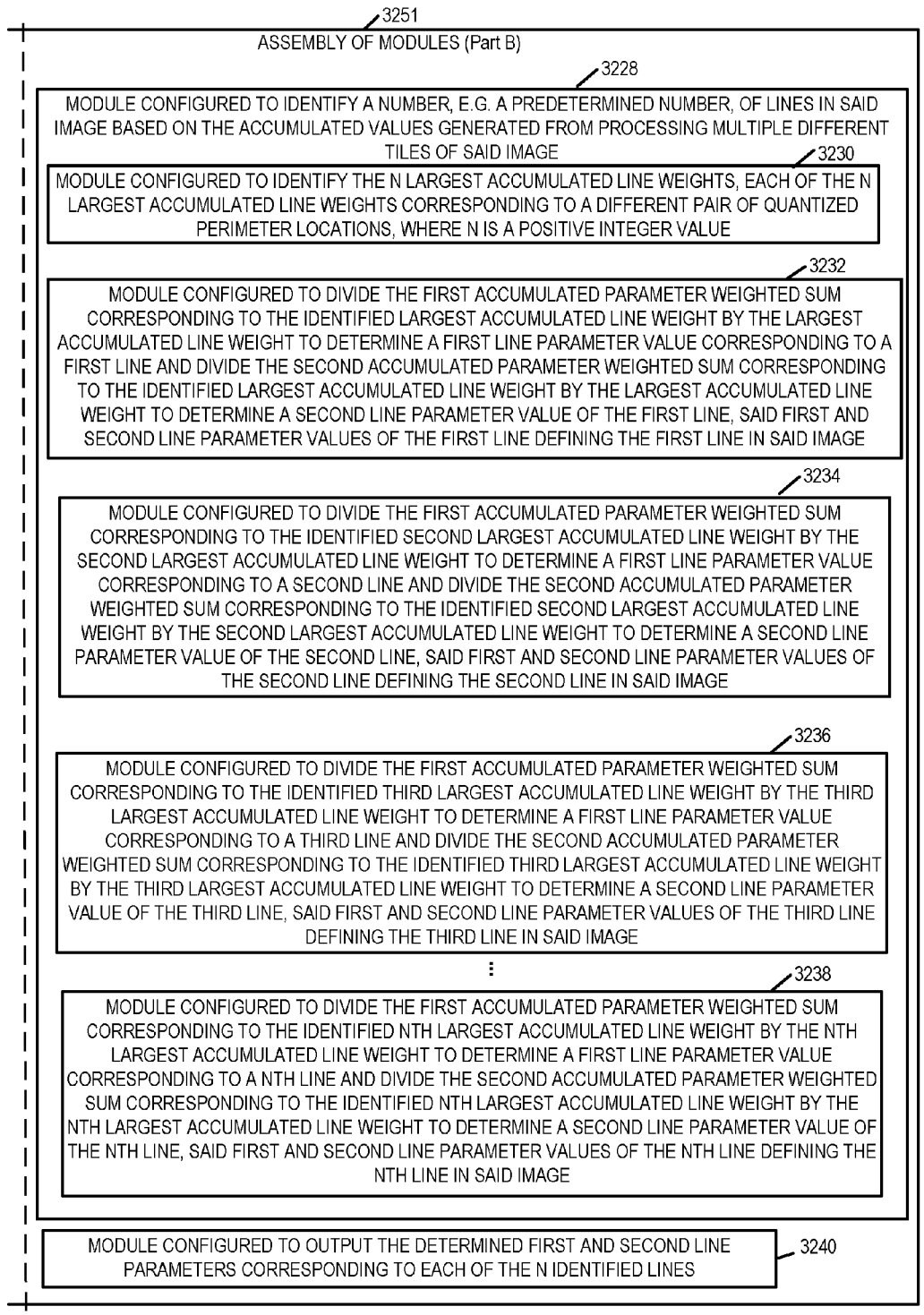
FIG. 30B illustrates a first part of an assembly of modules which can, and in some embodiments is, used in the exemplary system illustrated in FIG. 29 and/or the image processing device of FIG. 35.

FIG. 30, which comprises a combination of FIGS. 30A and 30B illustrates an assembly of modules 3200 which can, and in some embodiments is, used in the exemplary system 3100 illustrated in FIG. 29, e.g., as assembly of modules 3118 and/or 3107. Assembly of modules 3200 includes part A 3201 of the assembly of modules shown in FIG. 30A, part B 3251 of the assembly of modules shown in FIG. 30B. Assembly of modules 3200 can be implemented in hardware within the processor 3108 of the system 3100, e.g., as individual circuits. The modules in the assembly 3200 can, and in some embodiments are, implemented fully in hardware within the processor 3108, e.g., as individual circuits. In other embodiments some of the modules are implemented, e.g., as circuits, within the processor 3108 with other modules being implemented, e.g., as circuits in assembly of modules 3107, external to and coupled to the processor 3108. As should be appreciated the level of integration of modules on the processor and/or with some modules being external to the processor may be one of design choice.

Alternatively, rather than being implemented as circuits, all or some of the modules 3200 may be implemented in software and stored in the memory 3112 of the system 3100 with the modules controlling operation of system 3100 to implement the functions corresponding to the modules when the modules are executed by a processor, e.g., processor 3108. In some such embodiments, the assembly of modules 3200 is included in the memory 3112, e.g., as assembly of modules 3118. In still other embodiments, various modules are implemented as a combination of hardware and software, e.g., with another circuit external to the processor providing input to the processor 3108 which then under software control operates to perform a portion of a module's function. While shown in the FIG. 29 embodiment as a single processor, e.g., computer, it should be appreciated that the processor 3108 may be implemented as one or more processors, e.g., computers.

When implemented in software the modules include code, which when executed by the processor 3108, configure the processor 3108 to implement the function corresponding to the module. In embodiments where the assembly of modules 3200 is stored in the memory 3112, the memory 3112 is a computer program product comprising a computer readable medium comprising code, e.g., individual code for each module, for causing at least one computer, e.g., processor 3108, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 30 control and/or configure the system 3100 or elements therein such as the processor 3108, to perform the functions of the corresponding steps illustrated in the method of flowchart 3000 of FIG. 28. Thus the assembly of modules 3200 includes various modules that perform functions of the corresponding steps of the method shown in FIG. 28.

As illustrated in FIG. 30, the assembly of modules 3200 includes a module 3203 configured to initialize, e.g., initialize constants, parameters, and/or parameter accumulator arrays, a module 3204 configured to receive an image to be processed, and a module 3206 configured to identify a set of tiles corresponding to the image. Assembly of modules 3200 further includes a module 3208 configured to process a tile of said image. Module 3208 includes a module 3210 configured to perform a line identification operation on a tile of said image, said line identification operation identifying a line in said tile when a line is present, a module 3212 configured to determine if the line identification operation identified a line in the tile of interest, a module 3213 configured to control operation as a function of the determination if the line identification operation identified a line in the tile of interest, a module 3214 configured to determine, when said line identification operation identifies a line in said tile of interest, where the identified line would intersect the perimeter of said image if the identified line was extended beyond a boundary of the tile to the perimeter of the image, and a module 3215 configured to determine, when said line identification operation identifies a line in said tile of interest, a line weight corresponding to the identified line. Module 3208 further includes a module 3216 configured to determine when said line identification operation identifies a line in said tile of interest, a first quantized parameter value used in defining the identified line, a module 3218 configured to determine, when said line identification operation identifies a line in said tile of interest, a second quantized parameter value corresponding to the identified line, a module 3219 configured to update, based on the determined line weight, an accumulated line weight value corresponding to the identified line, a module 3220 configured to update, based on the determined line weight, a first accumulated parameter weighted sum corresponding to the identified line, and a module 3222 configured to update, based on the determined line weight, a second accumulated parameter weighted sum corresponding to the identified line.

Assembly of modules 3200 further includes a module 3223 configured to determine whether more tiles are to be processed, a module 3224 configured to control operation as a function of the determination whether more tiles are to be processed, and a module 3228 configured to identify a number, e.g., a predetermined number, of lines in said image based on the accumulated values generated from processing multiple different tiles of said image. Module 3228 includes a module 3230 configured to identify the N largest accumulated line weights, each of the N largest accumulated line weights corresponding to a different pair of quantized perimeter locations, where N is a positive integer value, a module 3232 configured to divide the first accumulated parameter weighted sum corresponding to the identified largest accumulated line weight by the largest accumulated line weight to determine a first parameter value corresponding to a first line and divide the second accumulated parameter weighted sum corresponding to the identified largest accumulated line weight to determine a second line parameter value of the first line, said first and second line parameter values of the first line defining the first line in said image, a module 3234 configured to divide the first accumulated parameter weighted sum corresponding to the identified second largest accumulated line weight by the second largest accumulated line weight to determine a first parameter value corresponding to a second line and divide the second accumulated parameter weighted sum corresponding to the identified second largest accumulated line weight to determine a second line parameter value of the second line, said first and second line parameter values of the second line defining the second line in said image, a module 3236 configured to divide the first accumulated parameter weighted sum corresponding to the identified third largest accumulated line weight by the third largest accumulated line weight to determine a first parameter value corresponding to a third line and divide the second accumulated parameter weighted sum corresponding to the identified third largest accumulated line weight to determine a second line parameter value of the third line, said first and second line parameter values of the third line defining the third line in said image, and a module 3238 configured to divide the first accumulated parameter weighted sum corresponding to the identified Nth largest accumulated line weight by the Nth largest accumulated line weight to determine a first parameter value corresponding to a Nth line and divide the second accumulated parameter weighted sum corresponding to the identified Nth largest accumulated line weight to determine a second line parameter value of the Nth line, said first and second line parameter values of the Nth line defining the Nth line in said image. Assembly of modules 3200 further includes a module 3240 configured to output the determined first and second line parameters corresponding to each of the N identified lines.

In some embodiments, one or more modules shown in FIG. 30 which are included within another module may be implemented as an independent module or modules.

Figure 31:
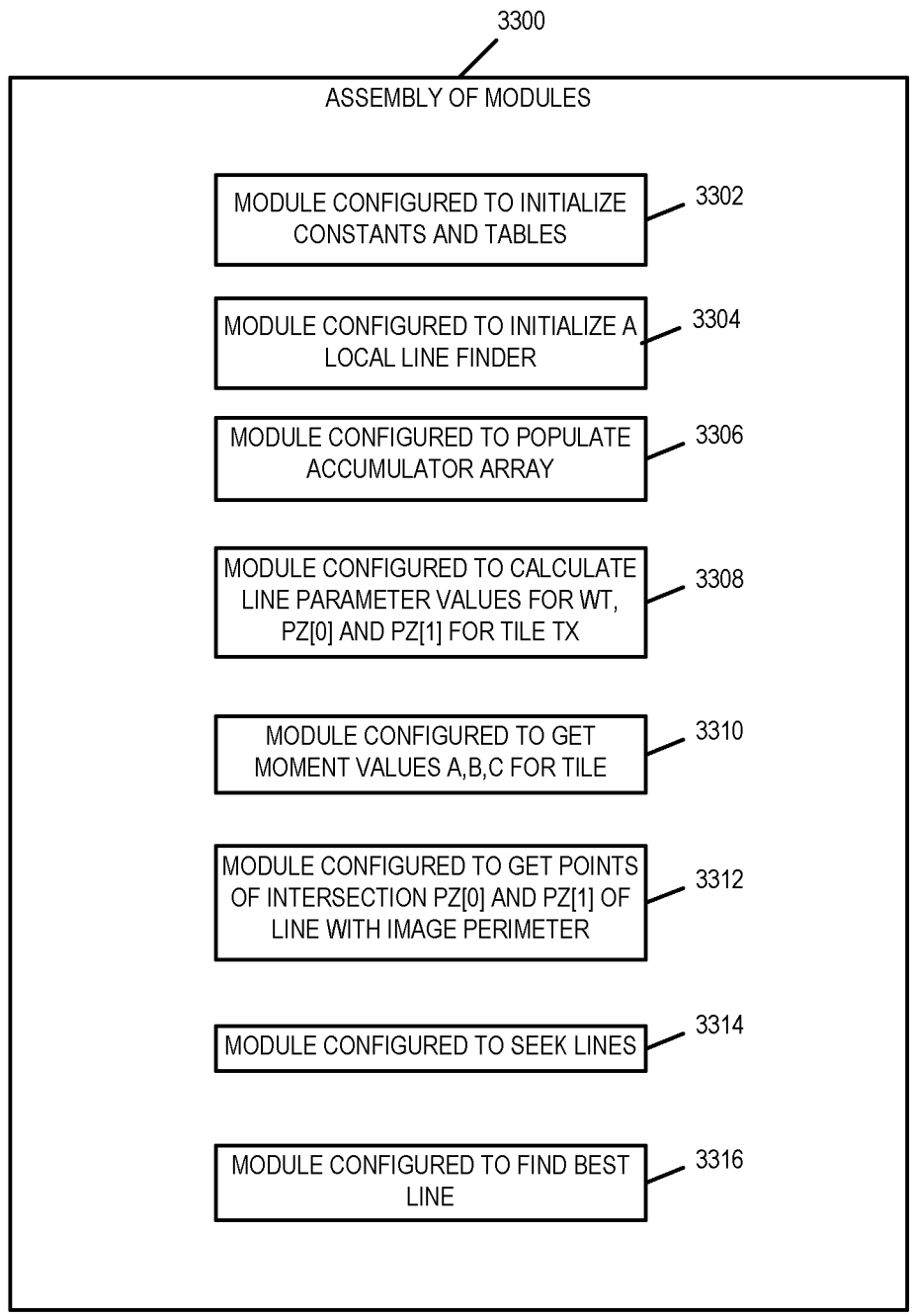
FIG. 31 illustrates an assembly of modules which can, and in some embodiments is, used in the exemplary system illustrated in FIG. 29 and/or the image processing device of FIG. 35.

FIG. 31 illustrates an assembly of modules 3300 which can, and in some embodiments is, used in the exemplary system 3100 illustrated in FIG. 29, e.g., as assembly of modules 3118 and/or 3107. Assembly of modules 3300 can be implemented in hardware within the processor 3108 of the system 3100, e.g., as individual circuits. The modules in the assembly 3300 can, and in some embodiments are, implemented fully in hardware within the processor 3108, e.g., as individual circuits. In other embodiments some of the modules are implemented, e.g., as circuits, within the processor 3108 with other modules being implemented, e.g., as circuits in assembly of modules 3107, external to and coupled to the processor 3108. As should be appreciated the level of integration of modules on the processor and/or with some modules being external to the processor may be one of design choice.

Alternatively, rather than being implemented as circuits, all or some of the modules 3300 may be implemented in software and stored in the memory 3112 of the system 3100 with the modules controlling operation of system 3100 to implement the functions corresponding to the modules when the modules are executed by a processor, e.g., processor 3108. In some such embodiments, the assembly of modules 3200 is included in the memory 3112, e.g., as assembly of modules 3118. In still other embodiments, various modules are implemented as a combination of hardware and software, e.g., with another circuit external to the processor providing input to the processor 3108 which then under software control operates to perform a portion of a module's function. While shown in the FIG. 29 embodiment as a single processor, e.g., computer, it should be appreciated that the processor 3108 may be implemented as one or more processors, e.g., computers.

When implemented in software the modules include code, which when executed by the processor 3108, configure the processor 3108 to implement the function corresponding to the module. In embodiments where the assembly of modules 3300 is stored in the memory 3112, the memory 3112 is a computer program product comprising a computer readable medium comprising code, e.g., individual code for each module, for causing at least one computer, e.g., processor 3108, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 31 control and/or configure the system 3100 or elements therein such as the processor 3108, to perform the functions of the corresponding steps illustrated in the method of flowcharts of FIGS. 1-9. Thus the assembly of modules 3300 includes various modules that perform functions of the corresponding steps of the method shown in FIGS. 1-9.

As illustrated in FIG. 31, the assembly of modules 3300 includes a module 3302 configured to initialize constants and tables, a module 3304 configured to initialize a local line finder, a module 3306 configured to populate accumulator arrays, a module 3308 configured to calculate line parameter values for WT, PZ[0] and PZ[1] for tile TX, a module 3310 configured to get moment values A, B, C for a tile, a module 3312 configured to get points of intersection PZ[0] and PZ[1] of a line with the image perimeter, a module 3314 configured to seek lines, and a module 3316 configured to fine a best line. In some embodiments, module 3302 implements the flowchart of FIG. 2; module 3304 implements, the flowchart of FIG. 9, module 3306 implements the flowchart of FIG. 3; module 3308 implements the flowchart of FIG. 4; module 3310 implements the flowchart of FIG. 5; module 3312 implements the flowchart of FIG. 6; module 3314 implements the flowchart of FIG. 7; and module 3316 implements the flowchart of FIG. 8. In various embodiments, a step within a flowchart may be implemented by one or more modules or sub-modules configured to perform the operation described by the step.

In one particular application of the line identification techniques described herein, the process starts with a quadrilateral image, e.g. of a receipt, printed form, etc., that was captured in a two-dimensional form using scanning or another image capture technique. The process begins with the non-rectangular quadrilateral image and after detection of lines used to identify edges, involves modification of the non-rectangular image to make it rectangular. In some embodiments this is done by applying an appropriate perspective modification to the image representing the scanned object. In some embodiments it is assumed that the scanned representation of the object lies entirely or mostly within the image so that all or most of each edge of the object is clearly visible. To find the required image modification, the captured, e.g., nonrectangular, image is processed to automatically find the four corners of the quadrilateral object in the image, a modification matrix is computed, and then that matrix is used to modify the image and turn the quadrilateral into a rectangle. Note that it is not required that all four corners lie within the image boundaries. A scenario is even possible, and may occur in some cases, where all four corners lie outside the image boundaries and rectification is still possible. In such cases the coordinates of the "corners" can still be defined with the corners simply lying outside the image boundaries.

In order to automate the image correction process in some embodiments the method and apparatus uses an automated process to find the lines of the object, e.g., perimeter border lines, in the input image and find the four corners that are best able to be used to compute the perspective modification to be used to generate an output image with the quadrilateral object turned into a rectangle.

Thus, in various embodiments through the detection and use of information about lines in the image, the quadrilateral object in an image is automatically detected and its four corners found.

In some embodiments the method involves obtaining, an input image that is in a grayscale format or is converted to grayscale if not grayscale already. The acquisition of a grayscale image may be done by photographing or scanning the object of interest. Next, in some but not all embodiments a local filtering operation is performed, e.g., a morphological operation is performed on portions of the image, such as a close operation for example. Such an operation diminishes unnecessary details while preserving the object's edges in most cases. Then, an edge, e.g., line, detection method is used to find edges in the image and return up to some number of candidate lines, e.g., 16 lines, along with a weight for each line. The weight may be and in some embodiments is a function of the length of the line and its strength with longer lines being given a higher weight in some embodiments than shorter lines of the same strength. The straight lines are analyzed to identify the lines that are most likely to coincide with edges of the object in the image being processed. The method takes advantage of the fact that four lines of the image should align with the true edges of the object in the image and that the two most likely vertical edge lines should be close to parallel to each other and separated apart from each other the largest distance of any two vertical lines assuming they mark the edge of the scanned document. Similarly the two most likely horizontal edge lines should be close to parallel to each other and separated apart from each other the largest distance of any two horizontal lines assuming they mark the horizontal edges of the scanned document.

As discussed above, the line detection process returns a weight as well as information about the location of a line detected in the image. The weight that is determined for each line is a measure of the contrast between the two gray-levels on both sides of the line and can be used as an indication of the strength of the edge and its location. A greater weight means a better candidate for the actual edge of the object.

The candidate lines are next classified according to being of predominantly up-down or left-right orientation. Within each classification, in some embodiments, lines that don't meet minimum weight and length criteria are removed. From the reduced set of candidate lines in the two classes, the two up-down lines that are most likely to align with the left and right edges of the object are selected. A good criterion to use would be to select the two up-down lines that are farthest apart. Similarly, two left-right lines that are most likely to align with the top and bottom edges of the object are selected. A good criterion to use is to select the two left-right lines that are farthest apart. In some embodiments this line selection criteria is used. From these four candidate lines, the four intersections of these lines are computed; these are the best estimates of the four corners of the object now successfully detected in the image. It may be and sometimes is considered okay for any of the four corners to lie outside the source image, as would happen, for example, if one or more of the corners had been clipped out of the image.

Based on the line location information, the coordinates in the source image of the quadrilateral object's four corners are used together with the coordinates in the output image of the rectangle into which the quadrilateral is to be converted to generate the parameters of the sought-after perspective modification. If it is just the object itself that is of interest, as it usually is, then the coordinates of the output rectangle can be, and sometimes are, set to the four corners of the output image itself so that the output rectangle is the entire output image, i.e., the four edges of the quadrilateral object in the source image are now the borders of the output image. One way to do this is to set the width of the output image to the average length of the top and bottom edges of the found quadrilateral in the source image and set the height of the output image to the average length of the left and right edges of the found quadrilateral in the source image. This approach is used in some embodiments. After generating the parameters of the perspective to be used for the image modification, the image modification is made to the source image to yield an output image of the quadrilateral object into a rectangle.

The modified, now rectangular image is then stored, displayed, printed, transmitted and/or otherwise output.

In some embodiments the processing of detected lines and associated weights involves first classifying the lines as having either up-down or left-right orientation using a criterion of the difference in the vertical y coordinates (call it delta_y) versus the difference in the horizontal x coordinates (call it delta_x) for each line. For each class, i.e., the vertical group of lines and the horizontal group of lines, at least the first two lines found with the greatest weights, and therefore most likely to align with the two opposite edges of the object, are kept. However, they may not be the true edges of the object but rather edges detected within the object or outside the object, and therefore additional lines are also considered. To find additional candidate lines, identified lines are examined in decreasing weight order, and those lines whose weight is greater than some fraction of the weight of the previously considered line are kept for further consideration. An additional condition that should hold for candidate lines is that the height of up-down lines is greater than some fraction of the input image height and the width of left-right lines is greater than some fraction of the input image width so that stray short lines can be ignored. After the identified lines have been examined, there should be at least two up-down and two left-right candidate lines, possibly more, to further process.

The relative weight checking process first uses a small scale factor to decide whether the considered weight is still large enough compared to its predecessor that the corresponding line should be kept as a candidate for further processing but not too small to deem it a candidate line. After that, the scale factor is increased so that subsequent lines, but not other lines, with weights that are close in value are retained. When the weight of a line falls by more than the scale factor times its predecessor, the line is removed from further consideration. For example, in some but not necessarily all embodiments, after the first two lines, the weight of the next line is allowed to be as little as, but no less than, 10% of the weight of the preceding line and after that the weight of each subsequent line must be at least 70% of the weight of its predecessor.

From the group, e.g., class, of up-down lines, the two lines that are most likely to align with the true left and right edges of the quadrilateral object in the image are selected. This can be, and sometimes is done, by finding the two lines that are farthest apart horizontally. From the class of left-right lines, the two lines that are most likely to align with the true top and bottom edges of the quadrilateral object in the image are selected. This can be done by finding the two lines that are farthest apart vertically. Then find the intersections of those lines; these intersections are the coordinates of the four corners to be used for determining the image modification to be preformed to modify the image and convert the quadrilateral object in the input image into an image which is a rectangle suitable for output or use.

Figure 32A:
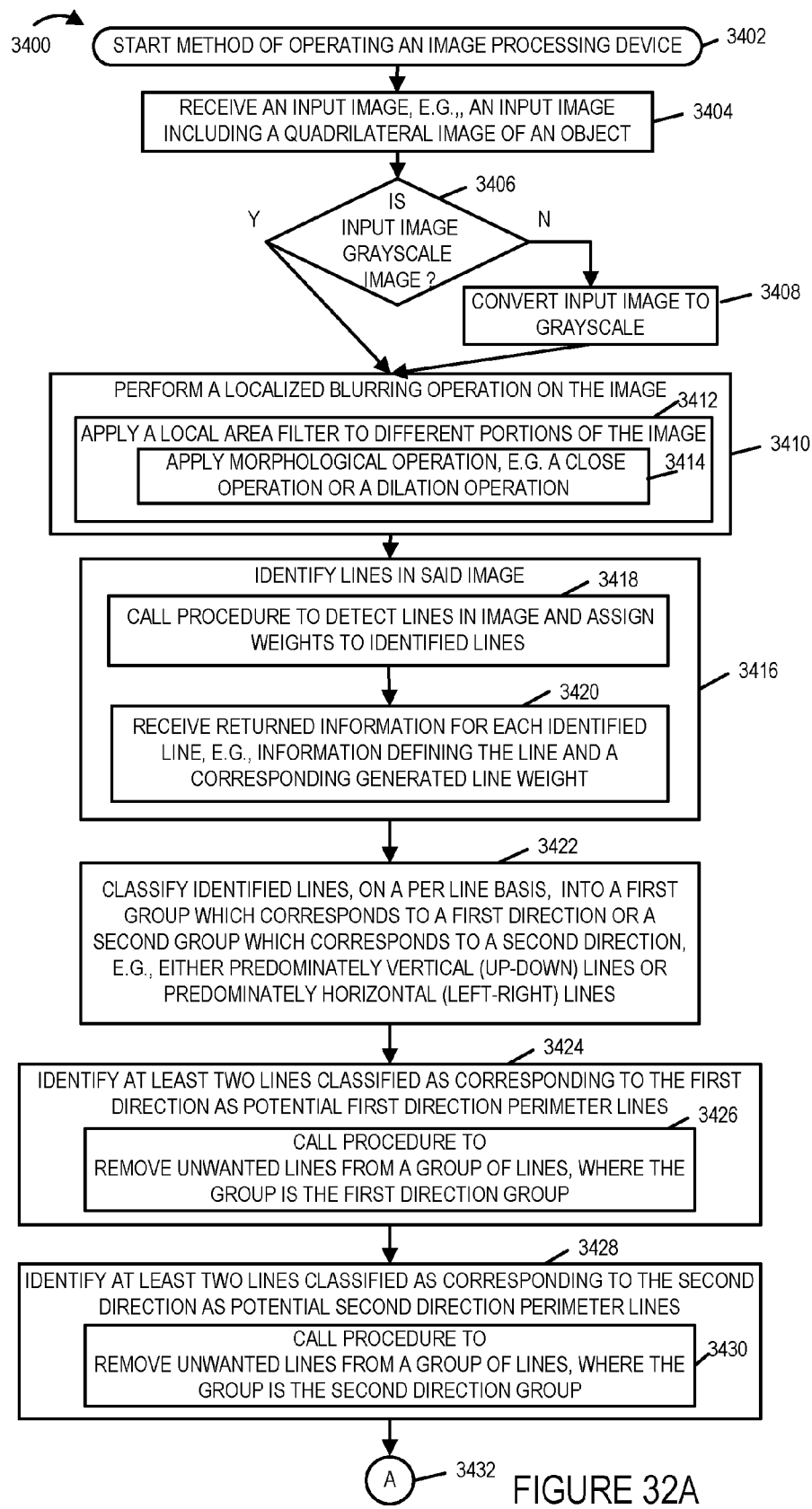
FIG. 32A is a first part of a flowchart of an exemplary method of operating an image processing device in accordance with an exemplary embodiment.
Figures 32, 32A, 32B:
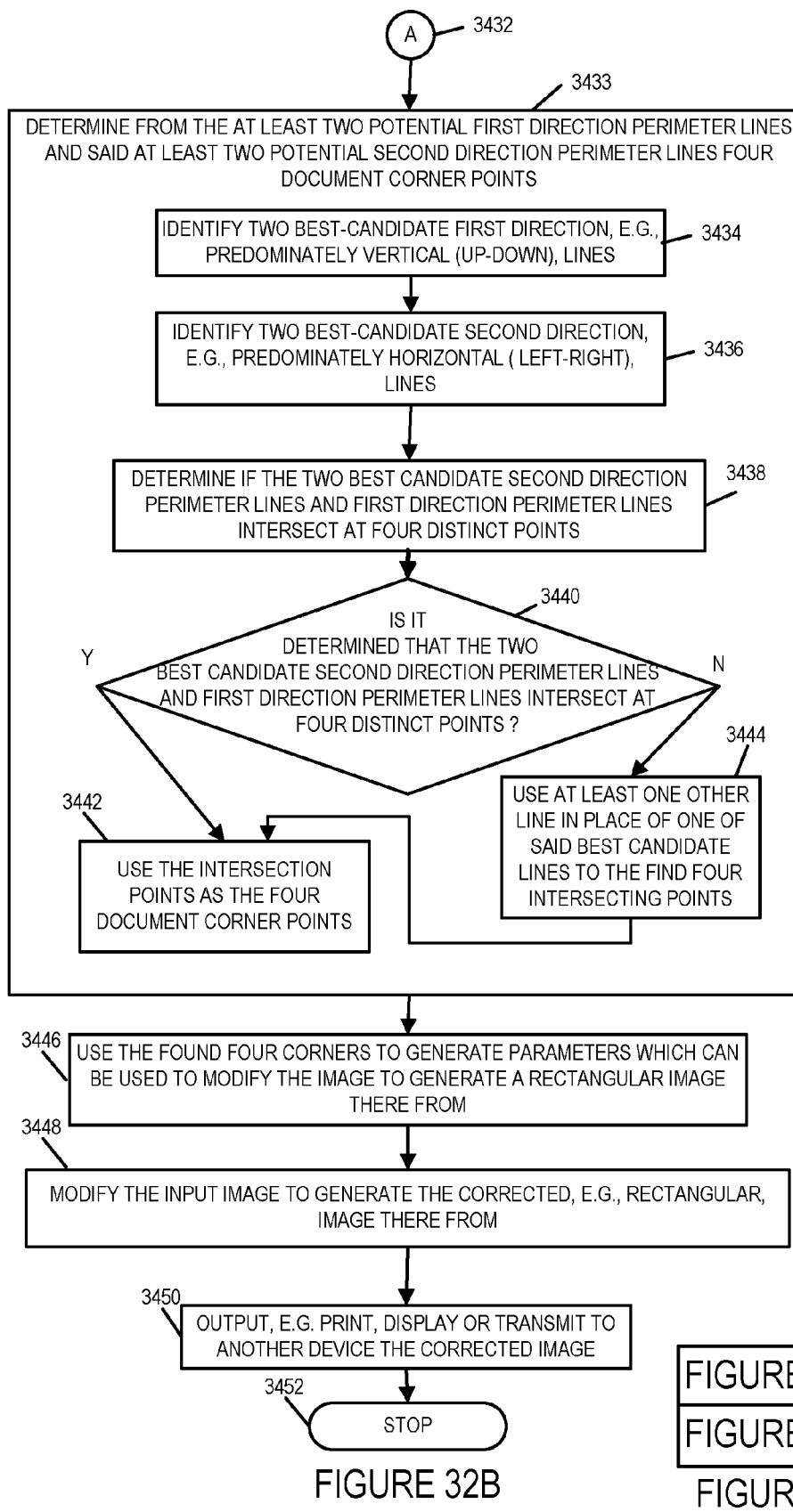
FIG. 32B is a second part of a flowchart of an exemplary method of operating an image processing device in accordance with an exemplary embodiment.

FIG. 32, comprising the combination of FIG. 32A and FIG. 32B, is a flowchart 3400 of an exemplary method of operating an image processing device, e.g., image processing device 3500 of FIG. 37, in accordance with an exemplary embodiment. Operation of the exemplary method starts in step 3402, in which the image processing device is powered on and initialized. Operation proceeds from step 3402 to step 3404. In step 3404 the image processing device receives an input image, e.g., an input image including a quadrilateral image of an object. In some embodiments, the quadrilateral image of the object is a non-rectangular quadrilateral image corresponding to a rectangular object. For example, the object is a rectangular shaped document, receipt, printed form, etc., and the non-rectangular quadrilateral image is from a scanned version of the document, receipt, or printed form. Operation proceeds from step 3404 to step 3406, in which the image processing device checks if the input image is a grayscale image. If the input image is a grayscale image, then operation proceeds from step 3406 to step 3410; otherwise, operation proceeds from step 3406 to step 3408. In step 3408 the image processing device converts the input image to grayscale. Operation proceeds from step 3408 to step 3410.

In step 3410 the image processing device performs a localized blurring operation on the image, e.g., on the grayscale input image or on the grayscale image corresponding to the input image. Step 3410 includes step 3412 in which the image processing device applies a local area filter to different portions of the image. Step 3412 includes step 3414 in which the image processing device applies a morphological operation, e.g., a close operation or a dilation operation. The morphological operation, in some embodiments, diminishes unnecessary details while preserving object edges. Operation proceeds from step 3410 to step 3416.

In step 3416 the image processing device identifies lines in said image. Step 3416 includes steps 3418 and 3420. In step 3418 the image processing device calls a procedure to detect lines in the image and assign line weights to the identified lines. In some embodiments, the weight is a function of the length of the line and its strength with longer lines being given a higher weight in some embodiments than shorter lines of the same strength. The weight that is determined for each line is a measure of the contrast between the two gray-levels on both sides of the line and can be used as an indication of the strength of the edge and its location. A greater weight means a better candidate for the actual edge of the object. In some embodiments, the procedure used to detect lines is implemented by the method of flowchart 3000 of FIG. 28 and/or the method of flowchart 100 of FIG. 1. Operation proceeds from step 3418 to step 3420, in which the image processing device receives returned information for each identified line, e.g., information defining the lines and a corresponding generated line weight. Operation proceeds from step 3416 to step 3422.

In step 3422 the image processing device classifies identified lines, on a per line basis, into a first group which corresponds to a first direction or a second group which corresponds to a second direction, said second direction being perpendicular to said first direction, e.g., either predominately vertical (up-down) lines or predominately horizontal (left-right) lines. In some embodiments, classifying lines as having either up-down or left-right orientation uses a criterion of the difference in the vertical y coordinates, e.g., delta_y, versus the difference in the horizontal x coordinates, e.g., delta_x, for each line.

Operation proceeds from step 3422 to step 3424, in which the image processing device identifies at least two lines classified as corresponding to the first direction as potential first-direction perimeter lines. Step 3424 includes step 3426 in which the image processing device calls a procedure to remove unwanted lines from a group of lines, where the group of lines is the first-direction group. In one exemplary embodiment, the procedure to remove unwanted line which is called is implemented in accordance with flowchart 3500 of FIG. 33.

Operation proceeds from step 3424 to step 3428, in which the image processing device identifies at least two lines classified as corresponding to the second direction as potential second-direction perimeter lines. Step 3428 includes step 3430, in which the image processing device calls a procedure to remove unwanted lines from a group of lines, where the group of lines is the second-direction group. In one exemplary embodiment, the procedure to remove unwanted lines which is called is implemented in accordance with flowchart 3500 of FIG. 33.

Operation proceeds from step 3428, via connecting A 3432, to step 3433. In step 3433 the image processing device determines four document corner points from the at least two potential first-direction perimeter lines and said at least two potential second-direction perimeter lines. Step 3433 includes step 3434, 3436, 3438, 3440, 3442 and 3444. In step 3434, the image processing device identifies the two best candidate first-direction, e.g., predominately vertical (up-down), lines. In some embodiments, identifying the two best candidate first-direction lines includes selecting two lines from the remaining set of first-direction lines based on the distance between lines in said set of remaining potential first-direction perimeter lines, e.g., select the two lines furthest away from each other as the two best candidate first-direction, e.g., predominately vertical, perimeter lines. Operation proceeds from step 3434 to step 3436. In step 3436 the image processing device identifies the two best candidate second direction, e.g., predominately horizontal (left-right), lines. In some embodiments, identifying the two best candidate second-direction lines includes selecting two lines from the remaining set of second-direction lines based on the distance between lines in said set of remaining potential second-direction perimeter lines, e.g., select the two lines furthest away from each other as the two best candidate second-direction, e.g., predominately horizontal, perimeter lines. Operation proceeds from step 3436 to step 3438. In step 3438, the image processing device determines if the two best candidate second-direction perimeter lines and the two best candidate first-direction perimeter lines intersect at four distinct points, e.g., within a predetermined region. In some embodiments, the predetermined region corresponds to the size of the input image. In some other embodiments, the predetermined region corresponds to a region slightly larger than the size of the input image, e.g., a region 130% the size of the input image, e.g., to allow for a corner to object to be outside the boundaries of the input image.

Operation proceeds from step 3438 to step 3440. In step 3440 the image processing device controls operation as a function of the determination if the two best candidate second-direction perimeter lines and the two best candidate first-direction perimeter lines intersect at four distinct points, e.g., within a predetermined region. If it is determined that the two best candidate second-direction perimeter lines and the two best candidate perimeter lines intersect at four distinct points, then operation proceeds from step 3440 to step 3442, in which the image processing device uses the intersection points as the four document corner points. Returning to step 3440, if it is determined that the two best candidate second-direction perimeter lines and the two best candidate perimeter lines do not intersect at four distinct points, e.g., within a predetermined region, then operation proceeds from step 3440 to step 3444, in which the image processing device uses at least one other line in place of one of said best candidate lines to find the four intersecting points. Operation proceeds from step 3444 to second 3442, in which the image processing device uses the intersection points as the four document corner points. Operation proceeds from step 3433 to step 3446.

In step 3446 the image processing device uses the found four corner points to generate parameters which can be used to modify the image to generate a rectangular image there from. In some embodiments, the generated parameters include parameters of a modification matrix. Operation proceeds from step 3446 to step 3448, in which the image processing device modifies the input image to generate the corrected, e.g., rectangular image there from. In some embodiments, modifying the image to generate the corrected image includes performing a perspective transform based on the determined document corner points. Operation proceeds from step 3448 to step 3450. In step 3450 the image processing device outputs, e.g., prints, displays, and/or transmits to another device the corrected image. Operation proceeds from step 3450 to stop step 3452

Figure 33:
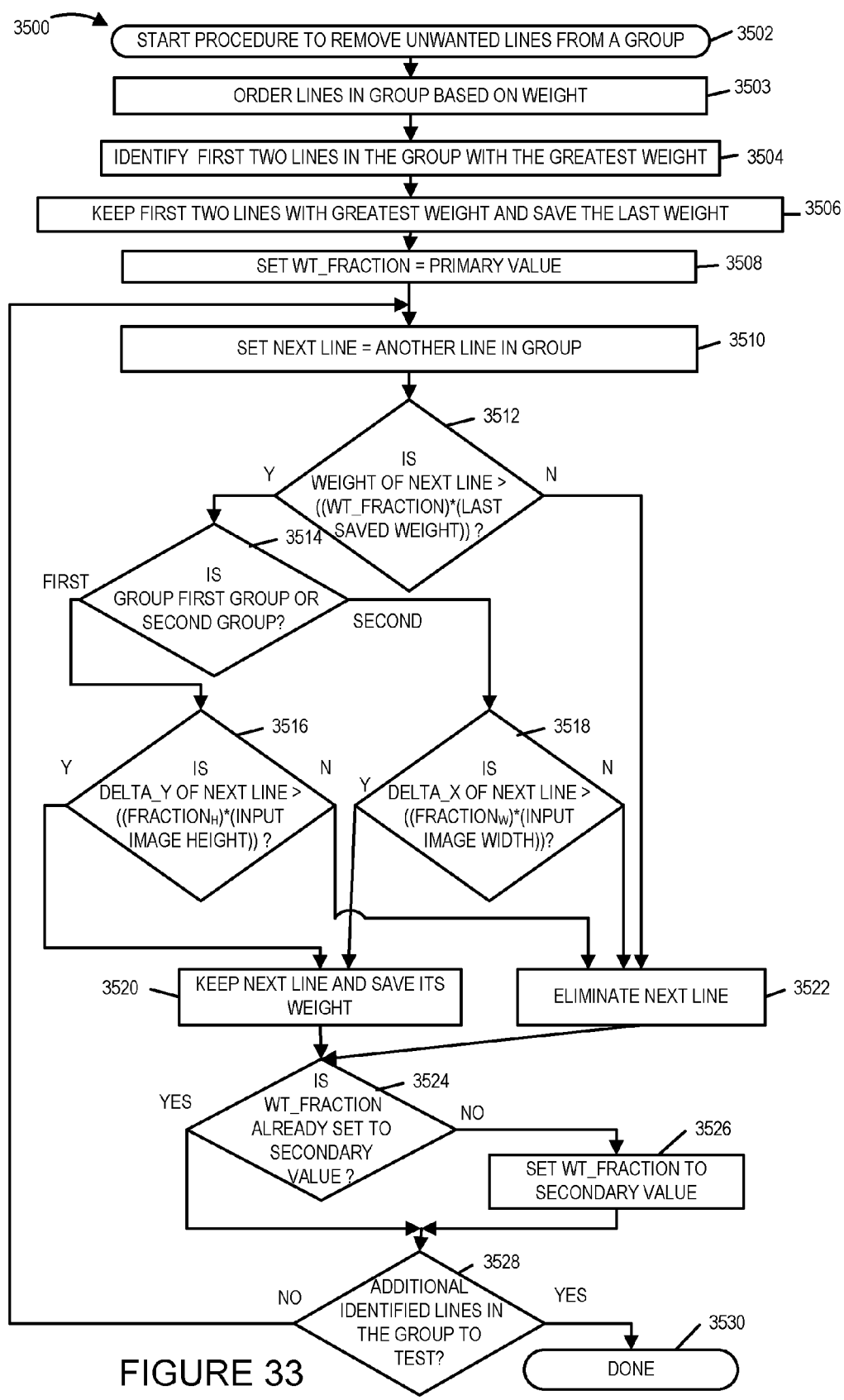
FIG. 33 is a flowchart of an exemplary method of removing unwanted lines from a group of lines in accordance with an exemplary embodiment.

FIG. 33 is a flowchart 3500 of an exemplary method of removing unwanted lines from a group of lines, e.g., a group of predominately vertical lines or a group of predominately horizontal lines, in accordance with an exemplary embodiment. Flowchart 3500 may be implemented by an image processing device, e.g., image processing device 3700 of FIG. 35.

Operation of the exemplary method of flowchart 3500 starts in step 3502 in which the image processing device starts executing the procedure to remove unwanted lines from a group. Operation proceeds from step 3502 to step 3503 in which the image processing device orders lines in the group based on weight, e.g., from greatest weight to lowest weight. Operation proceeds from step 3503 to step 3504. In step 3504 the image processing device identifies the first two lines in the group with the greatest weight. The Operation proceeds from step 3504 to step 3506, in which the image processing device keeps the first two lines in the group with the greatest weight and saves the last weight as LAST SAVED WEIGHT, e.g., the weight corresponding to the line with the second greatest weight in the group. Operation proceeds from step 3506 to step 3508.

In step 3508 the image processing device sets the value of WT_FRACTION=primary value, e.g., an predetermined initial test criteria used as part of testing to determine whether or not to keep the identified line in the group corresponding to the third highest weight. In one embodiment, primary value=0.10. Operation proceeds from step 3508 to step 3510.

In step 3510 the image processing device sets next line=another line in the group. For example, since the line corresponding to the greatest line weight and line corresponding to the second highest weight have already been processed, the next line is set to another line in the group, which is the line corresponding to the third highest weight. Operation proceeds from step 3510 to step 3512.

In step 3512, the image processing device compares the weight corresponding to the next line being tested, to (the value of WT_FRACTION)*(the value of the last saved weight). If weight of next line is greater than (WT_FRACTION)*(LAST SAVED WEIGHT), then operation proceeds from step 3512 to step 3514; otherwise, operation proceeds to step 3522 in which the next line is eliminated as a potential perimeter line. Returning to step 3514, in step 3514, the image processing device determines if the group being processed is a first group, e.g., a group of predominately vertical lines, or a second group, e.g., a group of predominately horizontal lines. If the group is a first group, then operation proceeds from step 3514 to step 3516. If the group is a second group, then operation proceeds to step 3518.

In step 3516 the image processing device compares DELTA_Y of next line to (the value of $FRACTION_H$)*(the value of the input image height), where DELTA_Y is a vertical direction length measurement of next line, and $FRACTION_H$ is a predetermined fractional value used to decide whether to keep or eliminate a line based on vertical length criteria. If the value of DELTA_Y of next line is greater than the value of (($FRACTION_H$)*(input image height), then operation proceeds from step 3516 to step 3520, in which the image processing device keeps the next line and saves its weight as LAST SAVED WEIGHT; otherwise, operation proceeds from step 3516 to step 3522 in which the image processing device eliminates next line as a potential perimeter line.

Returning to step 3518, in step 3518 the image processing device compares DELTA_X of next line to (the value of $FRACTION_W$)*(the value of the input image width), where DELTA_X is a horizontal direction length measurement of next line, and $FRACTION_W$ is a predetermined fractional value used to decide whether to keep or eliminate a line based on horizontal length criteria. If the value of DELTA_X of next line is greater than the value of (($FRACTION_W$)*(input image width), then operation proceeds from step 3518 to step 3520, in which the image processing device keeps the next line and saves its weight as LAST SAVED WEIGHT; otherwise, operation proceeds from step 3518 to step 3522 in which the image processing device eliminates next line as a potential perimeter line. In some embodiments, $FRACTION_H$ is the same as $FRACTION_W$. In some embodiments, $FRACTION_H$ and $FRACTION_W$ are a function of input image size and the expected size of the object, e.g., rectangular document, attempting to be detected.

Operation proceeds from step 3520 or step 3522 to step 3524, in which the image processing device determines whether or not WT_FRACTION has already been set to a secondary value and controls operation as a function of the determination. If WT_FRACTION has already been set to a secondary value, then operation proceeds from step 3524 to step 3528; otherwise, operation proceeds from step 3524 to step 3526, in which the image processing device sets WT_FRACTION to secondary value. In one exemplary embodiment secondary value=0.70. Operation proceeds from step 3526 to step 3528.

In step 3528 the image processing device determines whether or not additional lines in the group need to be tested. If there are additional lines in the group remaining to be tested, then operation proceeds from step 3528 to step 3510, in which the image processing device sets next line equal to another line in the group which has not been tested. For example, next line is set to the line in the group which corresponds to the next highest weight line in the group which has not been tested to determine whether the line should be kept as a candidate or eliminated, e.g., the fourth highest weight line. Returning to step 3528, if there are no more lines in the group to be tested, then operation proceeds from step 3528 to done step 3530, indicating that procedure has completed.

Thus a group of lines has been pruned using the line weight testing criteria of step 3512 and the line length testing criteria of step 3516 or 3518 to eliminate unwanted lines from the group. The line testing criteria of steps 3516 and 3518 is used to eliminate stray short lines. This pruning results in a set of at least two lines, e.g., a set of at least two lines classified as corresponding to the first direction or a set of at least two lines classified as corresponding to the second direction. The set of at least two lines being a set of potential perimeter lines, e.g., a set of potential first-direction perimeter lines or a set of potential second-direction perimeter lines.

Figures 34, 34A, 34B:
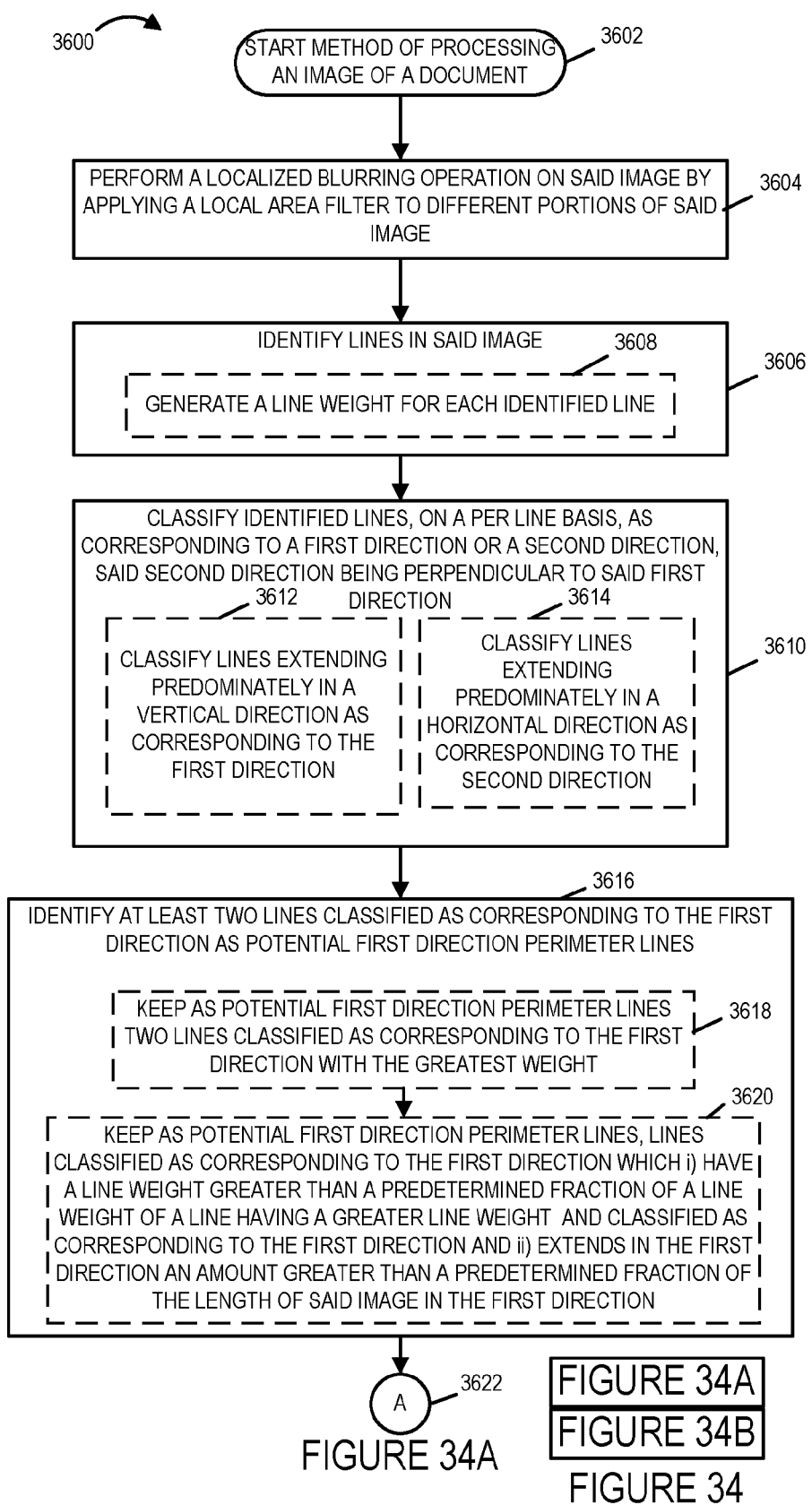
FIG. 34A is a first part of a flowchart of an exemplary method of processing an image in accordance with an exemplary embodiment.
FIG. 34B is a second part of a flowchart of an exemplary method of processing an image in accordance with an exemplary embodiment.
Figure 34B:
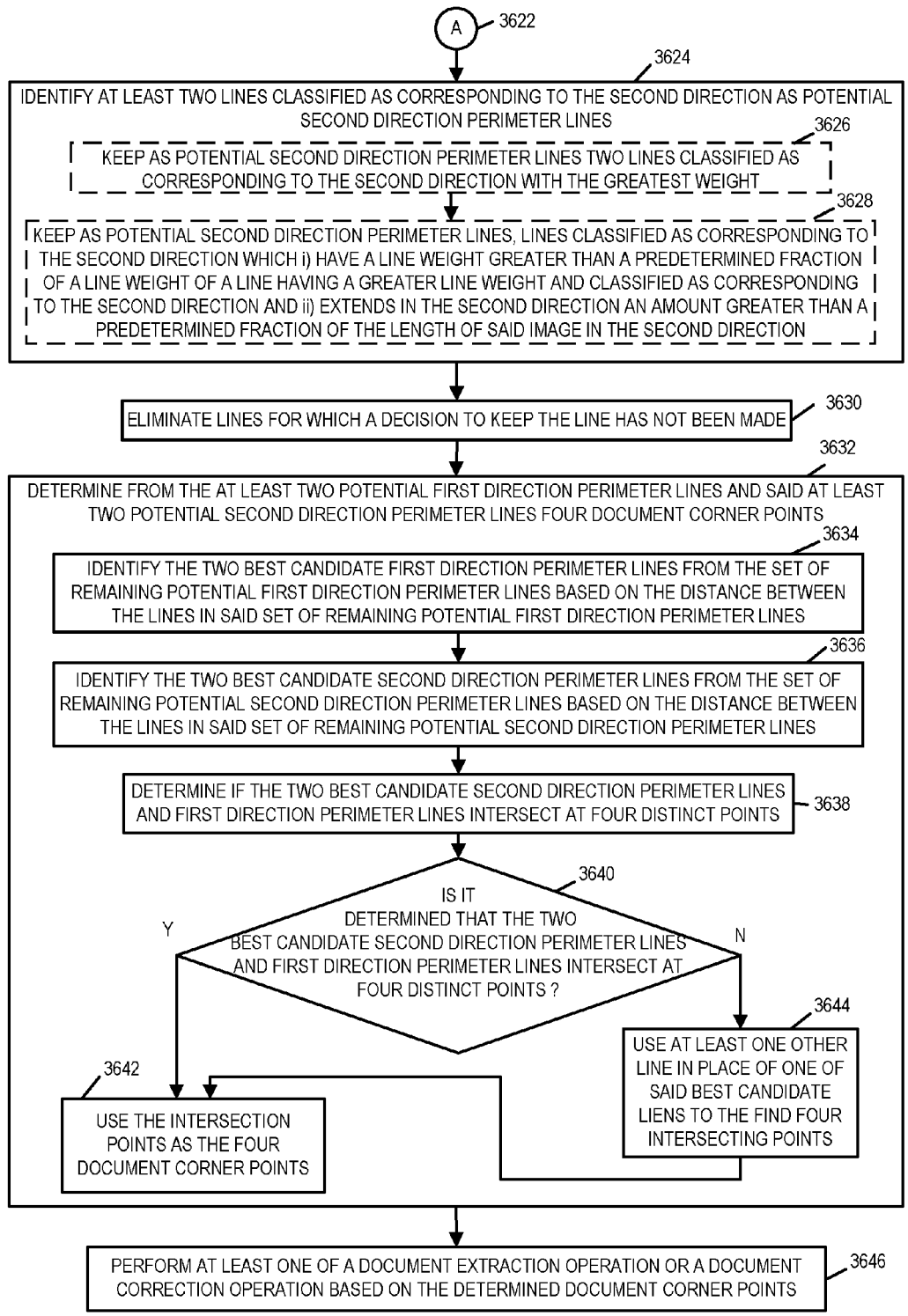

FIG. 34, comprising the combination of FIG. 34A and FIG. 34B, is a flowchart 3600 of an exemplary method of processing an image in accordance with an exemplary embodiment. In various embodiments, the input image being processed is a grayscale image, e.g., a grayscale image corresponding to a scan or other visual capture including a quadrilateral image, e.g., a non-rectangular quadrilateral image of a rectangular object. The rectangular object is, e.g., a page of a document, a printed form, a receipt, a card, etc. In some embodiments, the object is rectangular, e.g., a page of a document. In some embodiments, the object is predominately rectangular, e.g., a predominately rectangular card with rounded corners, e.g., a credit card or identification card. The exemplary method of flowchart 3600 is, e.g., performed by an image processing device, e.g., exemplary image processing device 3700 of FIG. 35 or computer system 3100 of FIG. 29.

Operation of the exemplary method starts in step 3602 in which the image processing device is powered on and initialized. Operation proceeds from step 3602 to step 3604. In step 3604 the image processing device performs a localized blurring operation on said image by applying a local area filter to different portions of said image. In some embodiments, the local area filter is a morphological operation, e.g., a close and/or dilation operation. In some embodiments, the morphological operation includes a close operation. Operation proceeds from step 3604 to step 3606. In step 3606 the image processing device identifies lines in said image. Step 3606 includes step 3608 in which the image processing device generates a line weight for each identified line. In some such embodiments, the line weight is a function of at least line length or contrast between pixel values on different sides of a line edge extending in the direction of the line. In some such embodiments, the line weight is a function of both line length and contrast between pixel values on different sides of the line edge extending in the direction of the line. Operation proceeds from step 3606 to step 3610.

In step 3610, the image processing device classifies identified lines, in a per line basis, as corresponding to a first direction or a second direction, said second direction being perpendicular to said first direction. For example, in one embodiment predominately vertical lines are classified as vertical lines and predominately horizontal lines are classified as horizontal lines. Step 3610 includes steps 3612 and 3614. In step 3612 the image processing device classifies lines extending predominately in a vertical direction as corresponding to the first direction, and in step 3614 the image processing device classifies lines extending predominately in a horizontal direction as corresponding to the second direction. In some embodiments, as part of classifying an identified line into a group, a delta y value for the line is compared to a delta x value of the line, e.g., with the line being assigned to the first group if delta y is greater than delta x, and being assigned to the second group if delta x is greater than delta y. Operation proceeds from step 3610 to step 3616.

In step 3616 the image processing device identifies at least two lines classified as corresponding to the first direction as potential first-direction perimeter lines. Step 3616 includes step 3618 and 3620. In step 3618 the image processing device keeps as potential first-direction perimeter lines two lines classified as corresponding to the first direction with the greatest weight. Operation proceeds from step 3618 to step 3620, in which the image processing device keeps as potential first-direction perimeter lines, lines classified as corresponding to the first direction which i) have a line weight greater than a predetermined fraction of a line weight of a line having a greater line weight and classified as corresponding to the first direction and ii) extends in the first direction an amount greater than a predetermined fraction of the length of said image in the first direction. Operation proceeds from step 3616, via connecting node A 3622, to step 3624.

In step 3624 the image processing device identifies at least two lines classified as corresponding to the second direction as potential second-direction perimeter lines. Step 3624 includes step 3626 and 3628. In step 3626 the image processing device keeps as potential second-direction perimeter lines two lines classified as corresponding to the second direction with the greatest weight. Operation proceeds from step 3626 to step 3628, in which the image processing device keeps as potential second-direction perimeter lines, lines classified as corresponding to the second direction which i) have a line weight greater than a predetermined fraction of a line weight of a line having a greater line weight and classified as corresponding to the second direction and ii) extends in the second direction an amount greater than a predetermined fraction of the length of said image in the second direction.

Operation proceeds from step 3624 to step 3630. In step 3630 the image processing device eliminates lines for which a decision to keep the line has not been made. Operation proceeds from step 3630 to step 3632. In step 3632 the image processing device determines from the at least two potential first-direction perimeter lines and said at least two potential second-direction perimeter lines four document corner points. Step 3632 includes steps 3634, 3636, 3638, 3640, 3642, and 3644. In step 3634 the image processing device identifies the two best candidate first-direction perimeter lines from the set of remaining potential first-direction perimeter lines based on the distance between the lines in said set of remaining potential first-direction perimeter lines. For example, the image processing device selects the two lines furthest apart from each other from the set of remaining potential first-direction perimeter lines as the two best candidate vertical perimeter lines. Operation proceeds from step 3634 to step 3636, in which the image processing device identifies the two best candidate second-direction perimeter lines from the set of remaining potential second-direction perimeter lines based on the distance between the lines in said set of remaining potential second-direction perimeter lines. For example, the image processing device selects the two lines furthest apart from each other from the set of remaining potential second-direction perimeter lines as the two best candidate horizontal perimeter lines.

Operation proceeds from step 3636 to step 3638, in which the image processing device determines if the two best candidate second-direction perimeter lines and first-direction perimeter lines intersect at four distinct point, e.g., within a predetermined region. In some embodiments, the predetermined region is the region corresponding to the input image. In some other embodiments, the predetermined region is a region slightly larger than the input image size, e.g., 130% the size of the input image to allow for one corner of the object, e.g., rectangular document page, to be outside the input image range. Operation proceeds from step 3638 to step 3640. If the image processing device has determined that the two best candidate second-direction perimeter lines and the two best candidate first-direction perimeter lines intersect at four distinct points, then operation proceeds from step 3640 to step 3642; otherwise, operation proceeds from step 3640 to step 3644. Returning to step 3642, in step 3642 the image processing device uses the intersection points as the four document corner points. Returning to step 3644, in step 3644 the image processing device uses at least one other line in place of one of said best candidate lines to find the four intersecting points. Operation proceeds from step 3644 to step 3642, in which the image processing device uses the four intersecting points as the four document corner points.

Operation proceeds from step 3632 to step 3646. In step 3646 the image processing device performs at least one of a document extraction operation or a document correction operation based on the determined document corner points. In some embodiments, the document correction operation is a perspective transform.

Figure 35:
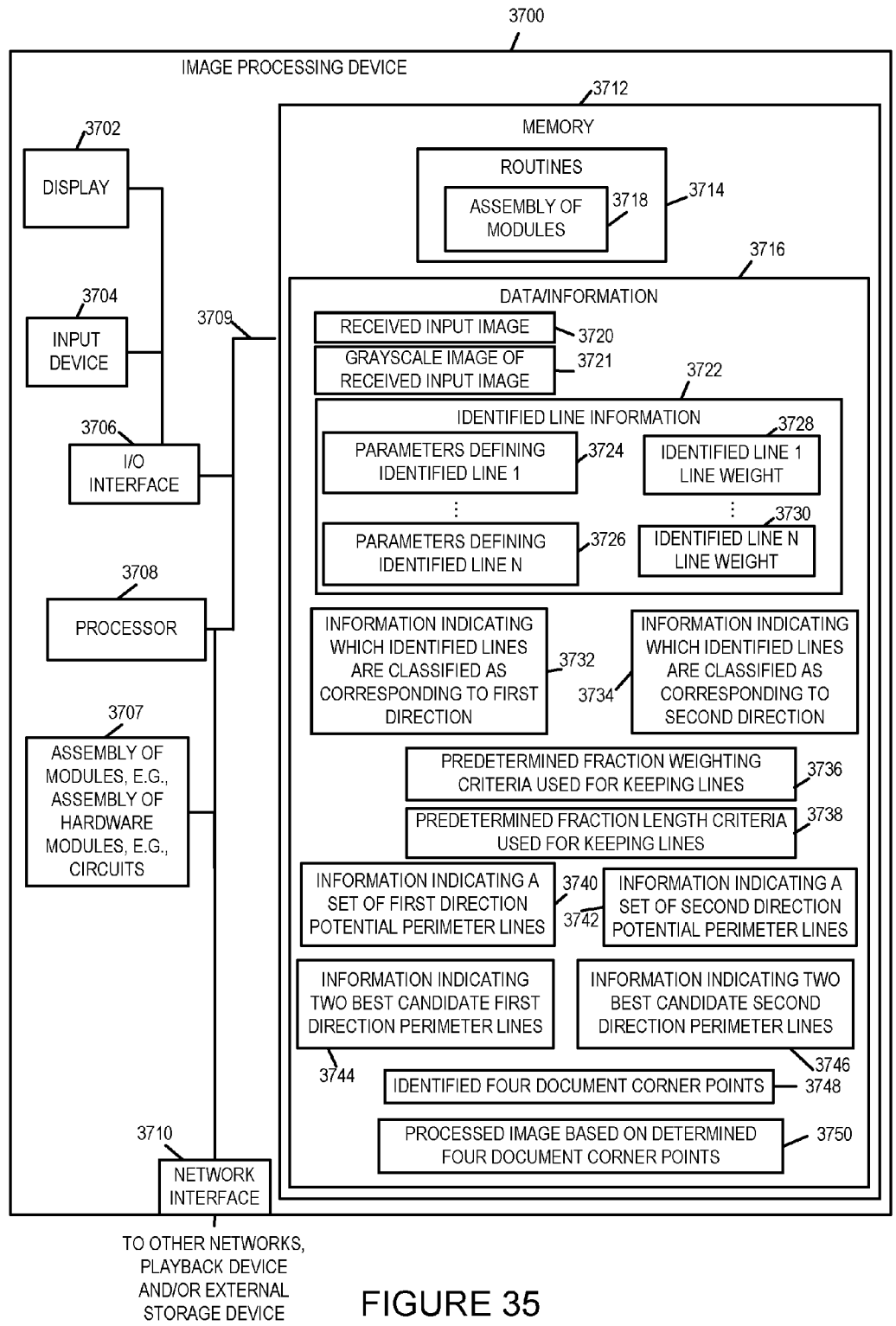
FIG. 35 is a drawing of an exemplary image processing device in accordance with an exemplary embodiment.

FIG. 35 illustrates an exemplary image processing device 3700, capable of processing data, e.g., image data, in accordance with the present invention. The image processing device 3700 includes various modules for performing the steps of methods of the present invention, e.g., such as the methods of flowchart 3600 of FIG. 34, and/or the methods of flowchart 3400 of FIG. 34. In some embodiments, the image processing device 3700 also stores input image data, e.g., a file including input pixel values corresponding to an image to be processed, grayscale values corresponding to the input image, and processed output image data, e.g., a file including a processed image based on determined four document corner points.

Figures 36, 36A:
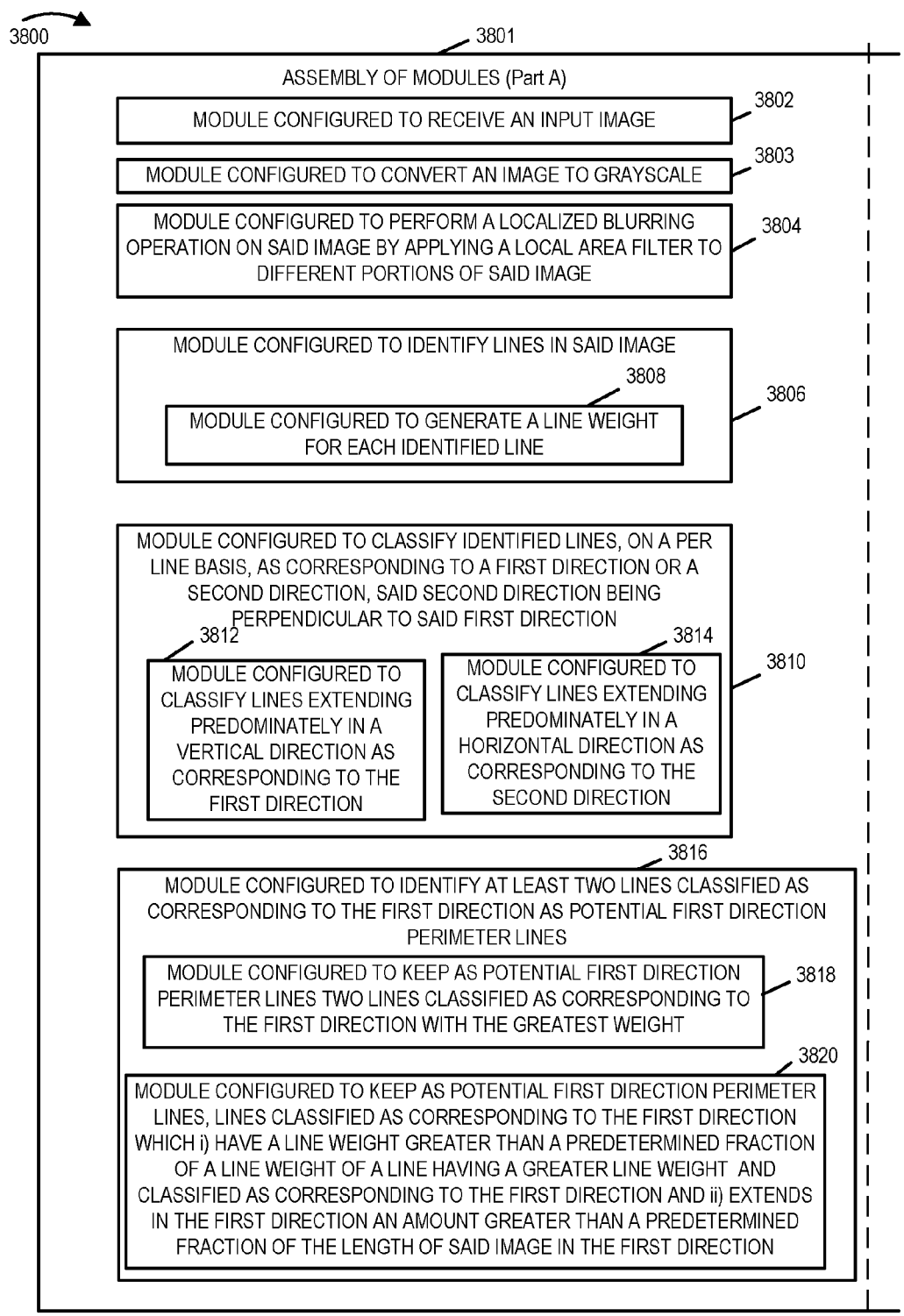
FIG. 36A is a first part of exemplary assembly of modules which can be, and in some embodiments is included in the exemplary image processing device of FIG. 35 or the computer system of FIG. 29.

As shown in FIG. 35, the image processing device includes a display 3702, an input device 3704, an input/output interface 3706, an assembly of modules 3707, e.g., an assembly of hardware modules, e.g., circuits, a processor 3708, a network interface 3710 and a memory 3712 coupled together by a bus 3709 over which the various elements may exchange data and information. Memory 3712 includes routines 3714 including assembly of modules 3718, e.g., an assembly of software modules, and data/information 3716. The display 3702 can be used to display an input image, user selected control information input screens, and results. The user can input control parameters using the input device 3704 which may be, e.g., a keyboard or other input device. The I/O interface 3710 includes transmitters and receivers for transmitting and receiving information. The processor 3708, e.g., a CPU, performs various operations in accordance with the invention, e.g., under direction of routines 3714 and/or one or more of the modules stored in the assembly of modules 3118. In some embodiments, the each of the modules in the assembly of modules 3800 of FIG. 36 is included in assembly of modules 3718 in routines 3714. Routines 3714, in some embodiments, includes, e.g., main routines and subroutines. While the assembly of modules 3718 includes various software modules, the modules in assembly of modules 3800 may in some embodiments are, implemented in hardware, e.g., in assembly of modules 3707 and/or within processor 3708. In some embodiments, some modules in the assembly of modules 3800 are implemented in hardware and other modules in the assembly of modules 3800 are implemented in software.

Data/information 3716 includes a received input image 3720, e.g., information representing the input image, e.g., image size information, and pixel value information corresponding to the pixels of the image, a grayscale image corresponding to the received input image 3721, and identified line information 3722. Identified line information 3722 includes information corresponding to a plurality of lines which have been identified in the image ((parameters defining identified line 1 3724, a line weight corresponding to identified line 1 3728), . . . (parameters defining identified line N 3726, a line weight corresponding to identified line N 3730)). Parameters defining a line includes, e.g., information identifying the position of the line in the image, information identifying the slope of the line, a delta y value, a delta x value, and information indicating the length of the line. In some embodiments, the line weight is, e.g., a function of the length of the line and contrast between different sides of the line. Data/information 3716 further includes information indicating which identified lines are classified as corresponding to the first direction 3732, e.g., a predominately vertical direction, and information indicating which identified lines are classified as corresponding to the second direction 3734, e.g., a predominately horizontal direction. Data/information 3716 further includes predetermined fraction weighting criteria used for keeping lines 3736, e.g., a primary value for WT_FRACTION and a secondary value for WT_FRACTION, and predetermined fraction length criteria used for keeping lines 2738, e.g., a value for $FRACTION_H$ and $FRACTION_W$. Data/information 3716 further includes information indicating a set of first-direction potential perimeter lines 3740 and information indicating a set of second-direction potential perimeter lines 3742. Data information 3716 further includes a information indicating the two best candidate first-direction perimeter lines 3744 and information indicating the two best candidate second-direction perimeter lines. Data/information 3716 further includes identified four document corner points 3748 and a processed image based on the determined four document corner points, e.g., the processed image is a corrected version of the input image.

Figure 36B:
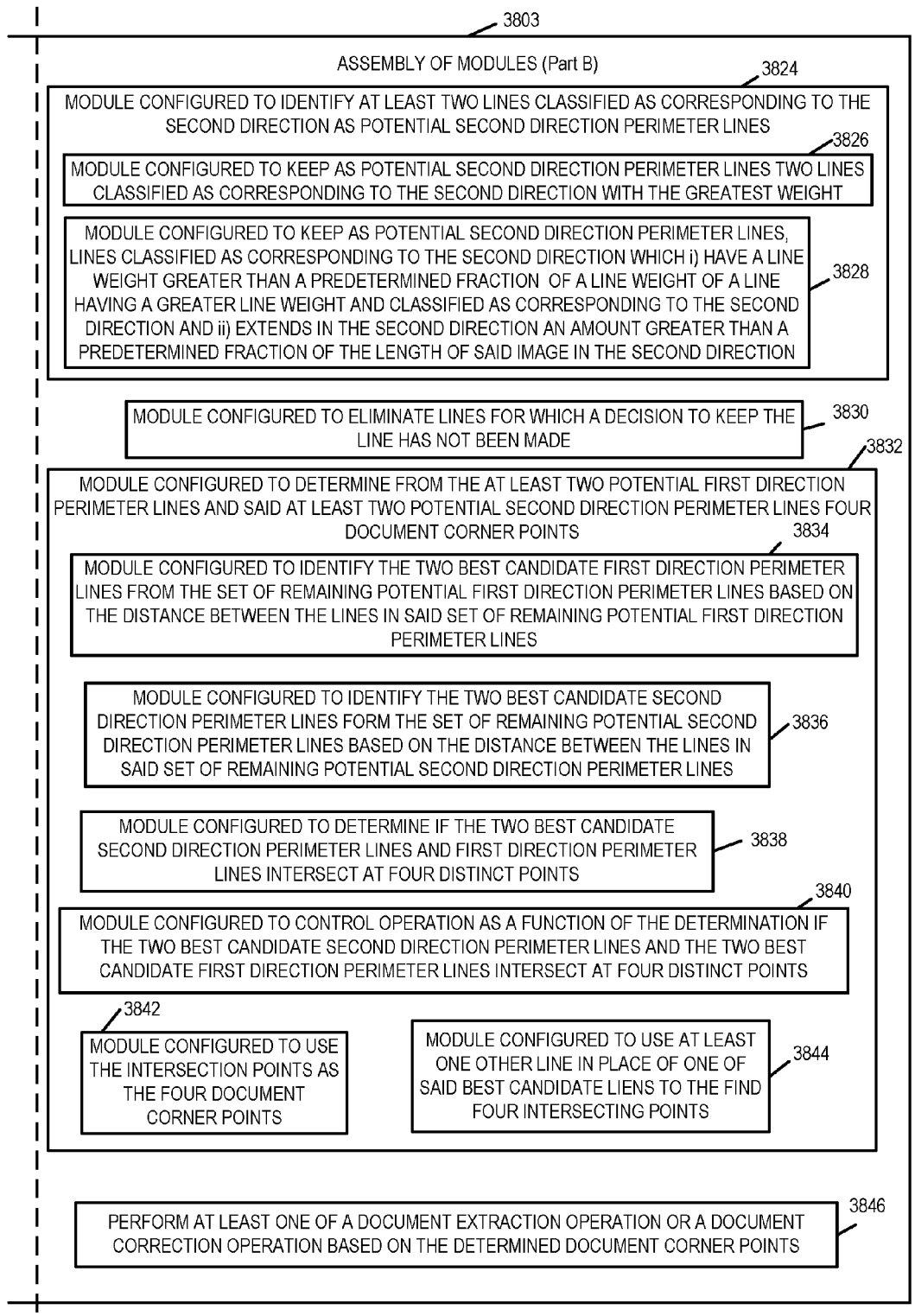
FIG. 36B is a second part of an exemplary assembly of modules which can be, and in some embodiments, is included in the exemplary image processing device of FIG. 35 of the computer system of FIG. 29.

FIG. 36, which comprises a combination of FIGS. 36A and 36B illustrates an assembly of modules 3800 which can, and in some embodiments is, used in the exemplary image processing device 3700 illustrated in FIG. 35, e.g., as assembly of modules 3718 and/or 3707. Assembly of modules 3800 includes part A 3801 of the assembly of modules shown in FIG. 36A, and part B 3803 shown in FIG. 36B. Assembly of modules 3800 can be implemented in hardware within the processor 3708 of the image processing device 3700, e.g., as individual circuits. The modules in the assembly 3800 can, and in some embodiments are, implemented fully in hardware within the processor 3708, e.g., as individual circuits. In other embodiments some of the modules are implemented, e.g., as circuits, within the processor 3708 with other modules being implemented, e.g., as circuits in assembly of modules 3707, external to and coupled to the processor 3708. As should be appreciated the level of integration of modules on the processor and/or with some modules being external to the processor may be one of design choice.

Alternatively, rather than being implemented as circuits, all or some of the modules 3800 may be implemented in software and stored in the memory 3712 of the image processing device 3700 with the modules controlling operation of the image processing device 3700 to implement the functions corresponding to the modules when the modules are executed by a processor, e.g., processor 3708. In some such embodiments, the assembly of modules 3800 is included in the memory 3712, e.g., as assembly of modules 3718. In still other embodiments, various modules are implemented as a combination of hardware and software, e.g., with another circuit external to the processor providing input to the processor 3708 which then under software control operates to perform a portion of a module's function. While shown in the FIG. 35 embodiment as a single processor, e.g., computer, it should be appreciated that the processor 3708 may be implemented as one or more processors, e.g., computers.

When implemented in software the modules include code, which when executed by the processor 3708, configure the processor 3708 to implement the function corresponding to the module. In embodiments where the assembly of modules 3800 is stored in the memory 3712, the memory 3712 is a computer program product comprising a computer readable medium comprising code, e.g., individual code for each module, for causing at least one computer, e.g., processor 3708, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 38 control and/or configure the image processing device 3700 or elements therein such as the processor 3708, to perform the functions of the corresponding steps illustrated in the method of flowchart 3600 of FIG. 34. Thus the assembly of modules 3800 includes various modules that perform functions of the corresponding steps of the method shown in FIG. 34.

FIG. 36, comprising the combination of FIG. 36A and FIG. 36B, is a drawing of an exemplary assembly of modules 3800, comprising the combination of Part A 3801 and Part B 3803, in accordance with an exemplary embodiment.

Assembly of modules 3800 includes a module 3802 configured to receive an input image, a module 3803 configured to convert an image to grayscale, e.g., if the received image is not already in grayscale, a module 3804 configured to perform a localized blurring operation on said image by applying a local filter to different portions of said image, and a module 3806 configured to identify lines in said image. Module 3806 includes a module 3808 configured to generate a line weight for each identified line.

Assembly of modules 3800 further includes a module 3810 configured to classify identified lines, on a per line basis, as corresponding to a first direction or a second direction, said second direction being perpendicular to said first direction. Module 3810 includes a module 3812 configured to classify lines extending predominately in a vertical direction as corresponding to a first direction and a module 3814 configured to classify lines extending predominately in a horizontal direction as corresponding to a second direction. Assembly of modules 3800 further includes a module 3818 configured to identify at least two lines classified as corresponding to the first direction as potential first-direction perimeter lines and a module 3824 configured to identify at least two lines classified as corresponding to the second direction as potential second-direction perimeter lines. Module 3816 includes a module 3818 configured to keep as potential first-direction perimeter lines two lines classified as corresponding to the first direction with the greatest weight, and a module 3820 configured to keep as potential first-direction perimeter lines, lines classified as corresponding to the first direction which: i) have a line weight greater than a predetermined fraction of a line weight of a line having a greater line weight and classified as corresponding to the first direction and ii) extends in the first direction an amount greater than a predetermined fraction of the length of said image in the first direction. Module 3824 includes a module 3826 configured to keep as potential second-direction perimeter lines two lines classified as corresponding to the second direction with the greatest weight, and a module 3828 configured to keep as potential second-direction perimeter lines, lines classified as corresponding to the second direction which: i) have a line weight greater than a predetermined fraction of a line weight of a line having a greater line weight and classified as corresponding to the second direction and ii) extends in the second direction an amount greater than a predetermined fraction of the length of said image in the second direction.

Assembly of modules 3800 further includes a module 3830 configured to eliminate lines for which a decision to keep the line has not been made, and a module 3832 configured to determine from said at least two potential first-direction perimeter lines and said at least two potential second-direction perimeter lines four document corner points. Module 3832 includes a module 3834 configured to identify the two best candidate first-direction perimeter lines from the set of remaining potential first-direction perimeter lines based on the distance between the lines in said set of remaining potential first-direction perimeter lines, a module 3836 configured to identify the two best candidate second-direction perimeter lines from the set of remaining potential second-direction perimeter lines based on the distance between the lines in said set of remaining potential second-direction perimeter lines, a module 3838 configured to determine if the two best candidate second-direction perimeter lines and the two best candidate first-direction perimeter lines intersect at four distinct points, e.g., within a predetermined area, a module 3840 configured to control operation as a function of the determination if the two best candidate second-direction perimeter lines and the two best candidate first-direction perimeter lines intersect at four distinct points, a module 3842 configured to use the intersection points as the four document corner points, e.g., in response to a determination that two best candidate second-direction perimeter lines and the two best candidate first-direction perimeter lines intersect at four distinct points, and a module 3844 configured to use at least one other line in place of one of said best candidate lines to find the four intersecting points, e.g., in response to a determination that two best candidate second-direction perimeter lines and the two best candidate first-direction perimeter lines do not intersect at four distinct points.

Assembly of modules 3800 further includes a module 3846 configured to perform at least one of a document extraction operation or a document correction operation based on the determined document corner points. In some embodiments, module 3846 generates a modification matrix based on the determined four document corner points and performs a perspective modification operation using the generated modification matrix. In some embodiments, the document extraction operation recovers the information included within the boundaries of the identified four document corner points, e.g., following the perspective correction operation.

In some embodiments, one or more modules shown in FIG. 36 which are included within another module may be implemented as an independent module or modules.

An exemplary computer program product, for use in a computer, in accordance with some embodiments, comprises: a non-transitory computer readable medium comprising: code for causing said computer to processing a tile of an image, said processing including: performing a line identification operation on a tile of said image, said line identification operation identifying a line in said tile when a line is present; determining, when said line identification operation identifies a line in said tile of interest: i) a first quantized parameter value used in defining the identified line, and ii) a line weight corresponding to the identified line; and updating, based on the determined line weight, i) an accumulated line weight value (PW[PI]) corresponding to the determined first quantized parameter value defining the identified line, and ii) a first accumulated parameter weighted sum corresponding to the identified line; and code for causing said computer to identify a number of lines in said image based on accumulated values generated from processing multiple different tiles of said image.

The techniques of various embodiments may be implemented using software, hardware and/or a combination of software and hardware. Various embodiments are directed to apparatus, e.g., an image processing device or system. Various embodiments are also directed to methods, e.g., a method of generating bi-level pixel values from a set of input pixel values corresponding to an image. Various embodiments are also directed to machine, e.g., computer, readable medium, e.g., ROM, RAM, CDs, hard discs, etc., which include machine readable instructions for controlling a machine to implement one or more steps of a method.

In various embodiments apparatus described herein are implemented using one or more modules to perform the steps corresponding to one or more methods. Thus, in some embodiments various features are implemented using modules. Such modules may be implemented using software, hardware or a combination of software and hardware. In some embodiments in which the modules are implemented in hardware, the modules are implemented as circuits, e.g., of a processor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s).

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an image processing device or system. In some embodiments the image processing device is a portable device including a camera, e.g., a cell phone including a camera with a processor that implements the method.

In some embodiments modules are implemented using software, in other embodiments modules are implemented in hardware, in still other embodiments the modules are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. A method of identifying lines in an image, the method comprising:
processing a tile of said image, said processing including:
performing a line identification operation on a tile of said image, said line identification operation identifying a line in said tile when a line is present;
determining, when said line identification operation identifies a line in said tile of interest: i) a first quantized parameter value used in defining the identified line, and ii) a line weight corresponding to the identified line;
updating, based on the determined line weight, i) an accumulated line weight value corresponding to the determined first quantized parameter value defining the identified line ii) a first accumulated parameter weighted sum corresponding to the identified line and iii) a second accumulated parameter weighted sum corresponding to the identified line; and
identifying a number of lines in said image based on accumulated values generated from processing multiple different tiles of said image, said identifying a number of lines including identifying n largest accumulated line weights, each of the n largest accumulated line weights corresponding to a different pair of quantized perimeter locations, where n is a positive integer value.

2. The method of claim 1, further comprising:
determining, when said line identification operation identifies a line in said tile of interest, prior to updating the second accumulated parameter weighted sum, a second quantized parameter value corresponding to the identified line.

3. The method of claim 2, wherein said method includes performing said step of processing a tile for each of multiple tiles of said image.

4. The method of claim 3,
wherein identifying a number of lines in said image includes: i) dividing the accumulated first parameter weighted sum corresponding to the identified largest accumulated line weight, by the largest accumulated line weight, to determine a first line parameter value corresponding to a first line and ii) dividing the second accumulated parameter weighted sum corresponding to the identified largest accumulated line weight, by the largest accumulated line weight, to determine a second line parameter value of the first line, said first and second line parameters values of the first line defining the first line in said image.

5. The method of claim 2, wherein the quantized parameter values indicate perimeter locations indicating where the identified line would enter and exit said image perimeter if extended through the image perimeter.

6. The method of claim 5, wherein first accumulated parameter weighted sum corresponding to the identified line is an accumulated perimeter entry point weighted sum; and iii) the second accumulated parameter weighted sum is an accumulated perimeter exit point weighted sum corresponding to the determined quantized perimeter locations of the identified line.

7. The method of claim 3,
wherein said step of performing a line identification operation of a tile is performed for a space corresponding to a tile; and
determining, when said line identification operation identifies a line in said tile of interest quantized perimeter locations, includes determining where the identified line would intersect the perimeter of said image if the identified line was extended beyond a boundary of a tile to the perimeter of said image.

8. The method of claim 7, wherein said quantized perimeter locations are image perimeter segment locations.

9. The method of claim 8, wherein said image perimeter segment locations identify perimeter segments which are of a different length than a side of said tile.

10. The method of claim 2, wherein said line is a transition between light and dark image regions.

11. The method of claim 2, wherein said line is a straight image region bordered on each side of the straight image region by pixels having a different intensity than pixels in said straight image region.

12. A non-transitory computer readable medium for use in a computer comprising:
code for causing said computer to process a tile of said image, said processing including:
performing a line identification operation on a tile of said image, said line identification operation identifying a line in said tile when a line is present;
determining, when said line identification operation identifies a line in said tile of interest: i) a first quantized parameter value used in defining the identified line, and ii) a line weight corresponding to the identified line; and
updating, based on the determined line weight, i) an accumulated line weight value corresponding to the determined first quantized parameter value defining the identified line ii) a first accumulated parameter weighted sum corresponding to the identified line and iii) a second accumulated parameter weighted sum corresponding to the identified line; and
code for causing said computer to identify a number of lines in said image based on accumulated values generated from processing multiple different tiles of said image, said identifying a number of lines including identifying n largest accumulated line weights, each of the n largest accumulated line weights corresponding to a different pair of quantized perimeter locations, where n is a positive integer value.

13. The non-transitory computer readable medium of claim 12, wherein said a non-transitory computer readable medium further comprises:
code for causing said computer to determine, when said line identification operation identifies a line in said tile of interest, prior to updating the second accumulated parameter weighted sum, a second quantized parameter value corresponding to the identified line.

14. The non-transitory computer readable medium of claim 13, wherein said non-transitory computer readable medium further comprises code for causing said computer to perform said step of processing a tile for each of multiple tiles of said image.

15. A system comprising:
at least one processor configured to:
process a tile of said image, said processing including:
performing a line identification operation on a tile of said image, said line identification operation identifying a line in said tile when a line is present;
determining, when said line identification operation identifies a line in said tile of interest: i) a first quantized parameter value used in defining the identified line, and ii) a line weight corresponding to the identified line;
updating, based on the determined line weight, i) an accumulated line weight value corresponding to the determined first quantized parameter value defining the identified line ii) a first accumulated parameter weighted sum corresponding to the identified line and iii) a second accumulated parameter weighted sum corresponding to the identified line; and identify a number of lines in said image based on accumulated values generated from processing multiple different tiles of said image, said processor identifying n largest accumulated line weights, each of the n largest accumulated line weights corresponding to a different pair of quantized perimeter locations, n being a positive integer value, as part of being configured to identify a number of lines in said image; and memory coupled to said at least one processor.

16. The computer of claim 15, wherein said processor is further configured to:

determine, when said line identification operation identifies a line in said tile of interest, prior to updating the second accumulated parameter weighted sum, a second quantized parameter value corresponding to the identified line.

17. The system of claim 16, wherein said processor is further configured to perform said step of processing a tile for each of multiple tiles of said image.

18. The system of claim 17, wherein said processor is configured to: i) divide the accumulated first parameter weighted sum corresponding to the identified largest accumulated line weight, by the largest accumulated line weight, to determine a first line parameter value corresponding to a first line and ii) divide the second accumulated parameter weighted sum corresponding to the identified largest accumulated line weight, by the largest accumulated line weight, to determine a second line parameter value of the first line, said first and second line parameters values of the first line defining the first line in said image, as part of being configured to identify a number of lines in said image.

* * * * *